US011789584B1

(12) United States Patent
O'Hern et al.

(10) Patent No.: US 11,789,584 B1
(45) Date of Patent: Oct. 17, 2023

(54) USER INTERFACE FOR INTERACTING WITH AN AFFORDANCE IN AN ENVIRONMENT

(71) Applicant: Apple Inc., Cupertino, CA (US)

(72) Inventors: Adam Michael O'Hern, Campbell, CA (US); Mark Alan Ebbole, San Francisco, CA (US); Justin Timothy Voss, San Jose, CA (US); Charles Magahern, San Francisco, CA (US); Peter Louis Hajas, Cupertino, CA (US); Michael E. Buerli, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/181,182

(22) Filed: Feb. 22, 2021

Related U.S. Application Data

(60) Provisional application No. 63/002,019, filed on Mar. 30, 2020.

(51) Int. Cl.
*G06F 3/04815* (2022.01)
*G06T 3/40* (2006.01)
(Continued)

(52) U.S. Cl.
CPC .......... *G06F 3/04815* (2013.01); *G06F 3/011* (2013.01); *G06F 3/04847* (2013.01); *G06T 3/40* (2013.01); *G06T 11/001* (2013.01)

(58) Field of Classification Search
CPC .. G06F 3/04815; G06F 3/011; G06F 3/04847; G06T 3/40; G06T 11/001
See application file for complete search history.

(56) References Cited

U.S. PATENT DOCUMENTS

| 7,119,819 B1* | 10/2006 | Robertson | G06F 3/04815 715/848 |
| 7,542,040 B2* | 6/2009 | Templeman | G06T 13/40 345/474 |
| 9,529,454 B1* | 12/2016 | McGrath | G06F 3/0346 |
| 9,696,795 B2* | 7/2017 | Marcolina | G06T 19/006 |

(Continued)

OTHER PUBLICATIONS

Unity Forum Blog Thread, May 2017, Retrieved from the Internet on Oct. 9, 2019: https://forum.unity.com/threads/oncollisionenter-fires-too-early.473239/, pp. 1-8.

(Continued)

*Primary Examiner* — Nicholas Augustine
(74) *Attorney, Agent, or Firm* — Fernando & Partners LLP

(57) ABSTRACT

Various implementations disclosed herein include devices, systems, and methods for indicating a distance to a selectable portion of a virtual surface. In various implementations, a device includes a display, a non-transitory memory and one or more processors coupled with the display and the non-transitory memory. In some implementations, a method includes displaying a graphical environment that includes a virtual surface, wherein at least a portion of the virtual surface is selectable. In some implementations, the method includes determining a distance between a collider object and the selectable portion of the virtual surface. In some implementations, the method includes displaying a depth indicator in association with the collider object. In some implementations, a visual property of the depth indicator is selected based on the distance between the collider object and the selectable portion of the virtual surface.

26 Claims, 45 Drawing Sheets

(51) Int. Cl.
*G06T 11/00* (2006.01)
*G06F 3/01* (2006.01)
*G06F 3/04847* (2022.01)
*G06F 3/0481* (2022.01)

(56) References Cited

U.S. PATENT DOCUMENTS

| | | | | |
|---|---|---|---|---|
| 9,996,797 | B1* | 6/2018 | Holz | G06F 3/011 |
| 10,203,794 | B1* | 2/2019 | Smith | G06F 3/04845 |
| 2017/0132694 | A1* | 5/2017 | Damy | G06F 3/0488 |
| 2017/0185261 | A1* | 6/2017 | Perez | G06F 3/04845 |
| 2018/0075658 | A1* | 3/2018 | Lanier | G06T 11/001 |
| 2018/0224945 | A1* | 8/2018 | Hardie-Bick | G06T 19/006 |
| 2021/0019036 | A1* | 1/2021 | Wang | G06F 3/0346 |
| 2021/0183158 | A1* | 6/2021 | Korngold | G06F 3/04815 |

OTHER PUBLICATIONS

Microsoft Docs, "Gaze—Mixed Reality," Feb. 2019, Retrieved from the Internet on Oct. 13, 2019: https://docs.microsoft.com/en-us/windows/mixed-reality/gaze, pp. 1-4.

Atsushi Matsubayashi et al., "Direct Finger Manipulation of 3D Object Image with Ultrasound Haptic Feedback," Proceedings of the 2019 CHI Conference on Human Factors in Computing Systems, May 2019, pp. 1-11.

Unity Technologies, "Scripting API: Physics.defaultContactOffset," Retrieved from the Internet on Oct. 10, 2019: https://docs.unity3d.com/ScriptReference/Physics-defaultContactOffset.html, 1 Page.

Matt Whitlock et al., "Interacting with Distant Objects in Augmented Reality," 2018 IEEE Conference on Virtual Reality and 3D User Interfaces (VR), Mar. 2018, pp. 41-48.

* cited by examiner

700

- Display an environment that includes a surface, wherein at least a portion of the surface is selectable —702
- Determine a distance between a collider object and the selectable portion of the surface —704
- Display a depth indicator in association with the collider object, wherein a visual property of the depth indicator is selected based on the distance between the collider object and the selectable portion of the surface —706

Figure 7A

- Detect a change in the distance between the collider object and the selectable portion of the surface; and

- Modify the visual property of the depth indicator based on the change in the distance ⎯708

Detect that the distance between the collider object and the selectable portion of the surface is decreasing; and Reduce a size of the depth indicator to indicate that the distance between the collider object and the selectable portion of the surface is decreasing. ⎯710

Detect that the distance between the collider object and the selectable portion of the surface is increasing; and Increase a size of the depth indicator to indicate that the distance between the collider object and the selectable portion of the surface is increasing. ⎯712

Detect that the distance between the collider object and the selectable portion of the surface is decreasing; and Increase an opacity of the depth indicator to indicate that the distance between the collider object and the selectable portion of the surface is decreasing. ⎯714

Detect that the distance between the collider object and the selectable portion of the surface is increasing; and Decrease an opacity of the depth indicator to indicate that the distance between the collider object and the selectable portion of the surface is increasing. ⎯716

Detect that the distance between the collider object and the selectable portion of the surface is decreasing; and Darken a color of the depth indicator to indicate that the distance between the collider object and the selectable portion of the surface is decreasing. ⎯718

Figure 7B

Detect that the distance between the collider object and the selectable portion of the surface is increasing; and Lighten a color of the depth indicator to indicate that the distance between the collider object and the selectable portion of the surface is increasing. — 720

Change a shape of the depth indicator based on the distance between the collider object and the selectable portion of the surface. — 722

Detect that the distance between the collider object and the selectable portion of the surface is decreasing; and Modify the depth indicator to indicate a direction towards the selectable portion of the surface. — 724

Display, in the environment, a representation of a digit of a person, wherein the collider object is associated with the digit of the person; and Display the depth indicator as encapsulating the representation of the digit of the person. — 726

Display a geometric shape (e.g., a circle, a polygon, an arrow) in association with the collider object. — 728

Collider object is capsule-shaped — 730

Surface includes a plane and/or a surface of a object — 732

Surface is transparent / semi-transparent — 734

Selectable portion of the surface is an affordance — 736

Display a second depth indicator for a selectable portion of a second surface — 738

Figure 7C

The collider object encapsulates the body portion of the person. ⟶ 1132

The body portion of the person includes a hand of the person. ⟶ 1134

Detect respective positions of bones of the hand. ⟶ 1136

Detect that the hand is in a closed position; and

Detect a movement of a first portion of the hand relative to a second portion of the hand. ⟶ 1138

The gesture corresponds to a request to move the object;

Displaying the manipulation of the object in accordance with the first operation includes moving the object with respect to a first point of reference; and Displaying the manipulation of the object in accordance with the second operation includes moving the object with respect to a second point of reference that is different from the first point of reference. ⟶ 1140

The gesture corresponds to a request to rotate the object;

Displaying the manipulation of the object in accordance with the first operation includes rotating the object about a first axis of rotation; and Displaying the manipulation of the object in accordance with the second operation includes rotating the object about a second axis of rotation that is different from the first axis of rotation. ⟶ 1142

Figure 11C

USER INTERFACE FOR INTERACTING WITH AN AFFORDANCE IN AN ENVIRONMENT

CROSS-REFERENCE TO RELATED APPLICATION

This application claims the benefit of U.S. Provisional Patent App. No. 63/002,019, filed on Mar. 30, 2020, which is incorporated by reference in its entirety.

TECHNICAL FIELD

The present disclosure generally relates to a user interface for interacting with an affordance in an environment.

BACKGROUND

Some devices are capable of generating and presenting extended reality (XR) environments. Some devices that present XR environments include mobile communication devices such as smartphones, head-mountable displays (HMDs), eyeglasses, heads-up displays (HUDs), and optical projection systems. Most previously available devices that present XR environments are ineffective at allowing a user to interact with the XR environment.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 7A-7C are flowchart representations of a method of indicating a distance to an XR surface in accordance with some implementations.

FIGS. 11A-11C are flowchart representations of a method of manipulating an XR object in accordance with some implementations.

Figure 1A:
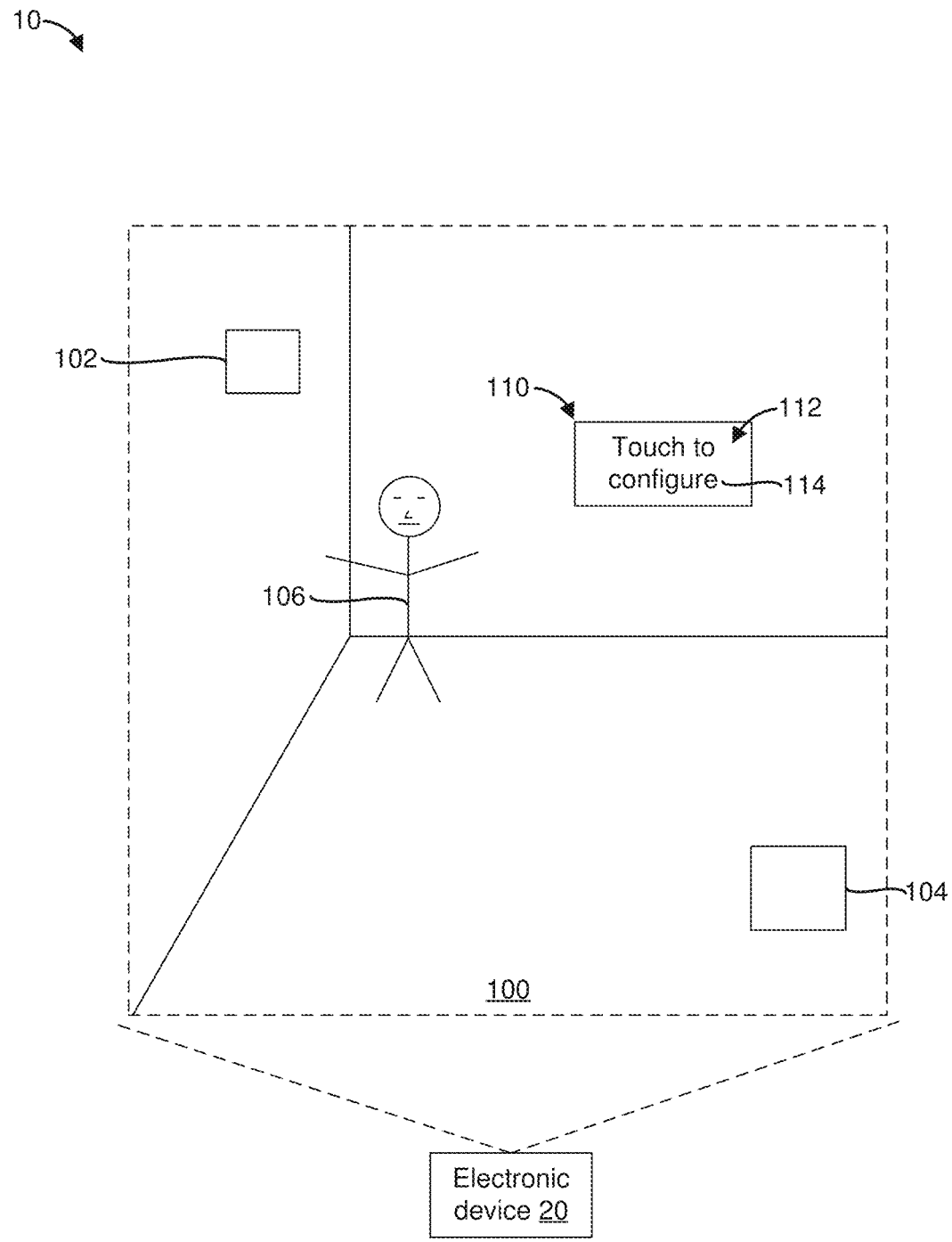
FIGS. 1A-1O are diagrams of an example user interface for selecting an XR affordance in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for selecting an extended reality (XR) affordance. In various implementations, a device includes a display, a non-transitory memory and one or more processors coupled with the display and the non-transitory memory. In some implementations, a method includes displaying an XR environment that includes an XR affordance characterized by a bounding surface. In some implementations, the method includes detecting that a collider object has breached the bounding surface of the XR affordance. In some implementations, the method includes determining whether or not the collider object has breached the bounding surface of the XR affordance by a threshold amount. In some implementations, the method includes indicating a selection of the XR affordance in response to determining that the collider object has breached the bounding surface of the XR affordance by the threshold amount.

Various implementations disclosed herein include devices, systems, and methods for indicating a distance to a selectable portion of an XR surface. In various implementations, a device includes a display, a non-transitory memory and one or more processors coupled with the display and the non-transitory memory. In some implementations, a method includes displaying a graphical environment (e.g., an XR environment) that includes a virtual surface (e.g., an XR surface). In some implementations, at least a portion of the virtual surface is selectable. In some implementations, the method includes determining a distance between a collider object and the selectable portion of the virtual surface. In some implementations, the method includes displaying a depth indicator in association with the collider object. In some implementations, a visual property of the depth indicator is selected based on the distance between the collider object and the selectable portion of the virtual surface.

Various implementations disclosed herein include devices, systems, and methods for manipulating an XR object based on a distance to the XR object. In various implementations, a device includes a display, a non-transitory memory and one or more processors coupled with the display and the non-transitory memory. In some implementations, a method includes detecting a gesture that is directed to an XR object. In some implementations, the gesture is performed by a body portion of a person. In some implementations, the method includes determining whether or not the XR object is located beyond a threshold separation from a collider object associated with the body portion of the person. In some implementations, the method includes displaying a manipulation of the XR object in accordance with a first operation when the XR object is located within the threshold separation of the collider object. In some implementations, the method includes displaying a manipulation of the XR object in accordance with a second operation when the XR object is located beyond the threshold separation from the collider object.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In an XR environment, it is often difficult for a user to perceive depth. Lack of depth perception can make it difficult to accurately select XR affordances. Because it is difficult to assess how far a particular XR affordance is, the user sometimes overreaches and inadvertently activates the XR affordance. The lack of depth perception sometimes causes the user to underreach and fail in activating the XR affordance. Additionally, using a spherical-shaped collider often results in false touch events because a touch event is registered when the sphere touches the XR affordance. Because the outer surface of the sphere is farther away from the finger, the touch event is registered before the finger reaches a location that corresponds to the XR affordance. In other words, the touch event is falsely registered before the finger touches the XR affordance.

The present disclosure provides methods, systems, and/or devices for selecting an XR affordance. A touch event is registered when a collider object penetrates the XR affordance by a threshold amount. This reduces false touch events because the touch event is registered when the user's finger penetrates the XR affordance by the threshold amount. The threshold amount can be adjusted by the user. For example, if the user desires to register touch events at a relatively fast speed, then the user can set the threshold amount to a relatively low value. By contrast, if the user desires to register touch events at a relatively slow speed, then the user can set the threshold amount to a relatively high value. The threshold amount can also be determined based on the user's previous touch events. For example, if the user is undoing or canceling a lot of touch events (e.g., by pressing a back button), then the threshold amount can be increased. Using an elongated collider object (e.g., a capsule-shaped collider object) tends to reduce the number of false touch events because the outer surface of the elongated collider object is closer to the user's finger.

FIG. 1A is a block diagram of an example operating environment 10 in accordance with some implementations.

While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 10 includes an electronic device 20. In some implementations, the electronic device 20 includes a smartphone, a tablet or a laptop that can be held by a user (not shown).

In some implementations, the electronic device 20 includes a wearable computing device such as a watch or a head-mountable device (HMD) that can be worn by the user. In some implementations, the HMD includes a head-mountable enclosure. In some implementations, the head-mountable enclosure is shaped to form a receptacle for receiving an electronic device with a display. For example, in some implementations, a smartphone or a tablet can be attached to (e.g., inserted into, for example, slid into) the HMD. In some implementations, the HMD includes an integrated display for presenting an XR experience to the user.

As illustrated in FIG. 1A, the electronic device 20 presents an extended reality (XR) environment 100. In some implementations, the XR environment 100 is referred to as a graphical environment. In some implementations, the XR environment 100 is generated by the electronic device 20 and/or a controller (not shown). In some implementations, the XR environment 100 includes a virtual environment that is a simulated replacement of a physical environment. In other words, in some implementations, the XR environment 100 is synthesized by the electronic device 20. In such implementations, the XR environment 100 is different from a physical environment where the electronic device 20 is located. In some implementations, the XR environment 100 includes an augmented environment that is a modified version of a physical environment. For example, in some implementations, the electronic device 20 modifies (e.g., augments) the physical environment where the electronic device 20 is located in order to generate the XR environment 100. In some implementations, the electronic device 20 generates the XR environment 100 by simulating a replica of the physical environment where the electronic device 20 is located. In some implementations, the electronic device 20 generates the XR environment 100 by removing and/or adding items from the simulated replica of the physical environment where the electronic device 20 is located.

In some implementations, the XR environment 100 includes various XR objects. In some implementations, the XR objects are referred to as graphical objects. In the example of FIG. 1A, the XR environment 100 includes an XR drone 102, an XR robot 104 and an XR person 106. In some implementations, the XR objects are XR representations of physical articles from a physical environment. For example, in some implementations, the XR drone 102 is an XR representation of a physical drone, the XR robot 104 is an XR representation of a physical robot, and the XR person 106 is an XR representation of a physical person (e.g., a user of the electronic device 20).

In some implementations, the XR environment 100 includes one or more XR affordances. In the example of FIG. 1A, the XR environment 100 includes an XR affordance 110 that allows a user of the electronic device 20 to configure the XR environment 100. For example, the XR affordance 110 allows the user of the electronic device 20 to add and/or remove XR objects to/from the XR environment 100. The XR affordance 110 includes a bounding surface 112 that defines a planar boundary for the XR affordance 110. In some implementations, the bounding surface 112 is visible (e.g., in some implementations, the bounding surface 112 is opaque). Alternatively, in some implementations, the bounding surface 112 is invisible (e.g., in some implementations, the bounding surface 112 is see-through, transparent or translucent). In some implementations, the XR affordance 110 includes text 114, an image (not shown) and/or a graphic.

In the example of FIG. 1A, the XR affordance 110 resembles a button with defined dimensions. In some implementations, the XR affordance 110 includes an XR surface that extends indefinitely. In some implementations, the XR affordance 110 includes a surface of an XR object. In some implementations, the XR affordance 110 refers to a selectable portion of an XR object.

Figure 1B:
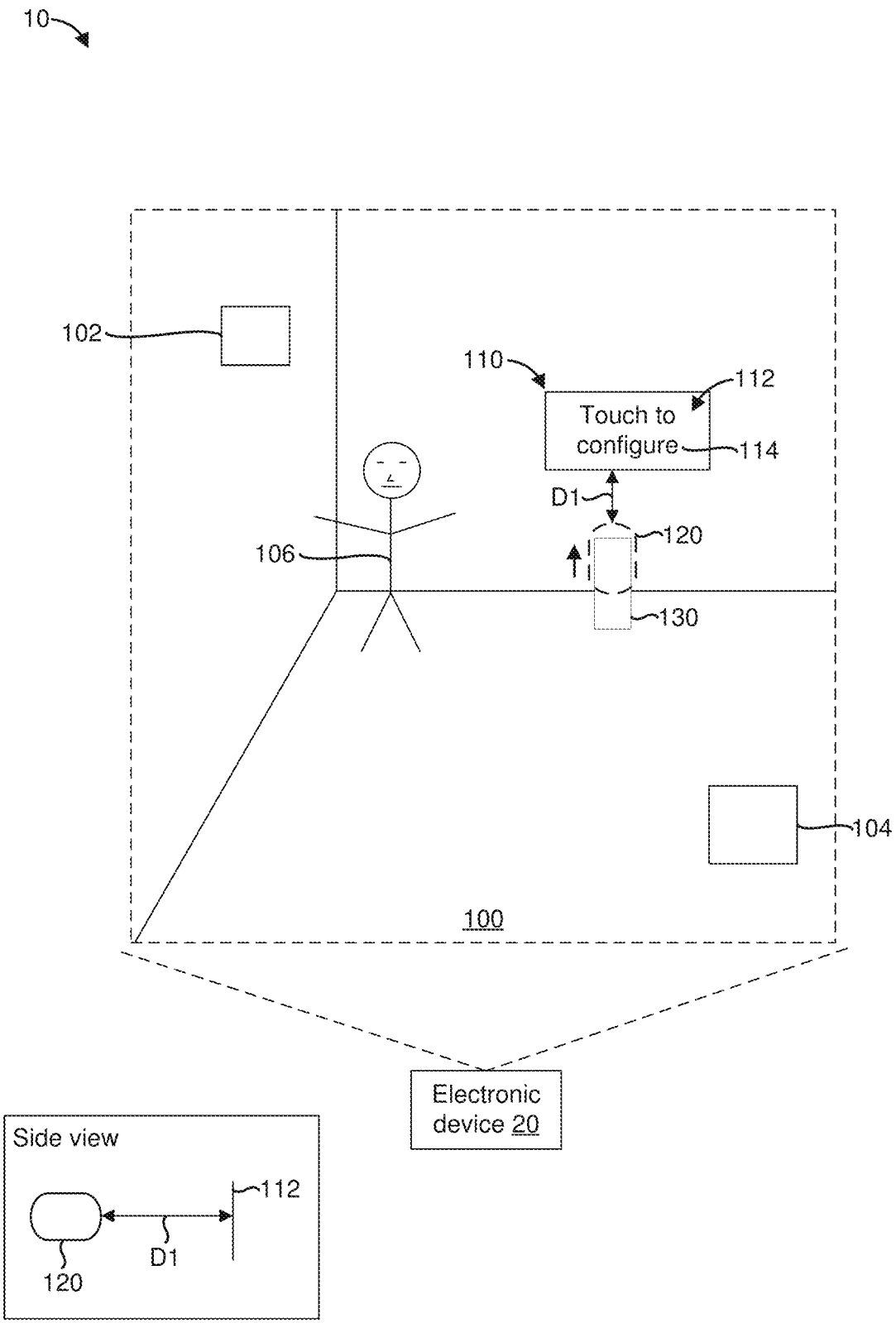

FIG. 1B illustrates a collider object 120 moving towards the XR affordance 110. In the example of FIG. 1B, the collider object 120 is associated with a digit of a person. For example, the collider object 120 encapsulates (e.g., wraps around) a portion of a finger of a user of the electronic device 20. In some implementations, the electronic device 20 displays an XR finger 130 that represents the finger of the user. As illustrated in FIG. 1B, the collider object 120 is a distance D1 from the bounding surface 112 of the XR affordance. As such, in the example of FIG. 1B, the XR affordance 110 has not been selected. In various implementations, the collider object 120 is not visible to a user of the electronic device 20.

Figure 1C:
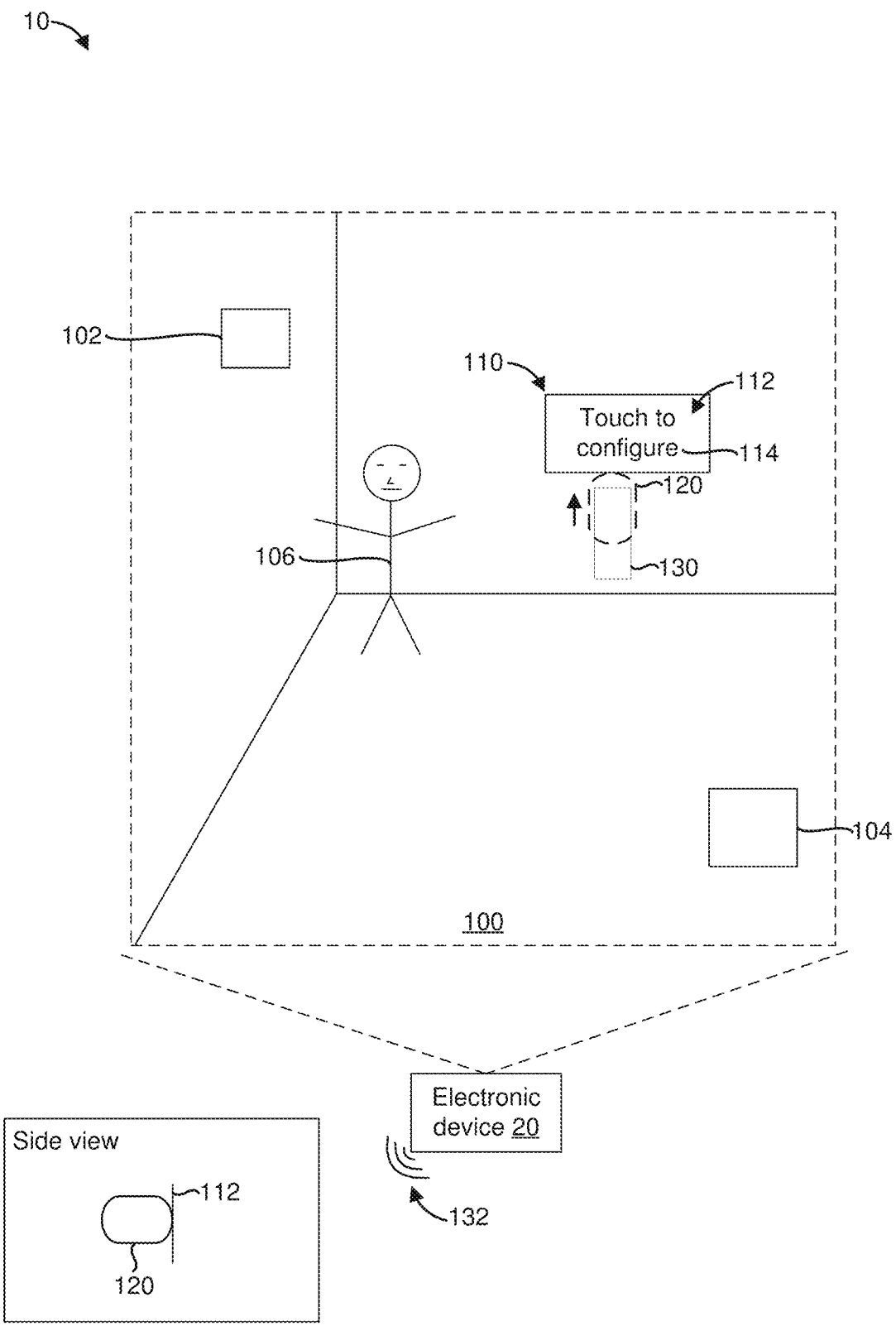

FIG. 1C illustrates the collider object 120 touching the bounding surface 112 of the XR affordance 110. In the example of FIG. 1C, the electronic device 20 plays a sound 132 to indicate that the collider object 120 has touched the bounding surface 112 of the XR affordance 110. In various implementations, the electronic device 20 does not register a touch event for the XR affordance 110 when the collider object 120 has touched the bounding surface 112 but not breached the bounding surface 112. Not registering a touch event for the XR affordance 110 when the collider object 120 has not penetrated the bounding surface 112 tends to reduce a number of false touch events.

Figure 1D:
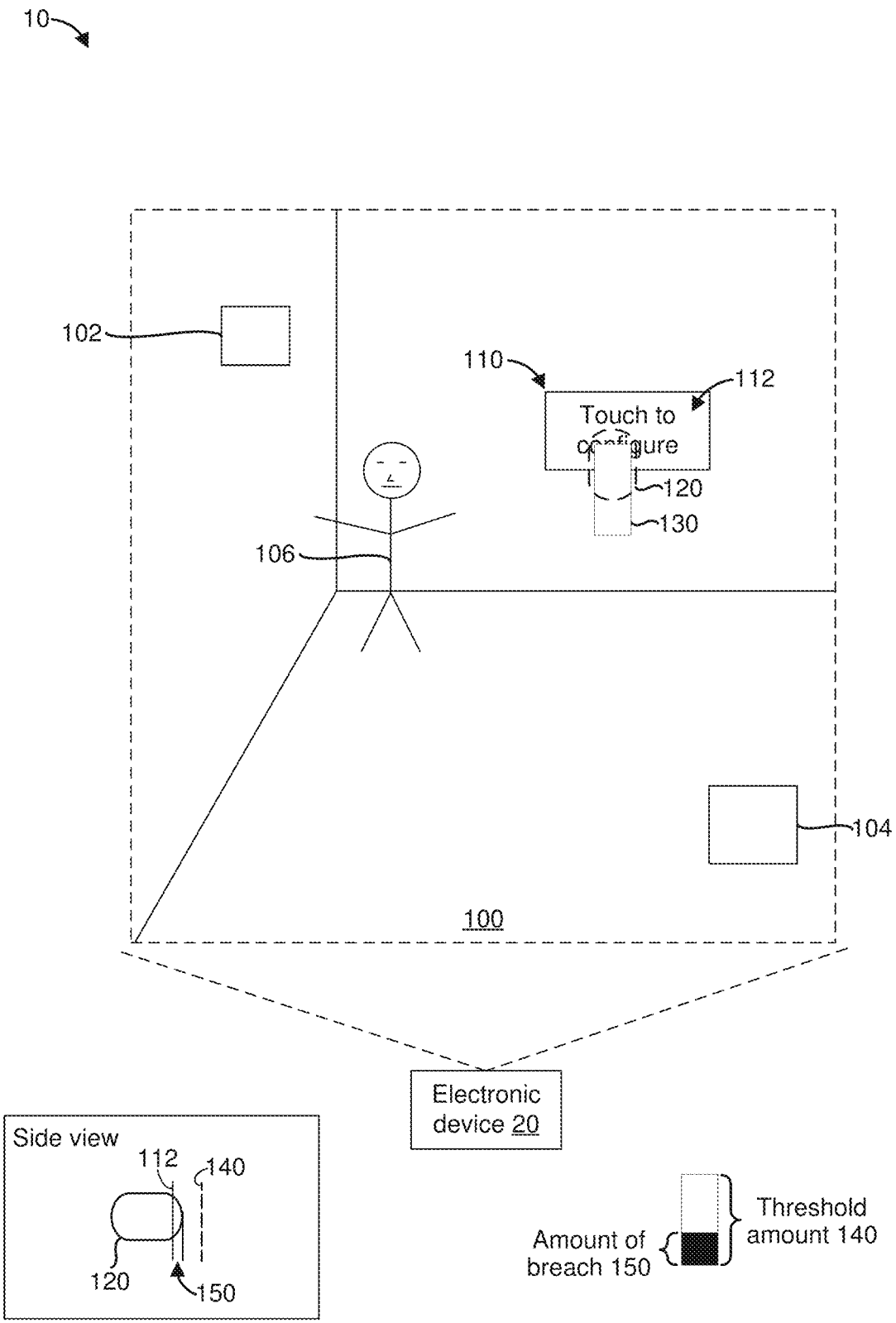

FIG. 1D illustrates that the collider object 120 has breached the bounding surface 112 of the XR affordance 110. However, the electronic device 20 does not register a touch event for the XR affordance 110 because an amount of breach 150 is less than a threshold amount 140. In some implementations, the threshold amount 140 represents a distance from the bounding surface 112, and the amount of breach 150 represents a portion of the collider object 120 that has penetrated the bounding surface 112. In the example of FIG. 1D, a length of the portion of the collider object 120 that has penetrated the bounding surface 112 is less than the distance represented by the threshold amount 140. Not registering a touch event for the XR affordance 110 until the collider object 120 has breached the bounding surface 112 by the threshold amount 140 tends to reduce a number of false touch events.

Figure 1E:
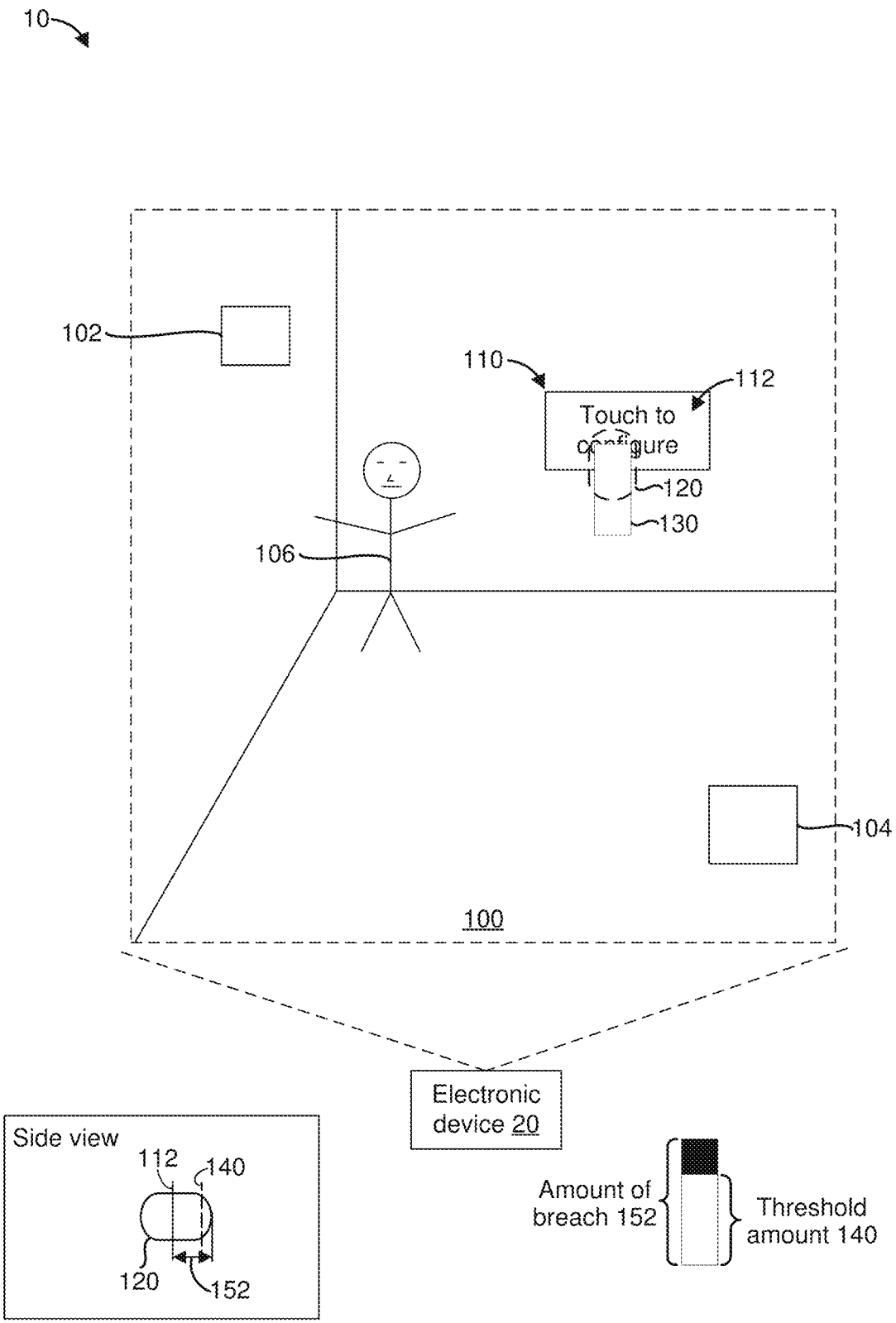

FIG. 1E illustrates that the collider object 120 has breached the bounding surface 112 of the XR affordance 110 by the threshold amount 140. As can be seen in FIG. 1E, an amount of breach 152 is greater than the threshold amount 140. The amount of breach 152 represents a portion of the collider object 120 that has penetrated the bounding surface 112 of the XR affordance 110. In the example of FIG. 1E, a length of the portion of the collider object 120 that has penetrated the bounding surface 112 is greater than the distance represented by the threshold amount 140. Registering a touch event for the XR affordance 110 when the collider object 120 breaches the bounding surface 112 by the threshold amount 140 tends to reduce a number of false touch events.

Figure 1F:
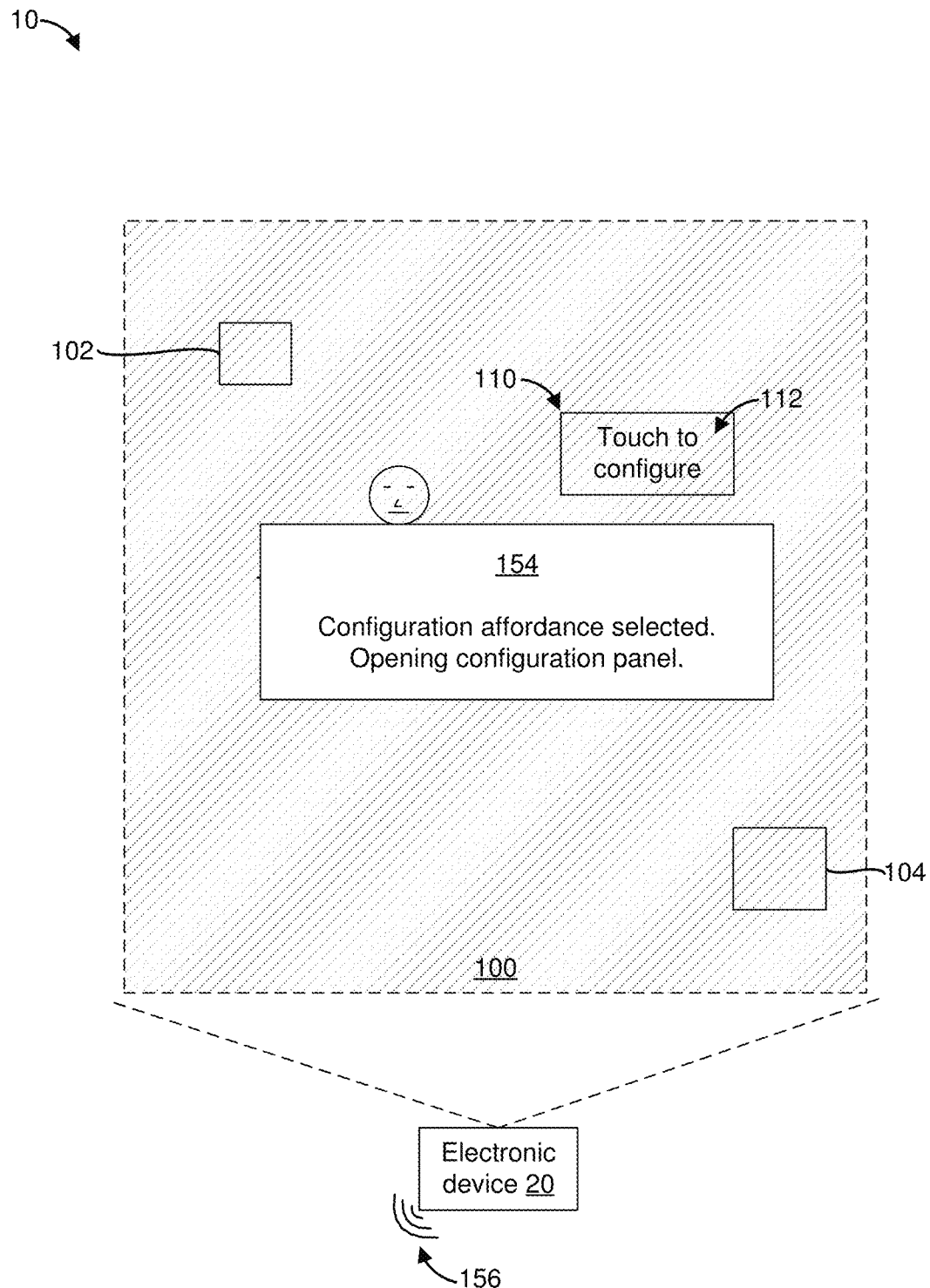

In various implementations, the electronic device 20 indicates a selection of the XR affordance 110. In the example of FIG. 1F, the electronic device 20 indicates the selection of the XR affordance 110 by displaying a selection indication 154 (e.g., a message that includes text and/or an image). In some implementations, the electronic device 20 indicates the selection of the XR affordance 110 by playing a sound 156. In some implementations, the sound 156 indicating the selection of the XR affordance 110 is different from the sound 132 (shown in FIG. 1C) indicating contact of the collider object 120 with the bounding surface 112.

Figure 1G:
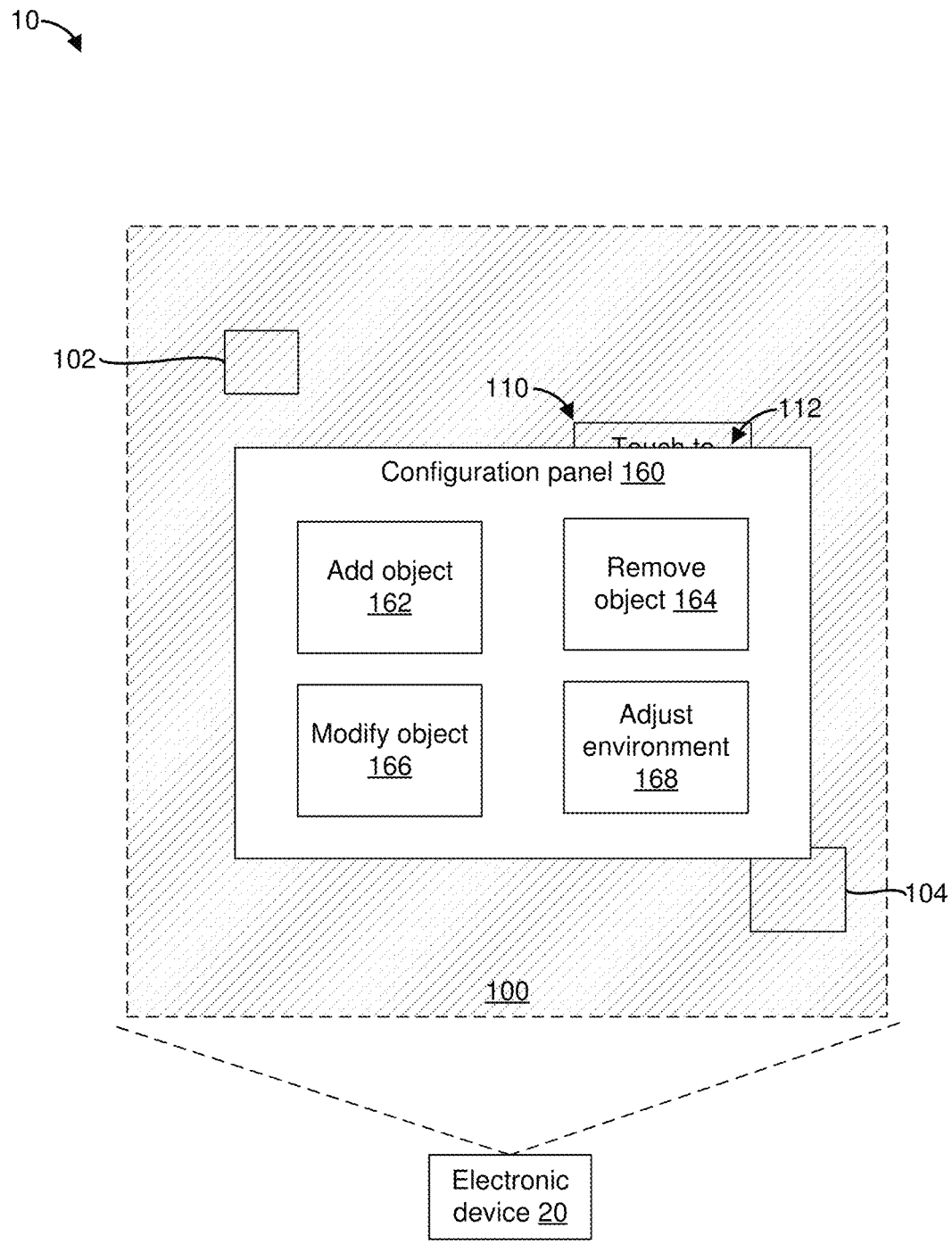

FIG. 1G illustrates a configuration panel 160 that the electronic device 20 displays in response to registering a touch event for the XR affordance 110. The configuration panel 160 includes various affordances for configuring the XR environment 100. For example, the configuration panel 160 includes an add affordance 162 for adding an XR object to the XR environment 100, a remove affordance 164 for removing an XR object from the XR environment 100, a modify affordance 166 for modifying an XR object that is in the XR environment 100, and an adjust affordance 168 for adjusting an environmental condition associated with the XR environment 100.

Figure 1H:
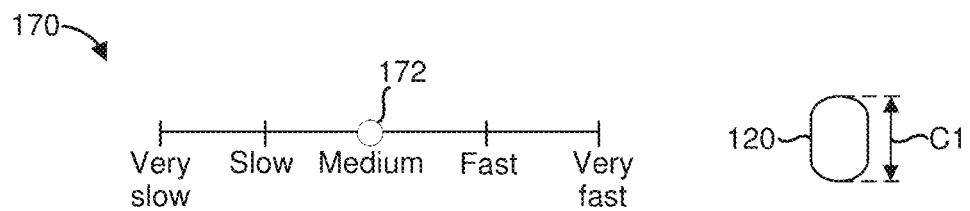
Figure 1I:
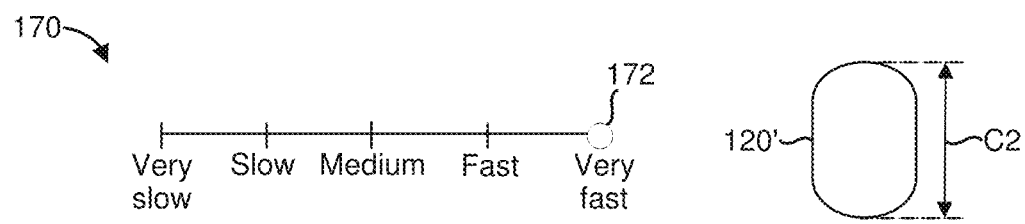
Figure 1J:
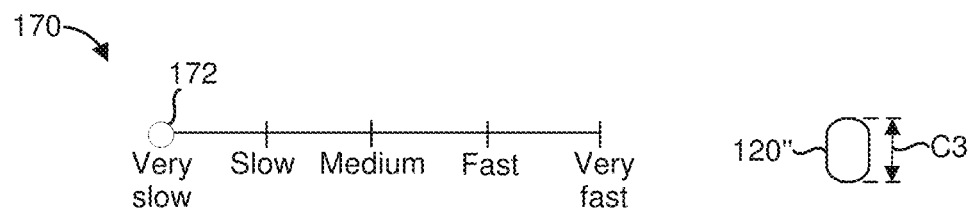

FIGS. 1H-1J illustrate collider objects of different sizes based on a target speed of selectability. FIGS. 1H-1J illustrate a selection speed range 170 that includes various speeds at which the electronic device 20 (shown in FIGS. 1A-1G) registers touch events for XR affordances. In the example of FIGS. 1H-1J, the selection speed range 170 includes a very slow speed, a slow speed, a medium speed, a fast speed, and a very fast speed for selecting XR affordances. In FIG. 1H, a selection speed selector 172 is positioned at a location that corresponds to the medium speed. As shown in FIG. 1H, when the selection speed is set to medium, then the collider object 120 has a size C1.

In the example of FIG. 1I, the selection speed selector 172 is positioned at a location that corresponds to the very fast speed. As shown in FIG. 1I, when the selection speed is set to very fast, then the size of the collider object 120 is increased to a size C2 in order to generate an enlarged collider object 120'. The size C2 of the enlarged collider object 120' is greater than the size C1 of the collider object 120 shown in FIG. 1H. The enlarged collider object 120' allows quicker selection of the XR affordance 110 because the enlarged collider object 120' breaches the bounding surface 112 by the threshold amount 140 sooner than the collider object 120.

In the example of FIG. 1J, the selection speed selector 172 is positioned at a location that corresponds to the very slow speed. As shown in FIG. 1J, when the selection speed is set to very slow, then the size of the collider object 120 is decreased to a size C3 in order to generate a miniature collider object 120". The size C3 of the miniature collider object 120" is smaller than the size C1 of the collider object 120 shown in FIG. 1H. The miniature collider object 120" allows slower selection of the XR affordance 110 because the miniature collider object 120" breaches the bounding surface 112 by the threshold amount 140 later than the collider object 120.

Figure 1K:
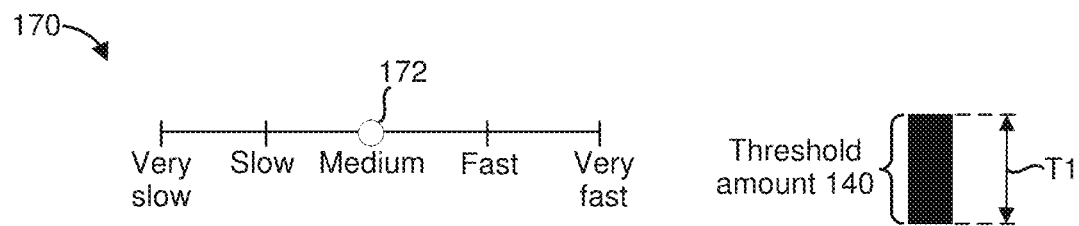
Figure 1L:
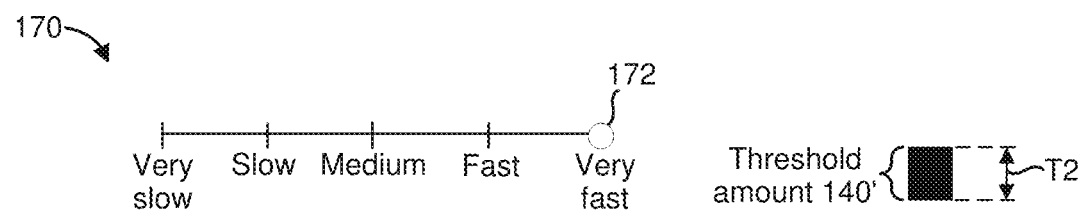
Figure 1M:
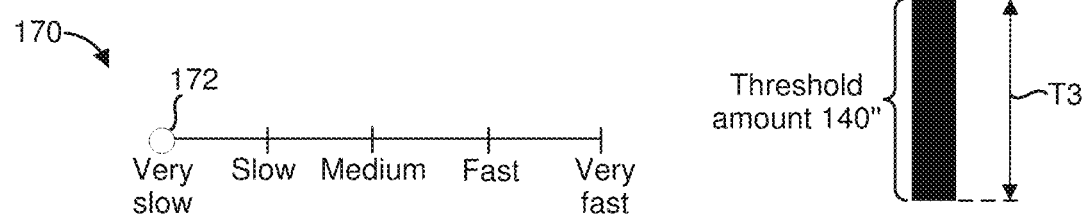

FIGS. 1K-1M illustrate threshold amounts of different sizes based on a target speed of selectability. In FIG. 1K, the selection speed selector 172 is positioned at a location that corresponds to the medium speed. As shown in FIG. 1K, when the selection speed is set to medium, then the threshold amount 140 has a size T1.

In the example of FIG. 1L, the selection speed selector 172 is positioned at a location that corresponds to the very fast speed. As shown in FIG. 1L, when the selection speed is set to very fast, then the size of the threshold amount 140 is decreased to a size T2 in order to generate a reduced threshold amount 140'. The size T2 of the reduced threshold amount 140' is smaller than the size T1 of the threshold amount 140 shown in FIG. 1K. The reduced threshold amount 140' allows quicker selection of the XR affordance 110 because the collider object 120 breaches the bounding surface 112 by the reduced threshold amount 140' sooner than the threshold amount 140.

In the example of FIG. 1M, the selection speed selector 172 is positioned at a location that corresponds to the very slow speed. As shown in FIG. 1M, when the selection speed is set to very slow, then the size of the threshold amount 140 is increased to a size T3 in order to generate an enlarged threshold amount 140". The size T3 of the enlarged threshold amount 140" is larger than the size T1 of the threshold amount 140 shown in FIG. 1K. The enlarged threshold amount 140" allows slower selection of the XR affordance 110 because the collider object 120 breaches the bounding surface 112 by the enlarged threshold amount 140" later than the threshold amount 140.

Figure 1N:
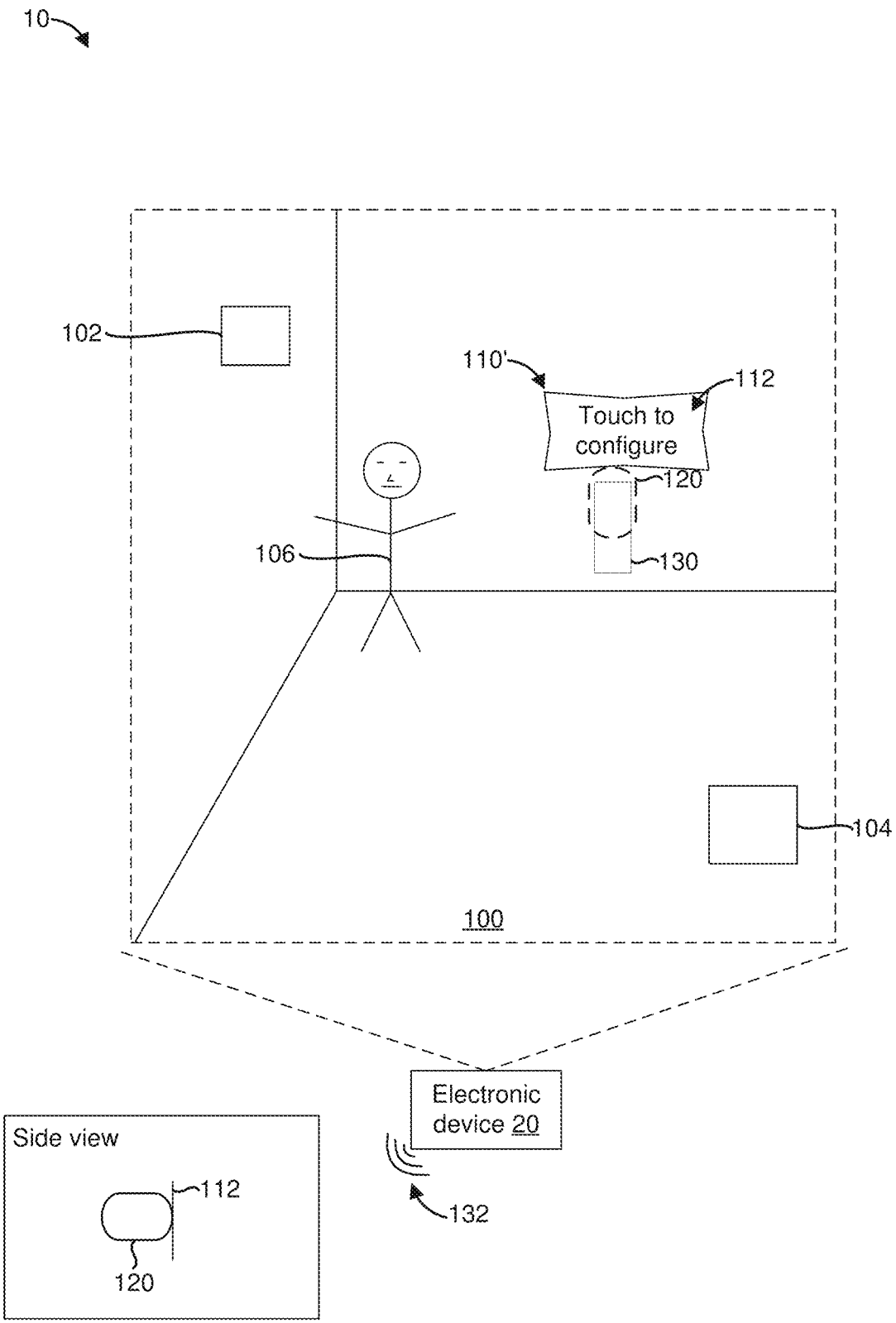

Referring to FIG. 1N, in some implementations, the electronic device 20 modifies a visual property of the XR affordance 110 when the collider object 120 touches the bounding surface 112 in order to generate a modified XR affordance 110'. Modifying the visual property of the XR affordance 110 and displaying the modified XR affordance 110' indicates that the collider object 120 has touched the bounding surface 112 of the XR affordance 110. In some implementations, modifying the visual property of the XR affordance 110 includes displaying a deformation of the XR affordance 110.

Figure 1O:
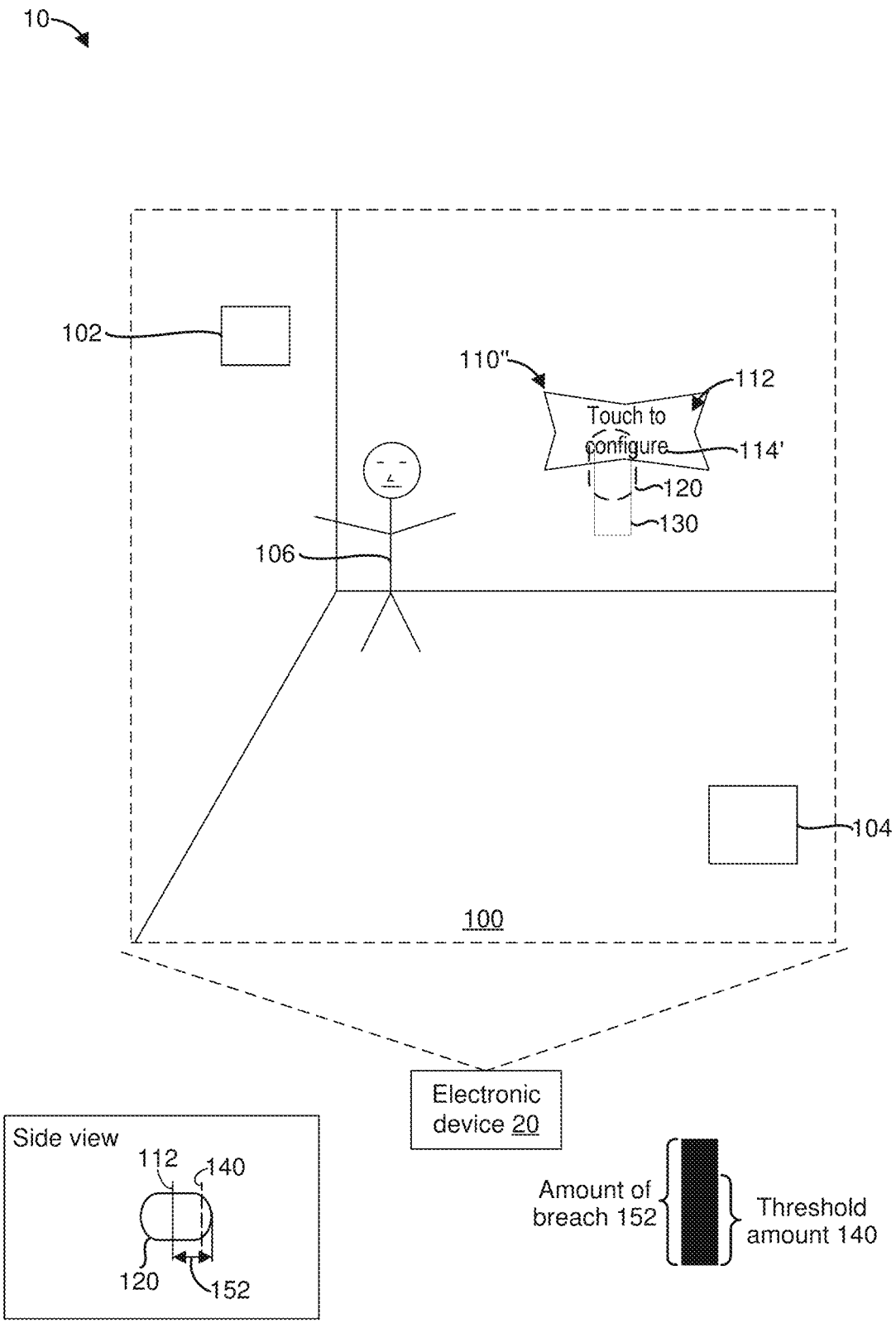

Referring to FIG. 1O, in some implementations, the electronic device 20 modifies a visual property of the XR affordance 110 when the collider object 120 breaches the bounding surface of the XR affordance 110 by the threshold amount 140 in order to generate a modified XR affordance 110". In some implementations, the modified XR affordance 110" is a further modification of the modified XR affordance 110' shown in FIG. 1N. For example, the modified XR affordance 110" is more deformed than the modified XR affordance 110. The modified XR affordance 110" includes squished text 114' (e.g., text that is narrower than the text 114 shown in FIG. 1B) to indicate the selection of the XR affordance 110.

Figure 2:
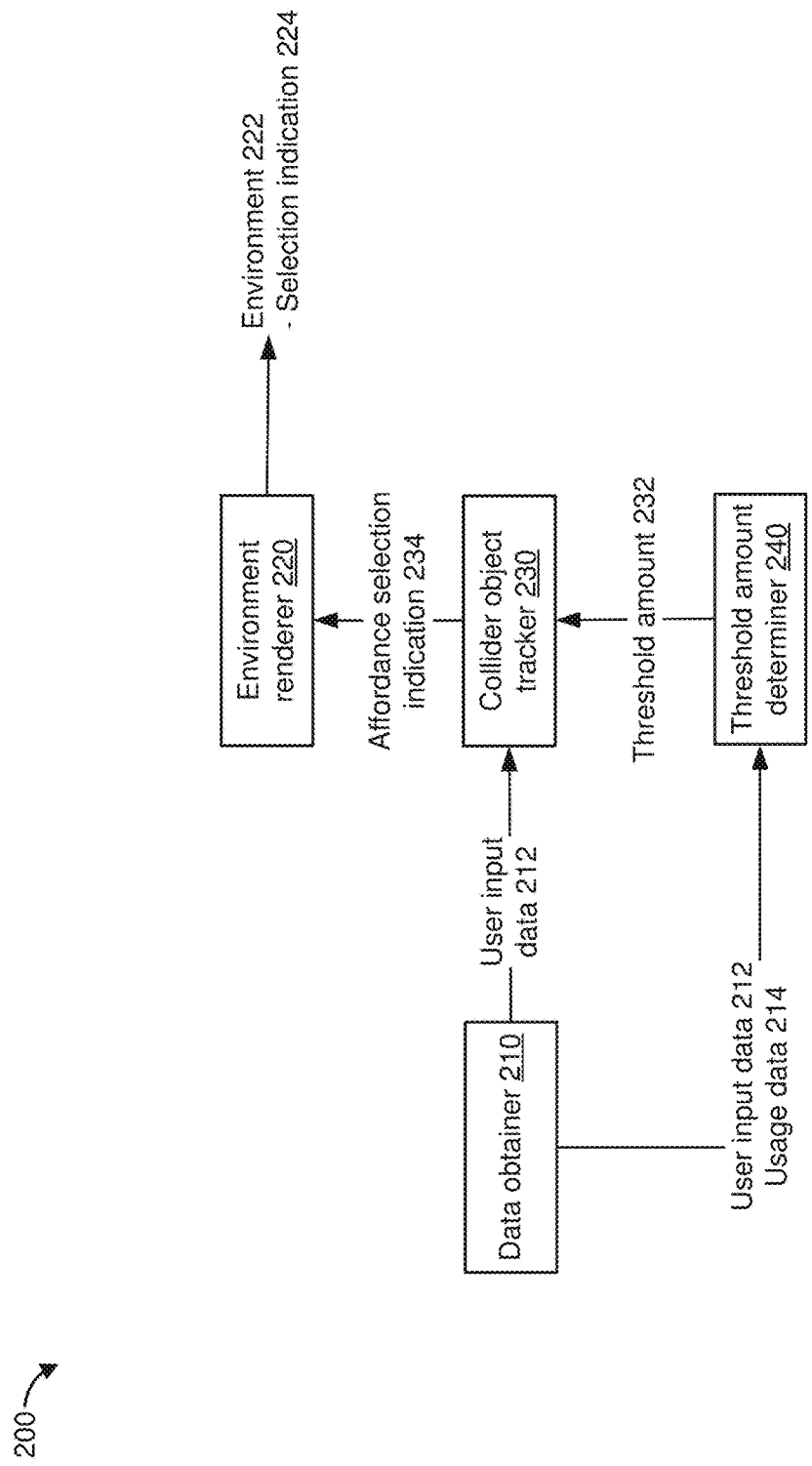
FIG. 2 is a block diagram of an example system for selecting an XR affordance in accordance with some implementations.

FIG. 2 is a block diagram of an example system 200 for allowing a user to select an XR affordance. In some implementations, the system 200 resides at the electronic device 20 shown in FIGS. 1A-1G. In various implementations, the system 200 includes a data obtainer 210, an XR environment renderer 220, a collider object tracker 230, and a threshold amount determiner 240.

In some implementations, the data obtainer 210 obtains user input data 212 that indicates one or more user inputs. For example, the user input data 212 indicates a position of a user's finger relative to locations that correspond to XR objects. In some implementations, the data obtainer 210 receives the user input data 212 from a set of one or more sensors. For example, the data obtainer 210 receives the user input data 212 from a computer vision system that includes one or more cameras. In some implementations, the user input data 212 includes images. In some implementations, the user input data 212 includes depth data. In some implementations, the data obtainer 210 provides the user input data 212 to the collider object tracker 230. In some implementations, the data obtainer 210 provides the user input data 212 to the threshold amount determiner 240.

In some implementations, the data obtainer 210 obtains usage data 214 that indicates previous usage of a device by the user of the device. For example, the usage data 214 indicates previous usage of the electronic device 20 by the user of the electronic device 20. In some implementations, the usage data 214 indicates a number of selections that the user has canceled or undone (e.g., a number of canceled selections and/or a percentage of canceled selections). The number of selections that have been canceled may indicate inadvertent selections by the user. In some implementations, the data obtainer 210 continuously stores the user input data 212 and the usage data 214 represents historical user input data that the data obtainer 210 previously stored. In some implementations, the data obtainer 210 provides the usage data 214 to the threshold amount determiner 240.

In various implementations, the XR environment renderer 220 renders (e.g., displays) an XR environment 222 (e.g., the XR environment 100 shown in FIGS. 1A-1G). In some implementations, the XR environment renderer 220 generates (e.g., synthesizes) the XR environment 222. In some implementations, the XR environment renderer 220 obtains (e.g., receives the XR environment 222) from another device.

In various implementations, the collider object tracker 230 tracks a position of a collider object (e.g., the collider object 120 shown in FIGS. 1B-1E) based on the user input data 212. Since the collider object encapsulates a portion of a digit, in some implementations, the collider object tracker 230 tracks the collider object by tracking a position of the digit that the collider object encapsulates.

In various implementations, the collider object tracker 230 determines whether the collider object has breached a bounding surface of an XR affordance by at least a threshold amount 232. For example, the collider object tracker 230 determines whether the collider object 120 shown in FIG. 1D has breached the bounding surface 112 of the XR affordance 110 by at least the threshold amount 140. In some implementations, the collider object tracker 230 determines whether the collider object has penetrated the bounding surface of the XR affordance by at least the threshold amount 232. In some implementations, the collider object tracker 230 determines whether a length of a portion of the collider object that has breached the bounding surface of the XR affordance exceeds the threshold amount 232.

In various implementations, the collider object tracker 230 generates an affordance selection indication 234 to indicate that the collider object has breached the bounding surface of the XR affordance by the threshold amount 232. The collider object tracker 230 generates the affordance selection indication 234 in response to determining that the collider object has breached the bounding surface of the XR affordance by at least the threshold amount 232. The collider object tracker 230 provides the affordance selection indication 234 to the XR environment renderer 220.

In some implementations, the collider object tracker 230 determines a size of the collider object. In some implementations, the collider object tracker 230 determines the size of the collider object based on a target selection speed. In some implementations, the collider object tracker 230 increases the size of the collider object in response to a user request to decrease the target selection speed. For example, in some implementations, the collider object tracker 230 generates the enlarged collider object 120' shown in Figure H. In some implementations, the collider object tracker 230 decreases the size of the collider object in response to a user request to increase the target selection speed. For example, in some implementations, the collider object tracker 230 generates the miniature collider object 120" shown in FIG. 1J.

In some implementations, the XR environment renderer 220 displays a selection indication 224 to indicate that the XR affordance has been selected. For example, in some implementations, the XR environment renderer 220 displays the selection indication 154 shown in FIG. 1F. In some implementations, the XR environment renderer 220 outputs a sound (e.g., the sound 156 shown in FIG. 1F) to indicate that the XR affordance has been selected.

In various implementations, the threshold amount determiner 240 determines the threshold amount 232. In some implementations, the threshold amount determiner 240 determines the threshold amount 232 based on the user input data 212. For example, in some implementations, the user specifies the threshold amount 232. In some implementations, the threshold amount determiner 240 determines the threshold amount 232 based on the usage data 214. For example, the threshold amount determiner 240 sets the threshold amount 232 to a relatively high value or increases the threshold amount 232 when the usage data 214 indicates an excessive number of selections have been canceled or undone which is indicative of an excessive number of inadvertent selections.

In some implementations, the threshold amount 232 indicates an amount of time (e.g., a time period, for example, 200 milliseconds or 0.5 seconds). In such implementations, the collider object tracker 230 determines whether the collider object has breached the bounding surface of the XR affordance for at least the amount of time indicated by the threshold amount 232. In some implementations, the collider object tracker 230 determines that the XR affordance has been selected and generates the affordance selection indication 234 in response to the collider object breaching the bounding surface of the XR affordance for at least the amount of time indicated by the threshold amount 232.

Figure 3A:
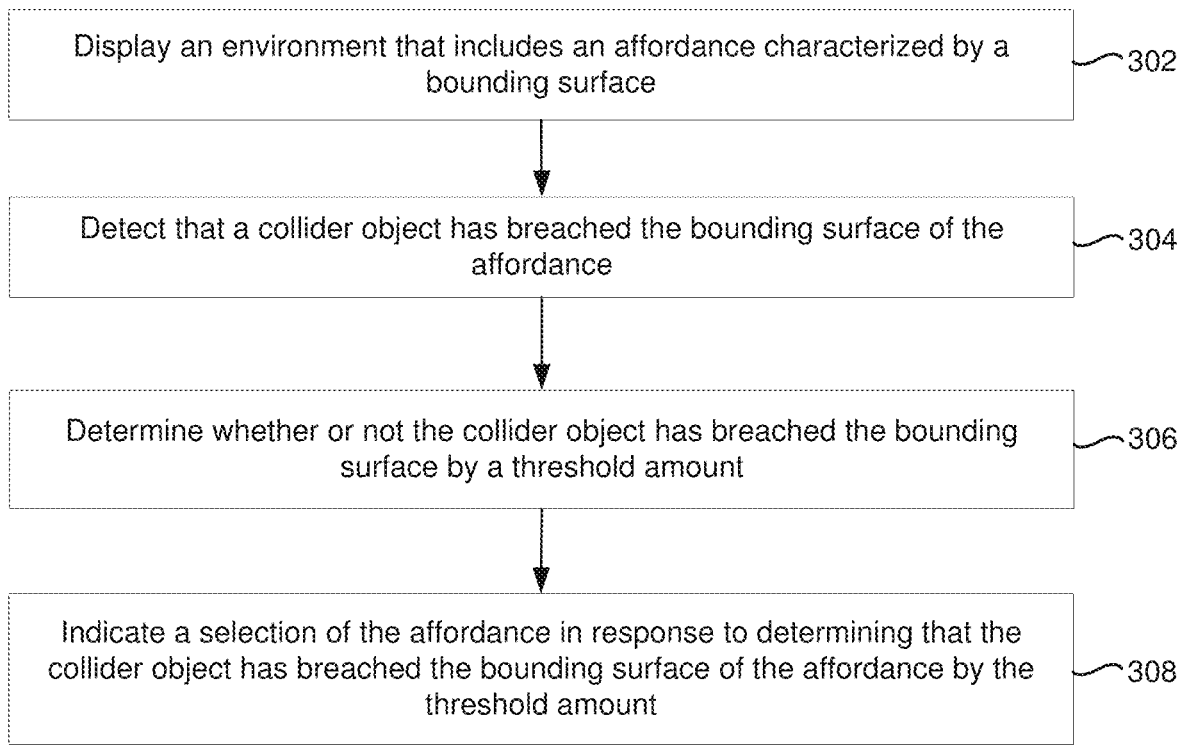
FIGS. 3A-3C are flowchart representations of a method of selecting an XR affordance in accordance with some implementations.

FIG. 3A is a flowchart representation of a method 300 for selecting an XR affordance. In various implementations, the method 300 is performed by a device with a display, a non-transitory memory and one or more processors coupled with the display and the non-transitory memory (e.g., the electronic device 20 shown in FIGS. 1A-1G and/or the system 200 shown in FIG. 2). In some implementations, the method 300 is performed by processing logic, including hardware, firmware, software, or a combination thereof. In some implementations, the method 300 is performed by a processor executing code stored in a non-transitory computer-readable medium (e.g., a memory).

As represented by block 302, in various implementations, the method 300 includes displaying an XR environment that includes an XR affordance characterized by a bounding surface. For example, as shown in FIG. 1A, the electronic device 20 displays the XR environment 100 that includes the XR affordance 110 characterized by the bounding surface 112. As shown in FIG. 2, in some implementations, the XR environment renderer 220 displays the XR environment 222 (e.g., the XR environment 100 shown in FIG. 1A).

As represented by block 304, in various implementations, the method 300 includes detecting that a collider object has breached the bounding surface of the XR affordance. For example, as shown in FIG. 1E, the electronic device 20 determines that the collider object 120 has breached the bounding surface 112 of the XR affordance 110. As described in relation to FIG. 2, in some implementations, the collider object tracker 230 tracks a position of the collider object and determines whether the collider object has breached the bounding surface of the XR affordance. In some implementations, the method 300 includes determining whether the collider object has penetrated the bounding surface of the XR affordance. In some implementations, the method 300 includes determining whether the collider object has punctured the bounding surface of the XR affordance.

As represented by block 306, in various implementations, the method 300 includes determining whether or not the collider object has breached the bounding surface of the XR affordance by a threshold amount. For example, referring to FIG. 1E, the electronic device 20 determines whether or not the collider object 120 has breached the bounding surface 112 of the XR affordance 110 by the threshold amount 140. In some implementations, the method 300 includes determining whether or not a length of a portion of the collider object that has penetrated the bounding surface exceeds a threshold distance represented by the threshold amount. In some implementations, the method 300 includes determining whether or not the collider object has penetrated the bounding surface for a threshold amount of time represented by the threshold amount.

As represented by block 308, in various implementations, the method 300 includes indicating a selection of the XR affordance in response to determining that the collider object has breached the bounding surface of the XR affordance by the threshold amount. For example, as shown in FIG. 1F, the electronic device 20 displays the selection indication 154 and plays the sound 156 to indicate that the XR affordance 110 has been selected. More generally, in various implementations, the method 300 includes performing an operation associated with the XR affordance. For example, in some implementations, the method 300 includes displaying a screen (e.g., a user interface) associated with the XR affordance. In various implementations, registering an activation of the XR affordance in response to the collider object breaching the bounding surface by the threshold amount tends to reduce a number of false activations of the XR affordance thereby enhancing a user experience of the device and improving the operability of the device.

Figure 3B:
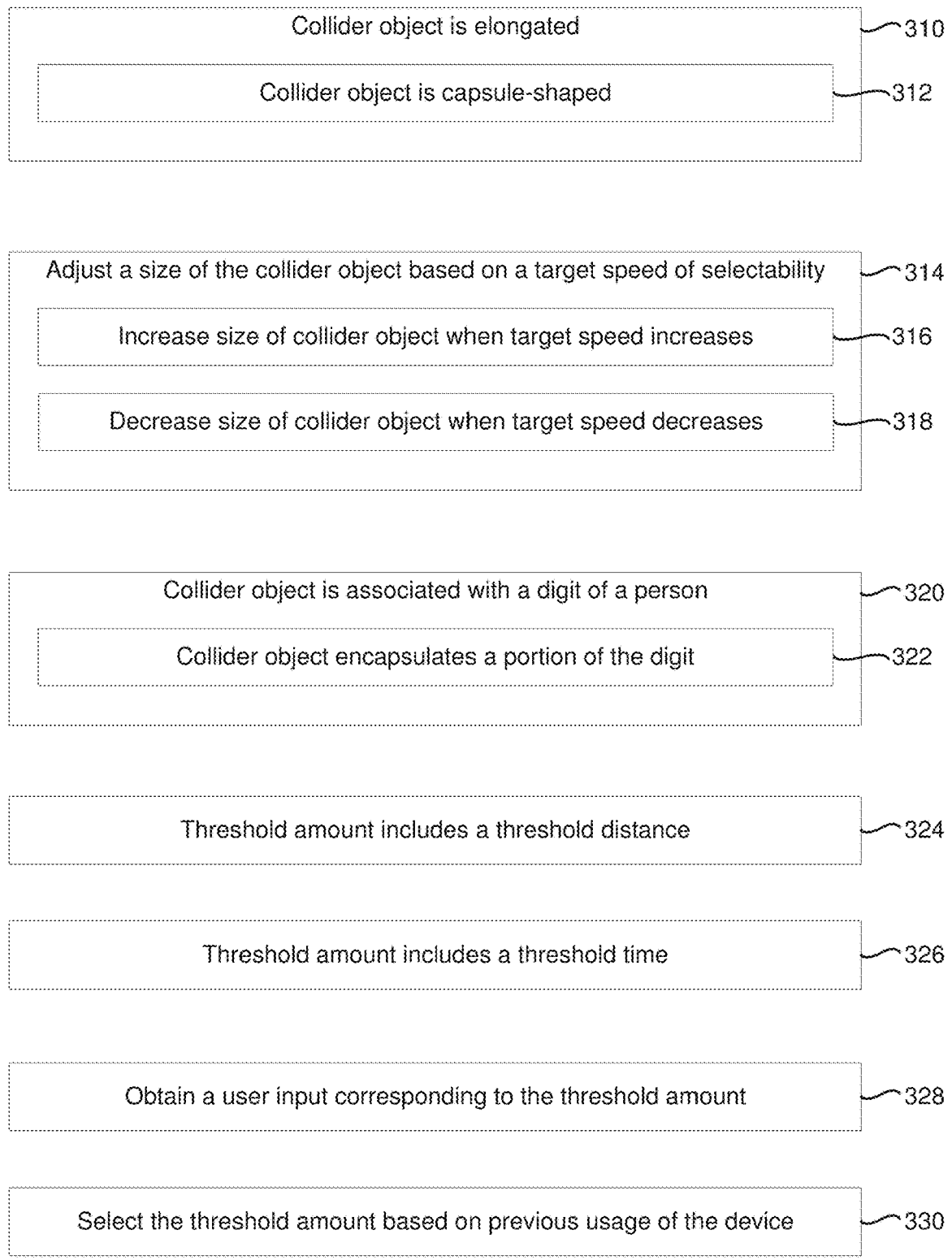

Referring to FIG. 3B, as represented by block 310, in some implementations, the collider object is elongated. As represented by block 312, in some implementations, the collider object is capsule-shaped. For example, as shown in FIG. 1B, the collider object 120 is in the shape of a capsule.

As represented by block 314, in some implementations, the method 300 includes adjusting a size of the collider object based on a target speed of selectability. For example, as shown in FIGS. 1H-1J, the electronic device 20 adjusts a size of the collider object 120 based on a target speed of selectability. Adjusting the size of the collider object enhances a user experience of the device by allowing the user to select XR affordances with different speeds.

As represented by block 316, in some implementations, the method 300 includes increasing the size of the collider object in response to an increase in the target speed of selectability. For example, as shown in FIG. 1I, the electronic device 20 increases the size of the collider object 120 in order to generate the enlarged collider object 120' with the size C2. In some implementations, increasing the size of the collider object makes it easier for the user to select XR affordances thereby improving an operability of the device and enhancing the user experience of the device.

As represented by block 318, in some implementations, the method 300 includes decreasing the size of the collider object in response to a decrease in the target speed of selectability. For example, as shown in FIG. 1J, the electronic device 20 decreases the size of the collider object 120 in order to generate the miniature collider object 120" with the size C3. In some implementations, decreasing the size of the collider object tends to improve a precision with which the user is able to select XR affordances thereby improving an operability of the device and enhancing the user experience of the device.

As represented by block 320, in some implementations, the collider object is associated with a digit (e.g., a finger or a thumb) of a person. As represented by block 322, in some implementations, the collider object encapsulates a portion of the digit. For example, as shown in FIG. 1B, the collider object 120 encapsulates a finger represented by the XR finger 130.

As represented by block 324, in some implementations, the method 300 includes determining whether a length of a portion of the collider object that breached the bounding surface is greater than or equal to a threshold distance. For example, as shown in FIG. 1E, the electronic device 20 determines whether the amount of breach 152 is greater than or equal to the threshold amount 140. In the example of FIG. 1E, the amount of breach 152 corresponds to a length of a portion of the collider object 120 that has breached the bounding surface 112 of the XR affordance 110, and the threshold amount 140 represents a threshold distance.

As represented by block 326, in some implementations, the method 300 includes determining whether a portion of the collider object has breached the bounding surface for at least a threshold time. With reference to FIG. 1E, in some implementations, the threshold amount 140 represents an amount of time, and the electronic device 20 determines whether or not the collider object 120 has breached the bounding surface 112 of the XR affordance 110 for at least the amount of time represented by the threshold amount 140. Forgoing selection of the XR affordance until the collider object has breached the bounding surface of the XR affordance for at least the threshold time tends to reduce a number of inadvertent selections of the XR affordance.

As represented by block 328, in some implementations, the method 300 includes obtaining a user input corresponding to the threshold amount. For example, as described in relation to FIG. 2, in some implementations, the user input data 212 indicates a value for the threshold amount. As illustrated in FIGS. 1K-1M, in some implementations, the method 300 includes determining the threshold amount based on a user input setting a target speed of selectability for XR affordances.

As represented by block 330, in some implementations, the method 300 includes selecting the threshold amount based on previous usage of the device. For example, as described in FIG. 2, in some implementations, the threshold amount determiner 240 determines the threshold amount 232 based on the usage data 214. In some implementations, the method 300 includes increasing the threshold amount in response to the previous usage of the device indicating a number of canceled selections that exceeds a cancelation threshold (e.g., increasing the threshold amount in response to the number of canceled selections exceeding fifty percent of all selections).

Figure 3C:
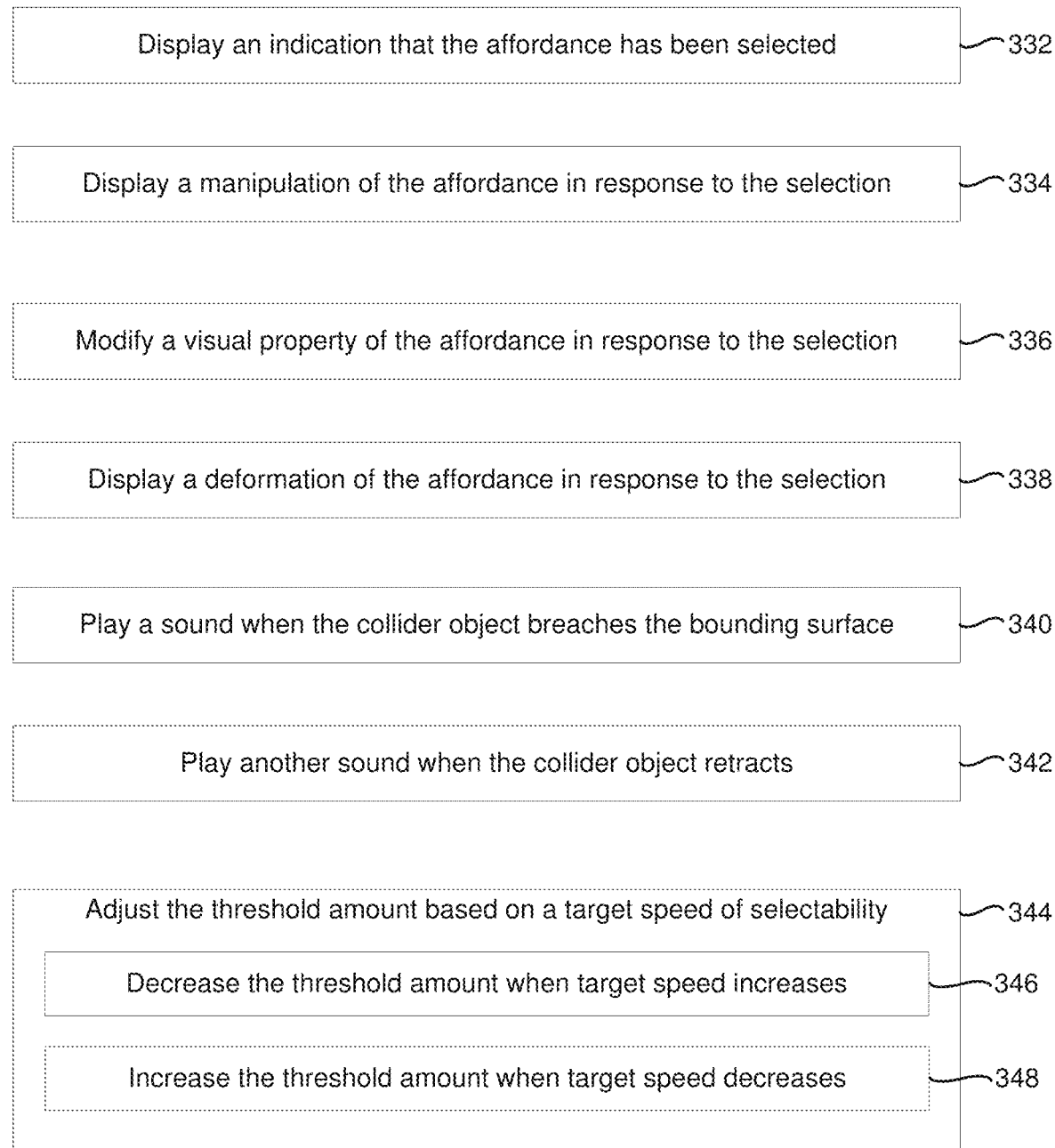

Referring to FIG. 3C, as represented by block 332, in some implementations, the method 300 includes displaying an indication that the XR affordance has been selected. For example, as shown in FIG. 1F, the electronic device 20 displays the selection indication 154 to indicate that the XR affordance 110 has been selected. In some implementations, the method 300 includes displaying a screen that corresponds to the XR affordance as an indication that the XR affordance has been selected. For example, as shown in FIG. 1G, the electronic device 20 displays the configuration panel 160 that corresponds to the XR affordance 110.

As represented by block 334, in some implementations, the method 300 includes displaying a manipulation of the XR affordance in response to the selection of the XR affordance in order to indicate the selection of the XR affordance. For example, as shown in FIG. 1O, in some implementations, the electronic device 20 modifies the XR affordance 110 in order to generate the modified XR affordance 110" that indicates a selection of the XR affordance 110.

As represented by block 336, in some implementations, the method 300 includes modifying a visual property of the XR affordance in response to the selection of the XR affordance in order to indicate the selection of the XR affordance. In some implementations, the method 300 includes changing a color of the XR affordance to indicate the selection of the XR affordance. In some implementations, the method 300 includes changing a font of text within the XR affordance to indicate the selection of the XR affordance. For example, as shown in FIG. 1O, the electronic device 20 displays the squished text 114' to indicate that the XR affordance 110 has been selected. In some implementations, the method 300 includes rendering the XR affordance unselectable in order to indicate that the XR affordance has already been selected.

As represented by block 338, in some implementations, the method 300 includes displaying a deformation of the XR affordance in response to the selection of the XR affordance in order to indicate the selection of the XR affordance. In some implementations, the method 300 includes displaying a depression in the bounding surface of the XR affordance to indicate the selection of the XR affordance.

As represented by block 340, in some implementations, the method 300 includes playing a sound in response to determining that the collider object has breached the bounding surface of the XR affordance. For example, as shown in FIG. 1C, in some implementations, the electronic device 20 plays the sound 132 when the collider object 120 touches the bounding surface 112 of the XR affordance 110.

As represented by block 342, in some implementations, the method 300 includes determining that the collider object has retracted from the bounding surface of the XR affordance, and playing another sound in response to determining that the collider object has retracted from the bounding surface of the XR affordance. In some implementations, the method 300 includes playing the sound when the user retracts his/her finger away from the XR affordance.

As represented by block 344, in some implementations, the method 300 includes adjusting the threshold amount based on a target speed of selectability. For example, as shown in FIGS. 1K-1M, the electronic device 20 adjusts a size of the threshold amount 140 based on a target speed of selectability. Adjusting the size of the threshold amount enhances a user experience of the device by allowing the user to select XR affordances with different speeds.

As represented by block 346, in some implementations, the method 300 includes decreasing the threshold amount in response to an increase in the target speed of selectability. For example, as shown in FIG. 1L, the electronic device 20 decreases the size of the threshold amount 140 in order to generate the reduced threshold amount 140' with the size T2.

In some implementations, decreasing the size of the threshold amount makes it easier for the user to select XR affordances thereby improving an operability of the device and enhancing the user experience of the device.

As represented by block 348, in some implementations, the method 300 includes increasing the threshold amount in response to a decrease in the target speed of selectability. For example, as shown in FIG. 1M, the electronic device 20 increases the size of the threshold amount 140 in order to generate the enlarged threshold amount 140" with the size T3. In some implementations, increasing the size of the threshold amount tends to reduce a number of inadvertent activations of XR affordances thereby improving an operability of the device and enhancing the user experience of the device.

Figure 4:
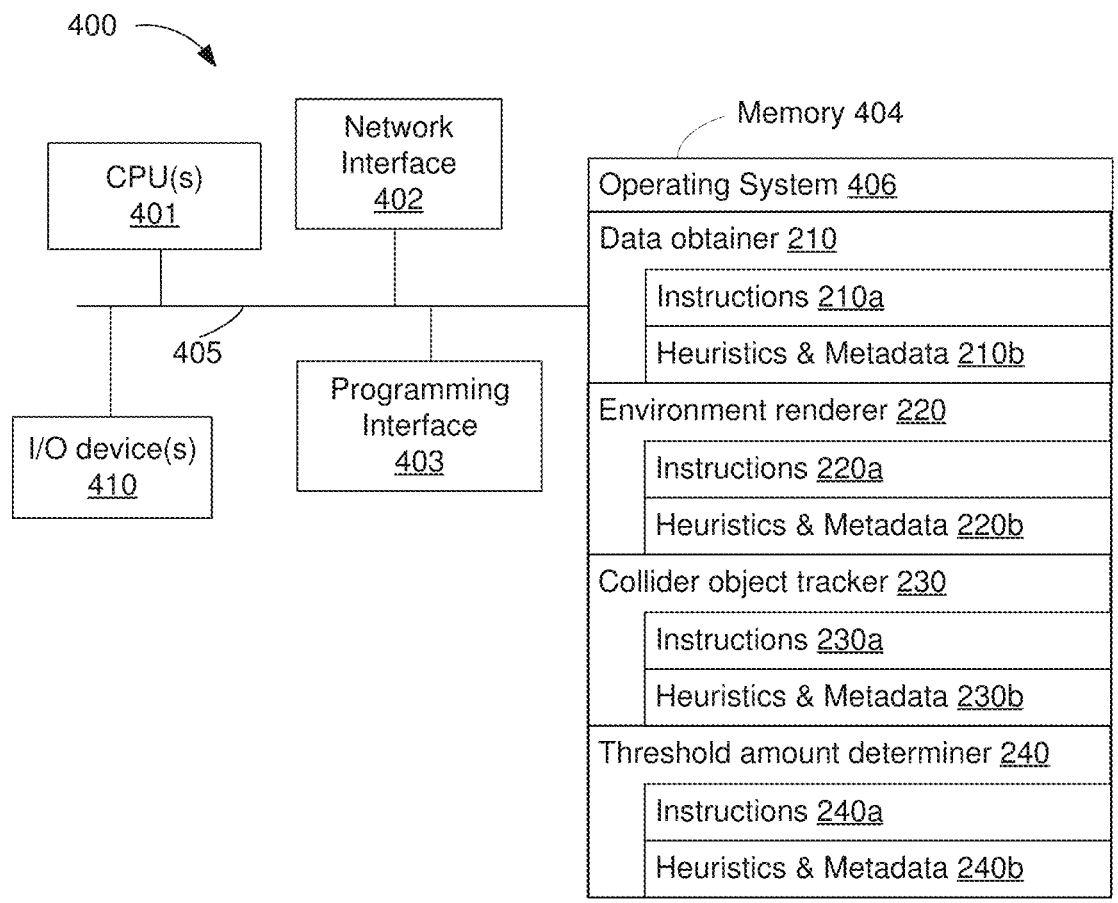
FIG. 4 is a block diagram of a device that allows a user to select an XR affordance in accordance with some implementations.

FIG. 4 is a block diagram of a device 400 enabled with one or more components for allowing a user to select XR affordances. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 400 includes one or more processing units (CPUs) 401, a network interface 402, a programming interface 403, a memory 404, one or more input/output (I/O) devices 410, and one or more communication buses 405 for interconnecting these and various other components.

In some implementations, the network interface 402 is provided to, among other uses, establish and maintain a metadata tunnel between a cloud hosted network management system and at least one private network including one or more compliant devices. In some implementations, the one or more communication buses 405 include circuitry that interconnects and controls communications between system components. The memory 404 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 404 optionally includes one or more storage devices remotely located from the one or more CPUs 401. The memory 404 comprises a non-transitory computer readable storage medium.

In some implementations, the memory 404 or the non-transitory computer readable storage medium of the memory 404 stores the following programs, modules and data structures, or a subset thereof including an optional operating system 406, the data obtainer 210, the XR environment renderer 220, the collider object tracker 230 and the threshold amount determiner 240. In various implementations, the device 400 performs the method 300 shown in FIGS. 3A-3C.

In some implementations, the data obtainer 210 obtains user input data that indicates a position of a digit of a person. To that end, the data obtainer 210 includes instructions 210a, and heuristics and metadata 210b. In some implementations, the XR environment renderer 220 renders an XR environment. To that end, the XR environment renderer 220 includes instructions 220a, and heuristics and metadata 220b. In some implementations, the collider object tracker 230 tracks a position of a collider object associated with the digit of the person. As described herein, in some implementations, the collider object tracker 230 determines whether or not a collider object has breached a bounding surface of an XR affordance by a threshold amount. To that end, the collider object tracker 230 includes instructions 230a, and heuristics and metadata 230b. In some implementations, the threshold amount determiner 240 determines the threshold amount. To that end, the threshold amount determiner 240 includes instructions 240a, and heuristics and metadata 240b.

In some implementations, the one or more I/O devices 410 include an environmental sensor for capturing environmental data. In some implementations, the one or more I/O devices 410 include an image sensor (e.g., a camera) for capturing image data (e.g., a set of one or more images). In some implementations, the one or more I/O devices 410 include a microphone for capturing sound data. In some implementations, the one or more I/O devices 410 include a display for displaying content (e.g., a graphical environment, for example, an XR environment). In some implementations, the one or more I/O devices 410 include a speaker for outputting audio content. In some implementations, the one or more I/O devices 410 include a haptic device for providing haptic responses. In some implementations, the haptic device includes a vibrational device that generates vibrations. In some implementations, the haptic device includes a motor with an unbalanced load for generating vibrations.

In various implementations, the one or more I/O devices 410 include a video pass-through display which displays at least a portion of a physical environment surrounding the device 400 as an image captured by a scene camera. In various implementations, the one or more I/O devices 410 include an optical see-through display which is at least partially transparent and passes light emitted by or reflected off the physical environment.

In an XR environment, it is often difficult for a user to perceive depth. Lack of depth perception can make it difficult for a user to ascertain how far the user's finger is from a selectable portion of an XR surface. Because it is difficult to assess how far a particular XR surface is, the user sometimes overreaches and inadvertently activates the selectable portion of the XR surface. The lack of depth perception sometimes causes the user to underreach and fail in activating the selectable portion of the XR surface. Additionally, when the XR surface is an XR plane that is not associated with an object, then it can be even more difficult for the user to assess how far the XR surface is. Moreover, when the XR environment includes multiple XR surfaces with respective selectable portions, the user may have difficulty in ascertaining which XR surface is closer and which XR surface is farther.

The present disclosure provides methods, systems, and/or devices for indicating a distance to a selectable portion of an XR surface. When an XR environment includes an XR surface with a selectable portion, the device associates a collider object with a digit of the user. As described herein, a touch event can be registered when the collider object penetrates the selectable portion of the XR surface by a threshold amount. The device displays a depth indicator to indicate a distance between the collider object and the selectable portion of the XR surface. The device varies a visual property of the depth indicator based on the distance between the collider object and the selectable portion of the XR surface. Because the visual property of the depth indicator changes based on the distance between the collider object and the selectable portion of the XR surface, the depth indicator provides an indication to the user of how far the user's finger is from the selectable portion of the XR surface. Displaying the depth indicator enhances a functionality of the device by increasing the user's depth perception in XR environments. Increasing the user's depth perception improves a user experience of the device.

Figure 5A:
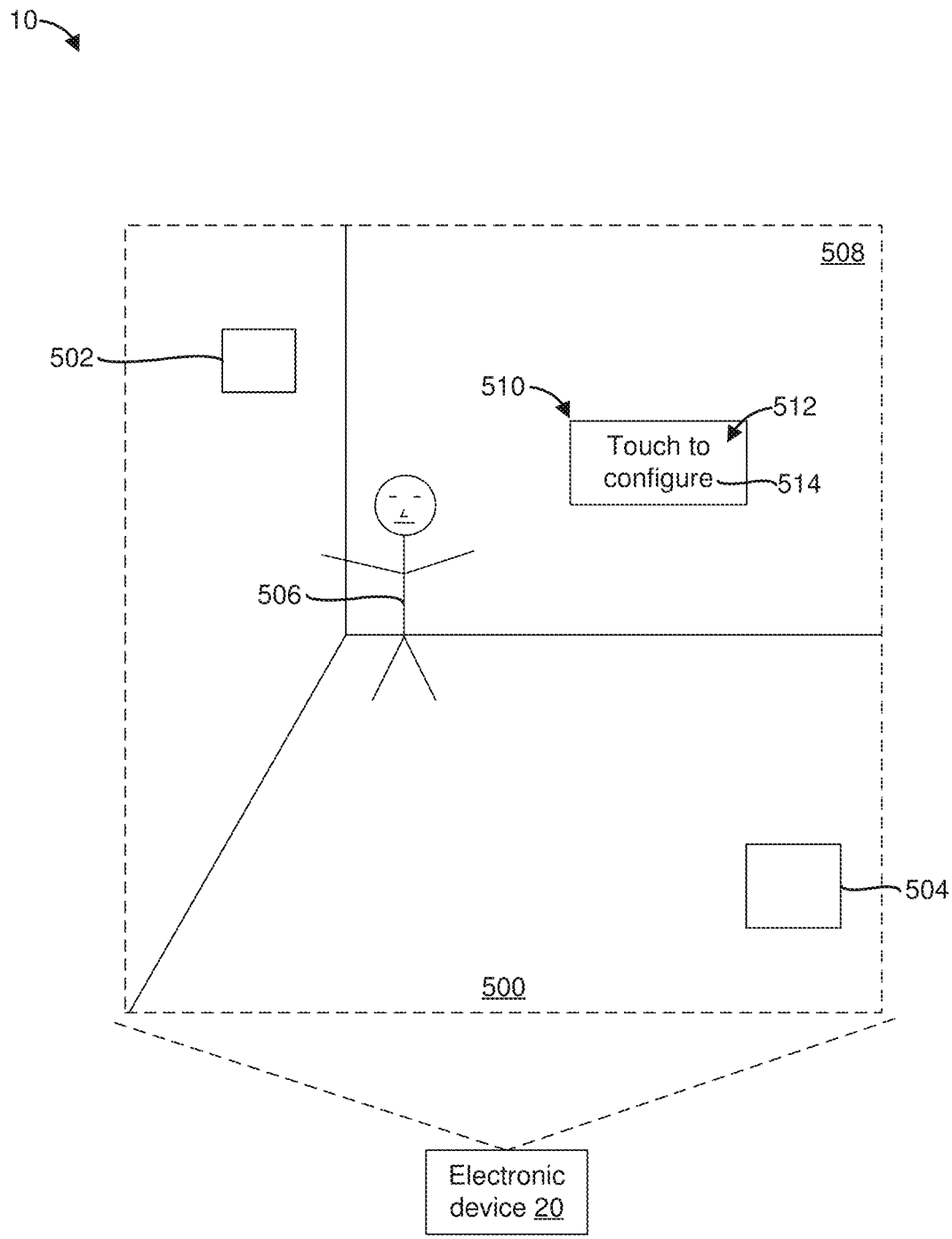
FIGS. 5A-5K are diagrams of an example user interface for indicating a distance to an XR surface in accordance with some implementations.

FIG. 5A illustrates an example XR environment 500. In some implementations, the XR environment 500 is referred to as a graphical environment. In some implementations, the XR environment 500 includes various XR objects. In some implementations, the XR objects are referred to as graphical objects. In the example of FIG. 5A, the XR environment 500 includes an XR drone 502, an XR robot 504 and an XR person 506. In some implementations, the XR objects are XR representations of physical articles from a physical environment. For example, in some implementations, the XR drone 502 is an XR representation of a physical drone, the XR robot 504 is an XR representation of a physical robot, and the XR person 506 is an XR representation of a physical person (e.g., a user of the electronic device 20).

In some implementations, the XR environment 500 includes one or more XR surfaces. In some implementations, the XR surfaces include virtual surfaces (e.g., non-tangible surfaces). In the example of FIG. 5A, the XR environment 500 includes an XR surface 508 that represents an XR wall. The XR surface 508 includes a portion that is selectable. In the example of FIG. 5A, the selectable portion of the XR surface 508 is an XR affordance 510. The XR affordance 510 allows a user of the electronic device 20 to configure the XR environment 500. For example, the XR affordance 510 allows the user of the electronic device 20 to add and/or remove XR objects to/from the XR environment 500. The XR affordance 510 includes a bounding surface 512 that defines a planar boundary for the XR affordance 510. In the example of FIG. 5A, the bounding surface 512 coincides with the XR surface 508. In some implementations, the XR affordance 510 includes text 514, an image (not shown) and/or a graphic.

In the example of FIG. 5A, the XR surface 508 represents an XR wall with defined dimensions. In some implementations, the XR surface 508 includes an XR plane that extends indefinitely. In some implementations, the XR surface 508 represents a surface of an XR object. In the example of FIG. 5A, the XR surface 508 is visible. However, in some implementations, the XR surface 508 is invisible, for example, transparent or translucent.

Figure 5B:
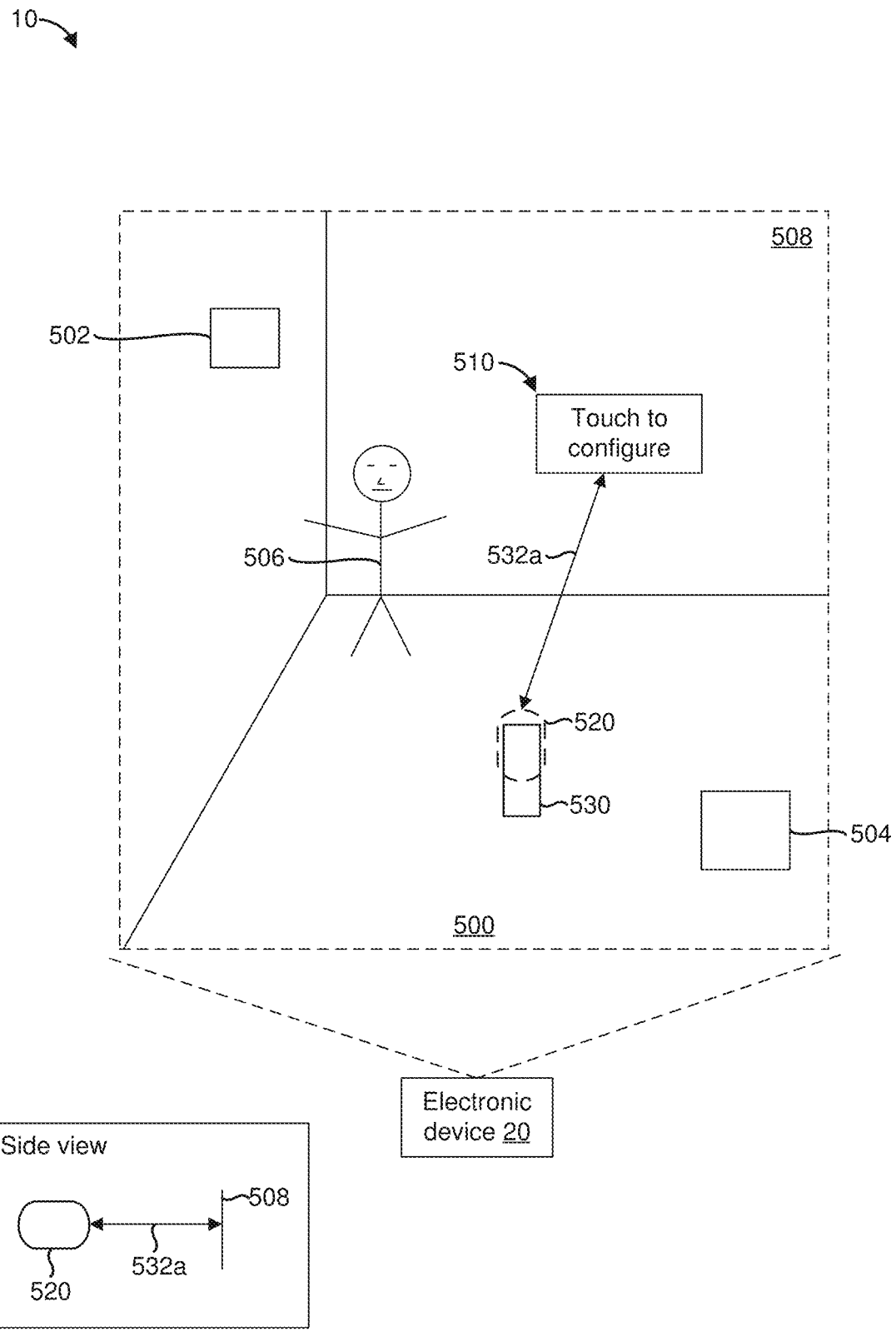

FIG. 5B illustrates a collider object 520 moving towards the XR affordance 510. In the example of FIG. 5B, the collider object 120 is associated with a digit of a person. For example, the collider object 520 encapsulates (e.g., wraps around) a portion of a finger of a user of the electronic device 20. In some implementations, the electronic device 20 displays an XR finger 530 that represents the finger of the user. As illustrated in FIG. 5B, the collider object 520 is a first distance 532a from the XR affordance 510. As such, in the example of FIG. 5B, the XR affordance 510 has not been activated.

Figure 5C:
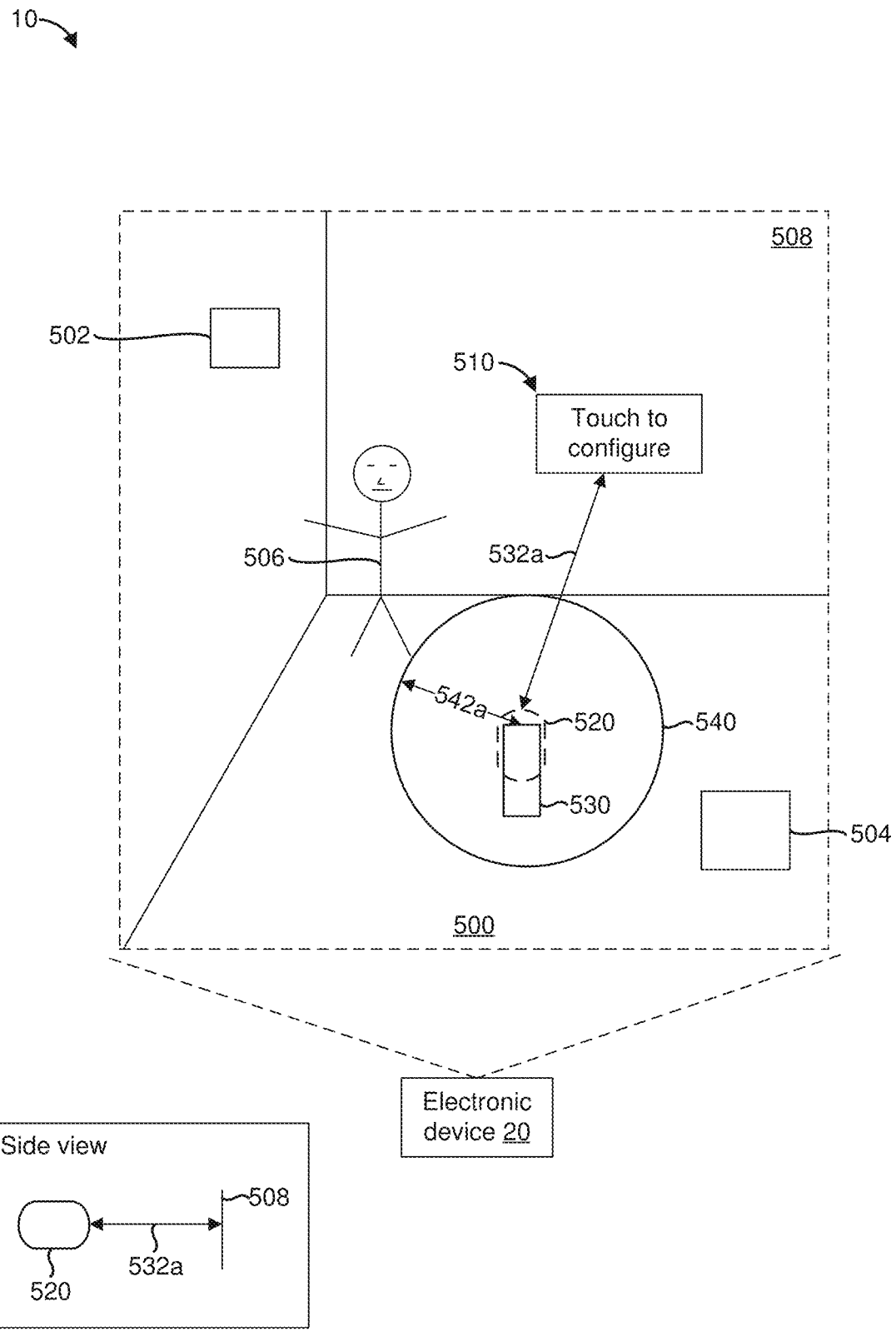

As illustrated in FIG. 5C, in various implementations, the electronic device 20 displays a depth indicator 540 in association with the collider object 520 in order to indicate the first distance 532a between the collider object 520 and the XR affordance 510. In the example of FIG. 5C, the depth indicator 540 is a circle that encapsulates (e.g., surrounds) the collider object 520 and/or a portion of the XR finger 530. In some implementations, the electronic device 20 displays the depth indicator 540 proximate to (e.g., adjacent to) the XR finger 530. In some implementations, the electronic device 20 displays the depth indicator 540 proximate to the XR affordance 510.

In various implementations, the electronic device 20 selects a visual property of the depth indicator 540 based on the first distance 532a between the collider object 520 and the XR affordance 510. In some implementations, the electronic device 20 selects a size of the depth indicator 540 based on the first distance 532a between the collider object 520 and the XR affordance 510. In the example of FIG. 5C, the electronic device 20 assigns a first size 542a to the depth indicator 540 based on the first distance 532a. The first size 542a is a function of the first distance 532a. In the example of FIG. 5C, the first size 542a represents a first radius of the depth indicator 540.

Figure 5D:
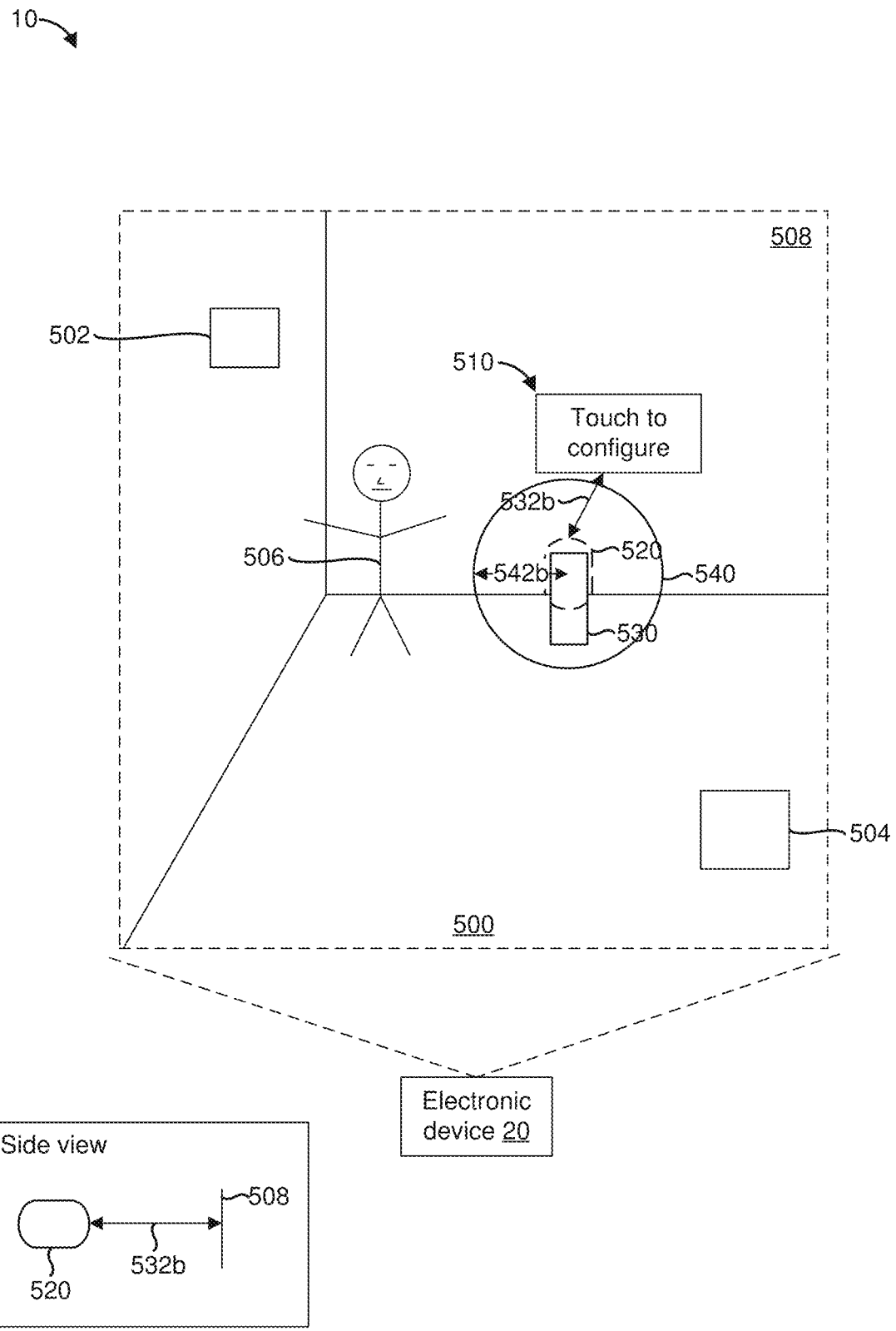

As illustrated in FIG. 5D, the collider object 520 has moved such that a distance from the collider object 520 to the XR affordance 510 has reduced from the first distance 532a to a second distance 532b. The electronic device 20 modifies the visual property of the depth indicator 540 based on the second distance 532b. In the example of FIG. 5D, the electronic device 20 reduces a size of the depth indicator 540 from the first size 542a to a second size 542b. The second size 542b represents the reduced second distance 532b between the collider object 520 and the XR affordance 510. In the example of FIGS. 5C and 5D, a size of the depth indicator 540 is proportional to a distance between the collider object 520 and the XR affordance 510. For example, as the distance between the collider object 520 and the XR affordance 510 increases, the size of the depth indicator 540 increases. By contrast, as the distance between the collider object 520 and the XR affordance 510 decreases, the size of the depth indicator 540 decreases.

Figure 5E:
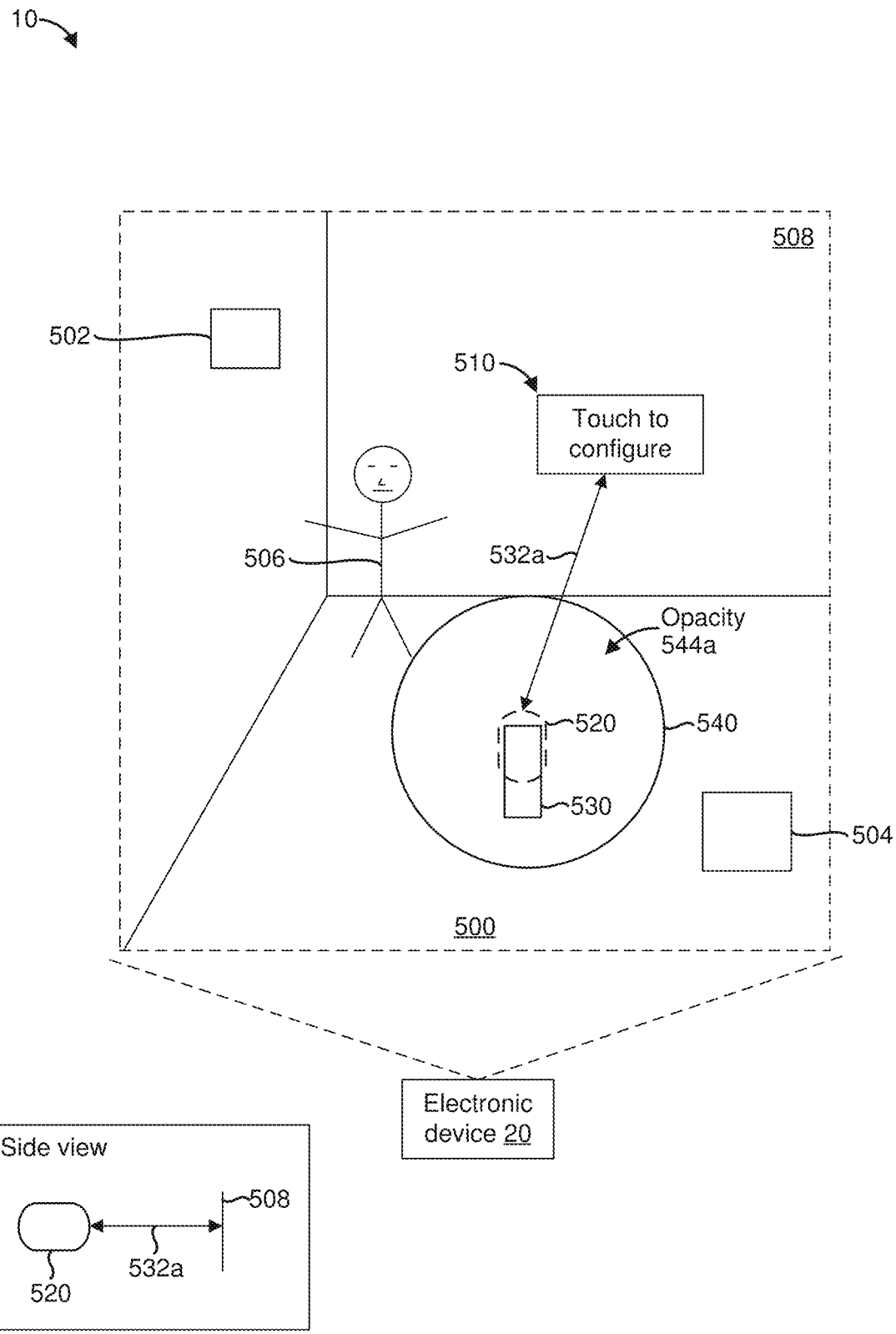
Figure 5F:
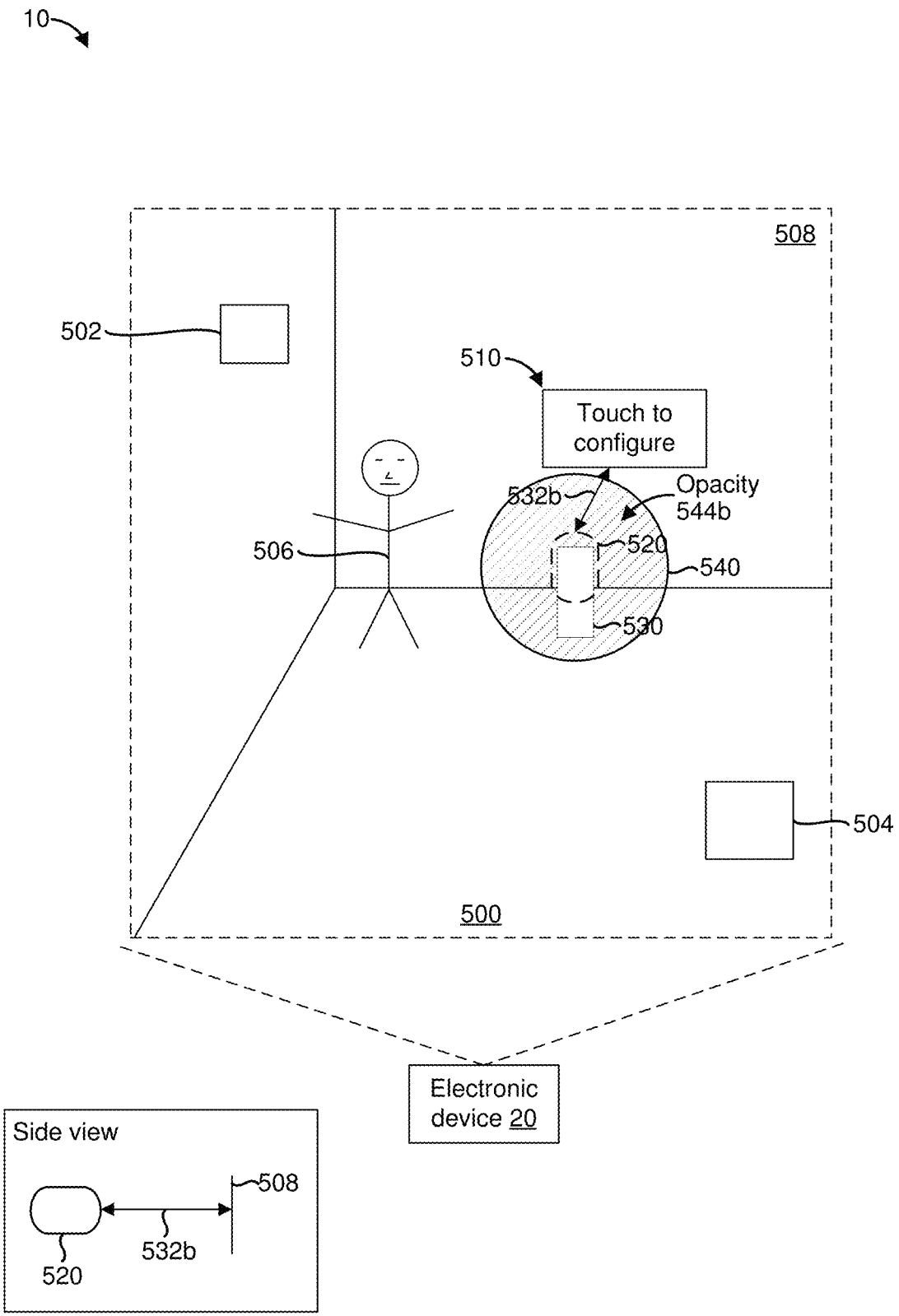

As illustrated in FIGS. 5E and 5F, in some implementations, the electronic device 20 varies an opacity (e.g., a transparency) of the depth indicator 540 based on a distance between the collider object 520 and the XR affordance 510. As illustrated in FIG. 5E, the electronic device 20 assigns a first opacity value 544a to the depth indicator 540 as a function of the first distance 532a between the collider object 520 and the XR affordance 510. In the example of FIG. 5E, the first opacity value 544a corresponds to the depth indicator 540 being clear (e.g., transparent). As illustrated in FIG. 5F, the electronic device 20 assigns a second opacity value 544b (indicated by cross-hatching) to the depth indicator 540 as a function of the second distance 532b between the collider object 520 and the XR affordance 510.

As illustrated in the example of FIGS. 5E and 5F, in some implementations, the electronic device 20 increases an opacity of the depth indicator 540 as a distance between the collider object 520 and the XR affordance 510 decreases. By contrast, in some implementations, the electronic device 20 decreases the opacity of the depth indicator 540 as the distance between the collider object 520 and the XR affordance 510 increases. In some implementations, the electronic device 20 reduces a transparency of the depth indicator 540 as the distance between the collider object 520 and the XR affordance 510 decreases. By contrast, in some implementations, the electronic device 20 increases the transparency of the depth indicator 540 as the distance between the collider object 520 and the XR affordance 510 increases.

Figure 5G:
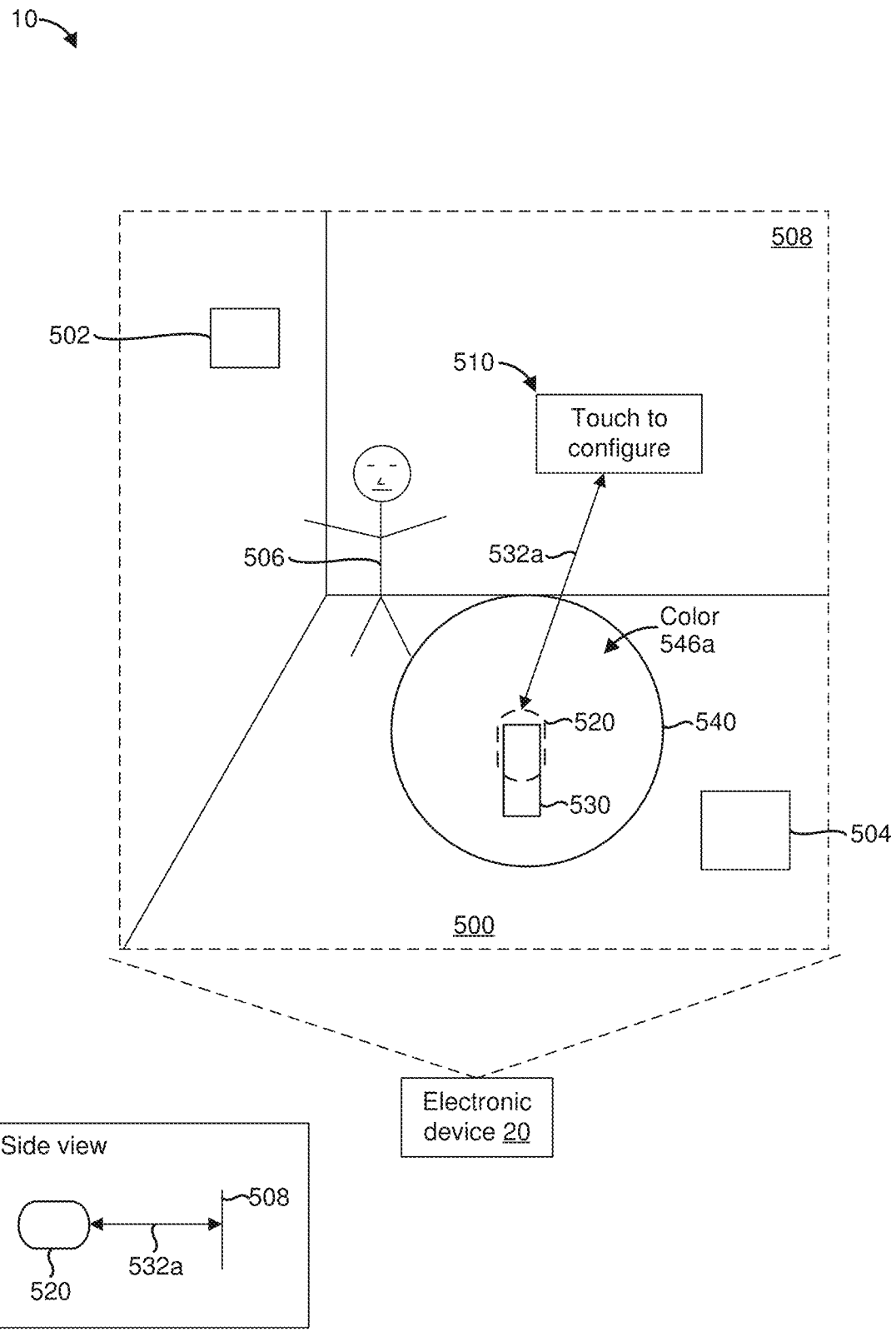
Figure 5H:
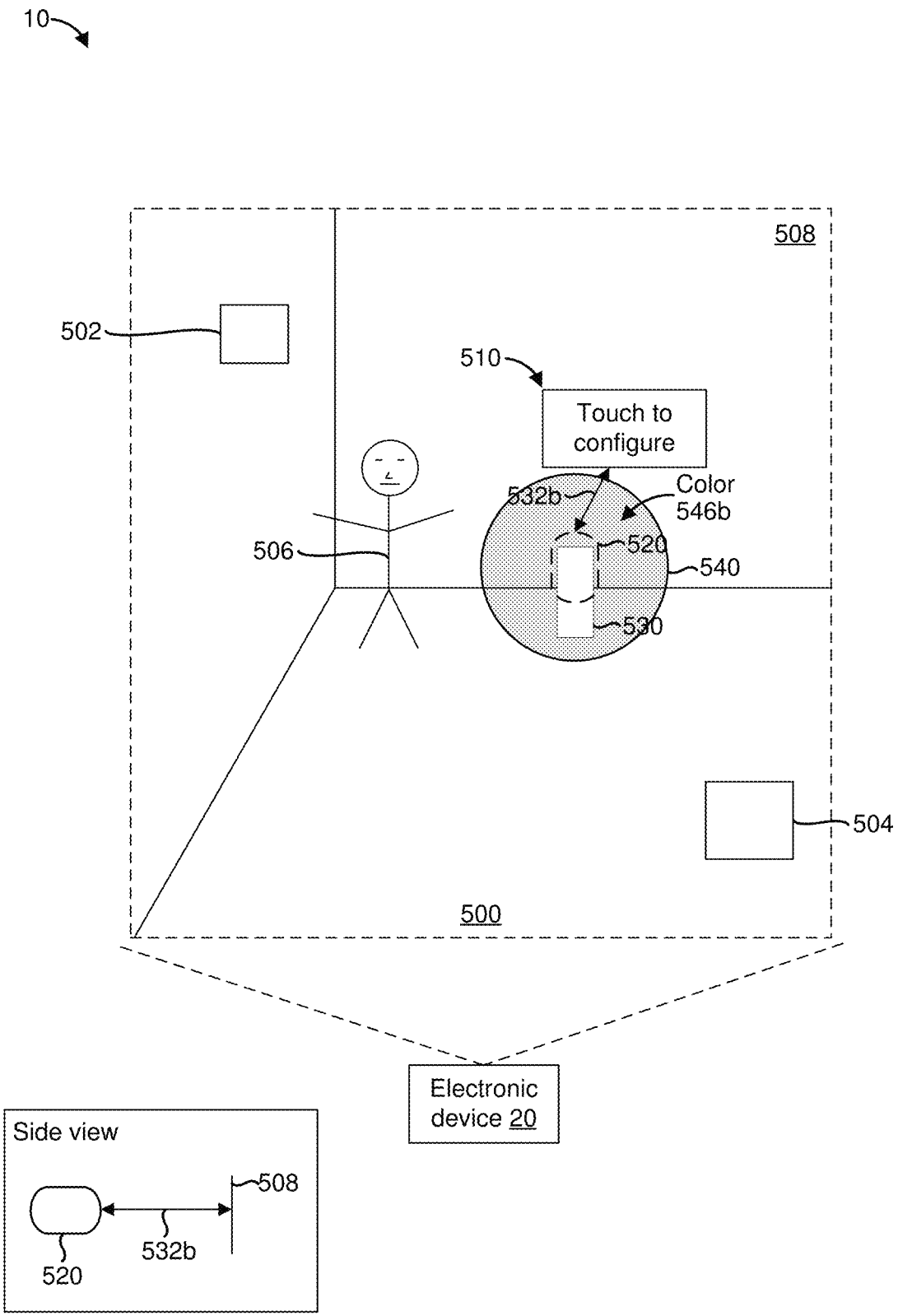

As illustrated in FIGS. 5G and 5H, in some implementations, the electronic device 20 varies a color of the depth indicator 540 based on a distance between the collider object 520 and the XR affordance 510. As illustrated in FIG. 5G, the electronic device 20 assigns a first color 546a to the depth indicator 540 as a function of the first distance 532a between the collider object 520 and the XR affordance 510. In the example of FIG. 5G, the first color 546a is a light color (e.g., as indicated by the depth indicator 540 being clear). As illustrated in FIG. 5H, the electronic device 20 assigns a second color 546b to the depth indicator 540 as a function of the second distance 532b between the collider object 520 and the XR affordance 510. In the example of FIG. 5H, the second color 546b is a dark color (e.g., as indicated by the depth indicator 540 being shaded).

As illustrated in the example of FIGS. 5G and 5H, in some implementations, the electronic device 20 darkens a color of the depth indicator 540 as a distance between the collider object 520 and the XR affordance 510 decreases. By contrast, in some implementations, the electronic device 20 lightens the color of the depth indicator 540 as the distance between the collider object 520 and the XR affordance 510 increases. In some implementations, the electronic device 20 changes the color of the depth indicator 540 in addition to or as an alternative to changing the size of the depth indicator 540 based on the distance between the collider object 520 and the XR affordance 510.

Figure 5I:
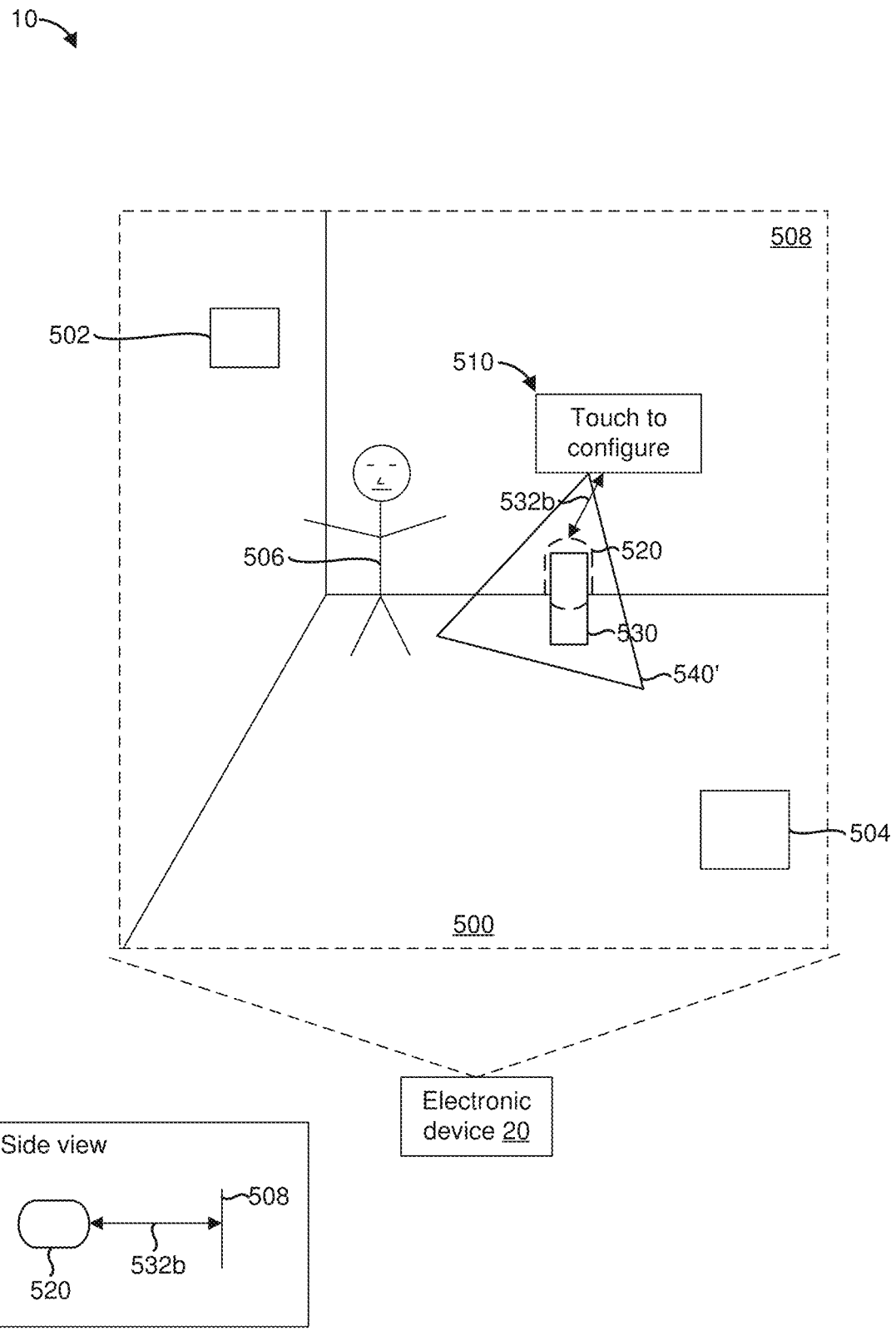

Referring to Figure 5I, in some implementations, the electronic device 20 changes a shape of the depth indicator 540 based on the distance between the collider object 520 and the XR affordance 510. In the example of FIG. 5I, the electronic device 20 has changed a shape of the depth indicator 540 from a circle to a triangle in order to display a triangular depth indicator 540'. In some implementations, the electronic device 20 changes a shape of the depth indicator 540 as the distance between the collider object 520 and the XR affordance 510 decreases in order to indicate a direction towards the XR affordance 510. For example, the triangular depth indicator 540' indicates a direction towards the XR affordance 510.

Figure 5J:
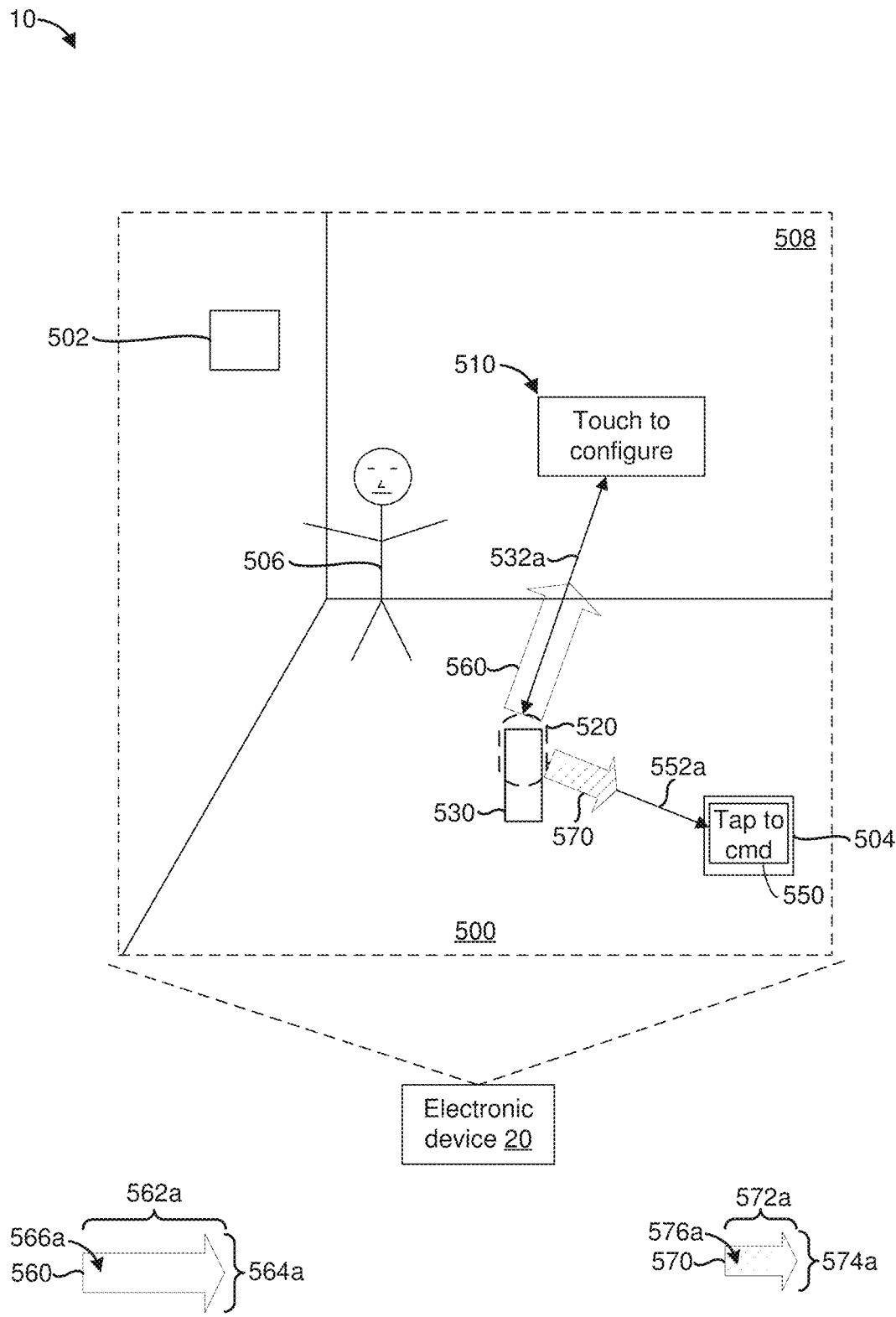
Figure 5K:
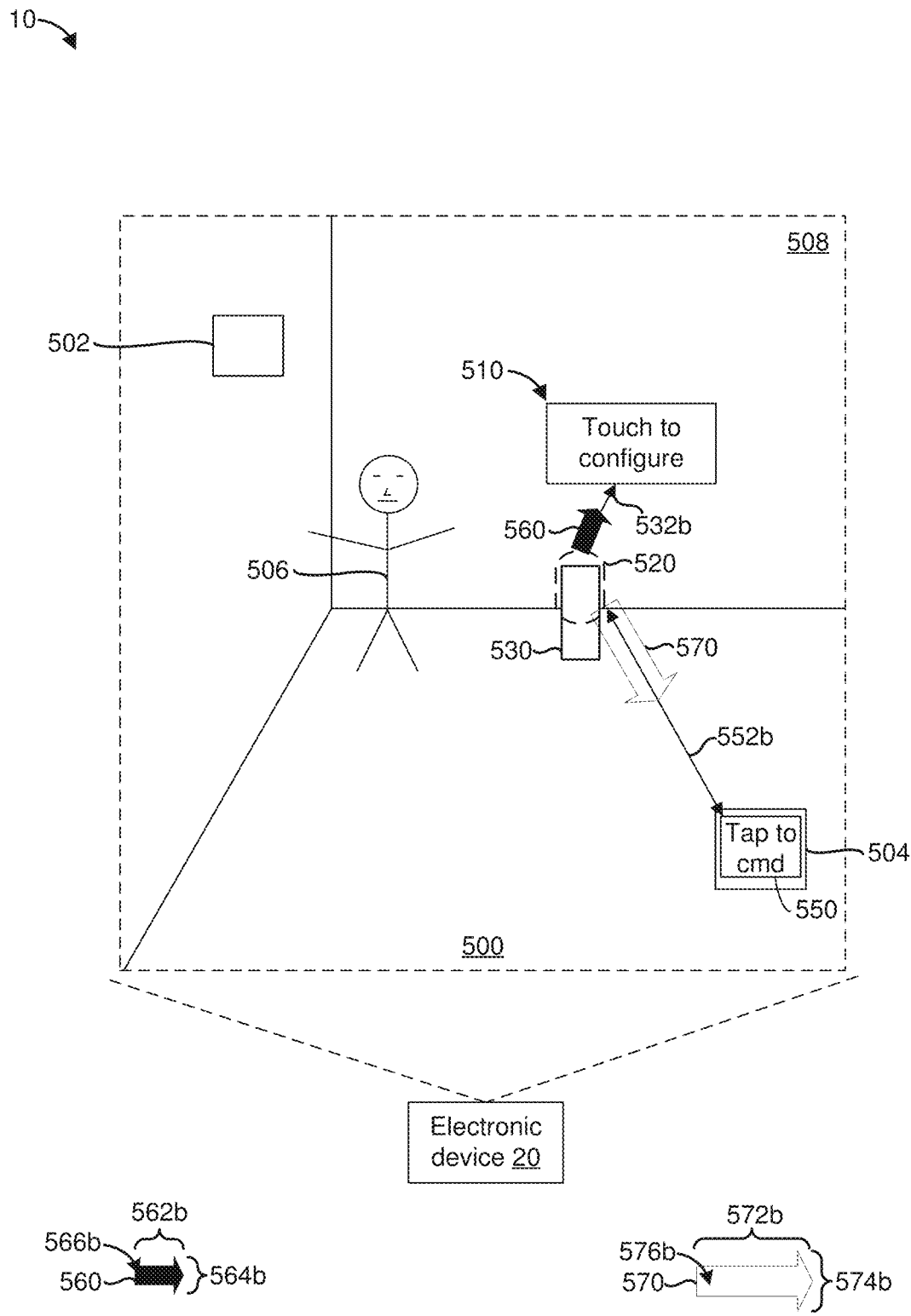

As illustrated in FIGS. 5J and 5K, in some implementations, the electronic device 20 displays multiple depth indicators that indicate respective distances to corresponding XR affordances. Referring to FIG. 5J, the XR environment 500 includes a robot affordance 550 that allows a user of the electronic device 20 to command the XR robot 504. As shown in FIG. 5J, the robot affordance 550 is composited on a surface of the XR robot 504.

In the example of FIG. 5J, the collider object 520 is a first distance 532a from the XR affordance 510 and a third distance 552a from the robot affordance 550. The electronic device 20 displays a first depth indicator 560 to indicate the first distance 532a to the XR affordance 510 and a second depth indicator 570 to indicate the third distance 552a to the robot affordance 550. The first depth indicator 560 has a first length 562a, a first width 564a and a first color 566a that are functions of the first distance 532a. The second depth indicator 570 has a second length 572a, a second width 574a and a second color 576a that are functions of the third distance 552a.

Referring to FIG. 5K, the collider object 520 has moved to a new position in which the collider object 520 is a second distance 532b from the XR affordance 510 and a fourth distance 552b from the robot affordance 550. The electronic device 20 modifies one or more visual properties of the first depth indicator 560 based on the second distance 532b. For example, the electronic device 20 changes a length of the first depth indicator 560 from the first length 562a to a third length 562b that is a function of the second distance 532b. The electronic device 20 changes a width of the first depth indicator 560 from the first width 564a to a third width 564b that is a function of the second distance 532b. The electronic device 20 changes a color of the first depth indicator 560 from a first color 566a to a third color 566b that is a function of the second distance 532b.

As illustrated in FIG. 5K, the electronic device 20 modifies one or more visual properties of the second depth indicator 570 based on the fourth distance 552b. For example, the electronic device 20 changes a length of the second depth indicator 570 from the second length 572a to a fourth length 572b that is a function of the fourth distance 552b. The electronic device 20 changes a width of the second depth indicator 570 from the second width 574a to a fourth width 574b that is a function of the fourth distance 552b. The electronic device 20 changes a color of the second depth indicator 570 from a second color 576a to a fourth color 576b that is a function of the fourth distance 552b.

In the example of FIGS. 5J and 5K, the first and second depth indicators 560 and 570 are shown proximate to (e.g., adjacent to) the collider object 520. However, in some implementations, the first and second depth indicators 560 and 570 are displayed in association with the XR affordance 510 and the robot affordance 550, respectively. For example, in some implementations, the first and second depth indicators 560 and 570 are displayed proximate to (e.g., adjacent to) the XR affordance 510 and the robot affordance 550, respectively. In some implementations, the first and second depth indicators 560 and 570 are integrated into the XR affordance 510 and the robot affordance 550, respectively.

Figure 6:
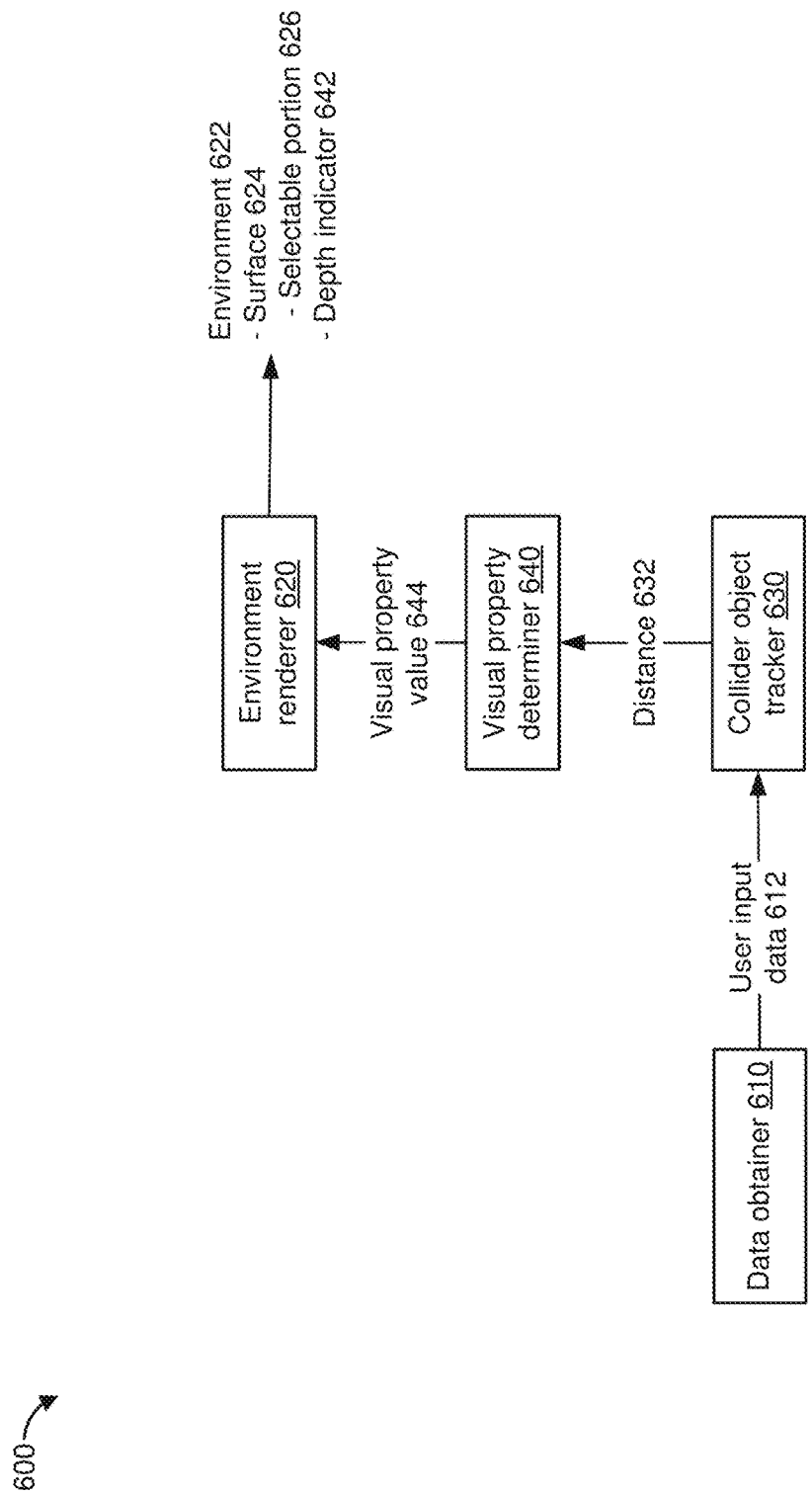
FIG. 6 is a block diagram of an example system for indicating a distance to an XR surface in accordance with some implementations.

FIG. 6 is a block diagram of an example system 600 for indicating a distance to an XR surface (e.g., a virtual surface, for example, a non-tangible surface that is not visible in a physical environment). In some implementations, the system 600 resides at the electronic device 20 shown in FIGS. 5A-5K. In various implementations, the system 600 includes a data obtainer 610, an XR environment renderer 620, a collider object tracker 630, and a visual property determiner 640.

In some implementations, the data obtainer 610 obtains user input data 612 that indicates one or more user inputs. For example, the user input data 612 indicates a position of a user's finger relative to locations that correspond to XR surfaces. In some implementations, the data obtainer 610 receives the user input data 612 from a set of one or more sensors. For example, the data obtainer 610 receives the user input data 612 from a computer vision system that includes one or more cameras. In some implementations, the user input data 612 includes images. In some implementations, the user input data 612 includes depth data. In some implementations, the data obtainer 610 provides the user input data 612 to the collider object tracker 630.

In various implementations, the XR environment renderer 620 renders (e.g., displays) an XR environment 622 (e.g., the XR environment 500 shown in FIGS. 5A-5K). In some implementations, the XR environment renderer 620 generates (e.g., synthesizes) the XR environment 622. In some implementations, the XR environment renderer 620 obtains (e.g., receives) the XR environment 622 from another device. In some implementations, the XR environment 622 includes an XR surface 624 (e.g., the XR surface 508 shown in FIG. 5A). In some implementations, the XR surface 624 includes a selectable portion 626 (e.g., an XR affordance, for example, the XR affordance 510 shown in FIG. 5A).

In various implementations, the collider object tracker 630 tracks a position of a collider object (e.g., the collider object 520 shown in FIG. 5B) based on the user input data 612. Since the collider object encapsulates a portion of a digit, in some implementations, the collider object tracker 630 tracks the collider object by tracking a position of the digit that the collider object encapsulates. In some implementations, the collider object tracker 630 determines a distance 632 between the collider object and the selectable portion 626 of the XR surface 624. For example, the collider object tracker 630 determines the first distance 532a (shown in FIG. 5B) between the collider object 520 and the XR affordance 510. The collider object tracker 630 updates the distance 632 as the collider object moves. The collider object tracker 630 provides the distance 632 to the visual property determiner 640.

In some implementations, the XR environment renderer 620 displays a depth indicator 642 to indicate the distance 632 between the collider object and the selectable portion 626 of the XR surface 624. For example, in some implementations, the XR environment renderer 620 displays the depth indicator 540 shown in FIG. 5C.

In various implementations, the visual property determiner 640 determines a value 644 for a visual property of the depth indicator 642 based on the distance 632. In some implementations, the value 644 represents a value for a size property of the depth indicator 642. For example, in some implementations, the visual property determiner 640 determines the first size 542a for the depth indicator 540 based on the first distance 532a shown in FIGS. 5B and 5C. In some implementations, the visual property determiner 640 updates the value 644 for the visual property of the depth indicator 642 as the distance 632 changes. For example, in some implementations, the visual property determiner 640 determines the second size 542b for the depth indicator 540 based on the second distance 532b shown in FIG. 5D.

In some implementations, the value 644 represents a value for an opacity property of the depth indicator 642 based on the distance 632. For example, in some implementations, the visual property determiner 640 determines the first opacity value 544a (shown in FIG. 5E) for the depth indicator 540 as a function of the first distance 532a, and the visual property determiner 640 determines the second opacity value 544b (shown in FIG. 5F) for the depth indicator 540 as a function of the second distance 532b.

In some implementations, the value 644 represents a value for a color property of the depth indicator 642 based on the distance 632. For example, in some implementations, the visual property determiner 640 determines the first color 546a (shown in FIG. 5G) for the depth indicator 540 as a function of the first distance 532a, and the visual property determiner 640 determines the second color 546b (shown in FIG. 5H) for the depth indicator 540 as a function of the second distance 532b.

In some implementations, the value 644 represents a value for a shape property of the depth indicator 642 based on the distance 632. For example, in some implementations, the visual property determiner 640 selects a directionless shape (e.g., a circle such as the depth indicator 540 shown in FIG. 5C) for the depth indicator 642 when the distance 632 is greater than a threshold distance. In some implementations, the visual property determiner 640 selects a directional shape (e.g., a triangle such as the triangular depth indicator 540' shown in Figure SI, or an arrow such as the first and second depth indicators 560 and 570 shown in FIG. 5J) when the distance 632 is less than the threshold distance.

In some implementations, the value 644 represents a value for another visual property of the depth indicator 642 such as a length of the depth indicator 642, a width of the depth indicator 642, etc.

In various implementations, the visual property determiner 640 provides the value 644 to the XR environment renderer 620. The XR environment renderer 620 sets a visual property of the depth indicator 642 based on the value 644. In some implementations, the value 644 represents an update to a previously-provided value, and the XR environment renderer 620 modifies the visual property of the depth indicator 642 based on the value 644.

FIG. 7A is a flowchart representation of a method 700 for indicating a distance to a selectable portion of an XR surface. In various implementations, the method 700 is performed by a device with a display, a non-transitory memory and one or more processors coupled with the display and the non-transitory memory (e.g., the electronic device 20 shown in FIGS. 5A-5K and/or the system 600 shown in FIG. 6). In some implementations, the method 700 is performed by processing logic, including hardware, firmware, software, or a combination thereof. In some implementations, the method 700 is performed by a processor executing code stored in a non-transitory computer-readable medium (e.g., a memory).

As represented by block 702, in various implementations, the method 700 includes displaying an XR environment that includes an XR surface. As described herein, in some implementations, the XR environment is referred to as a graphical environment and the XR surface is referred to as a virtual surface. In some implementations, at least a portion of the XR surface is selectable. For example, as shown in FIG. 5A, the electronic device 20 displays the XR environment 500 that includes the XR affordance 510. As shown in FIG. 6, in some implementations, the XR environment renderer 620 displays the XR environment 622 (e.g., the XR environment 500 shown in FIG. 5A).

As represented by block 704, in some implementations, the method 700 includes determining a distance between a collider object and the selectable portion of the XR surface. For example, as shown in FIG. 5B, the electronic device 20 determines that the collider object 520 and the XR affordance 510 are separated by the first distance 532a. As shown in FIG. 6, in some implementations, the collider object tracker 630 determines the distance 632 (e.g., the first distance 532a shown in FIG. 5B) between the collider object and the selectable portion of the XR surface.

As represented by block 706, in some implementations, the method 700 includes displaying a depth indicator in association with the collider object. For example, as shown in FIG. 5C, the electronic device 20 displays the depth indicator 540 that encapsulates the collider object 520. In some implementations, a visual property of the depth indicator is selected based on the distance between the collider object and the selectable portion of the XR surface. For example, as illustrated in FIGS. 5C and 5D, the electronic device 20 reduces a size of the depth indicator 540 from the first size 542a to the second size 542b as a distance between the collider object 520 and the XR affordance 510 reduces from the first distance 532a to the second distance 532b.

In various implementations, displaying the depth indicator enhances a functionality of the device by increasing the user's depth perception in XR environments. In various implementations, displaying the depth indicator allows the user to select a selectable portion of an XR surface with more precision. In various implementations, displaying the depth indicator prevents inadvertent selections of XR affordances. As such, in various implementations, displaying the depth indicator improves a user experience of the device.

Referring to FIG. 7B, as represented by block 708, in some implementations, the method 700 includes detecting a change in the distance between the collider object and the selectable portion of the XR surface, and modifying the visual property of the depth indicator based on the change in the distance. For example, in some implementations, the collider object tracker 630 (shown in FIG. 6) periodically determines the distance 632 and the visual property determiner 640 determines the value 644 based on the distance 632 provided by the collider object tracker 630. In various implementations, modifying the visual property of the depth indicator based on the change in the distance provides a visual indication of whether the user is moving his/her finger closer to the XR affordance or farther away from the XR affordance. Modifying the visual property of the depth indicator allows the user to determine whether to continue moving the user's finger in a current direction of movement or whether the user needs to move his/her finger in a different direction in order to select the selectable portion of the XR surface.

As represented by block 710, in some implementations, the method 700 includes detecting that the distance between the collider object and the selectable portion of the XR surface is decreasing, and reducing a size of the depth indicator to indicate that the distance between the collider object and the selectable portion of the XR surface is decreasing. For example, as shown in FIGS. 5C and 5D, as a distance between the collider object 520 and the XR affordance 510 decreases from the first distance 532a to the second distance 532b, the electronic device 20 reduces a size of the depth indicator 540 from the first size 542a to the second size 542b. In various implementations, reducing a size of the depth indicator as the collider object approaches the XR surface provides an indication to the user to continue moving the user's finger in a current direction of movement if the user desires to select the selectable portion of the XR surface.

As represented by block 712, in some implementations, the method 700 includes detecting that the distance between the collider object and the selectable portion of the XR surface is increasing, and increasing a size of the depth indicator to indicate that the distance between the collider object and the selectable portion of the XR surface is increasing. In various implementations, increasing a size of the depth indicator as the collider object moves away from the XR surface provides an indication to the user to continue moving the user's finger in a current direction of movement if the user does not intend to select the selectable portion of the XR surface.

As represented by block 714, in some implementations, the method 700 includes detecting that the distance between the collider object and the selectable portion of the XR surface is decreasing, and increasing an opacity of the depth indicator to indicate that the distance between the collider object and the selectable portion of the XR surface is decreasing. For example, as shown in FIGS. 5E and 5F, the electronic device 20 increases an opacity of the depth indicator 540 from a first opacity value 544a to a second opacity value 544b when a distance between the collider object 520 and the XR affordance 510 reduces from the first distance 532a to the second distance 532b. In some implementations, increasing the opacity of the depth indicator includes reducing a transparency of the depth indicator. In various implementations, increasing an opacity of the depth indicator as the collider object approaches the XR surface provides an indication to the user to continue moving the user's finger in a current direction of movement if the user desires to select the selectable portion of the XR surface.

As represented by block 716, in some implementations, the method 700 includes detecting that the distance between the collider object and the selectable portion of the XR surface is increasing, and decreasing an opacity of the depth indicator to indicate that the distance between the collider object and the selectable portion of the XR surface is increasing. In some implementations, decreasing the opacity of the depth indicator includes increasing a transparency of the depth indicator. In various implementations, decreasing an opacity of the depth indicator as the collider object moves away from the XR surface provides an indication to the user to continue moving the user's finger in a current direction of movement if the user does not intend to select the selectable portion of the XR surface.

As represented by block 718, in some implementations, the method 700 includes detecting that the distance between the collider object and the selectable portion of the XR surface is decreasing, and darkening a color of the depth indicator to indicate that the distance between the collider object and the selectable portion of the XR surface is decreasing. For example, as shown in FIGS. 5G and 5H, the electronic device 20 darkens a color of the depth indicator 540 from a first color 546*a* to a second color 546*b* as a distance between the collider object 520 and the XR affordance 510 reduces from the first distance 532*a* to the second distance 532*b*. In various implementations, darkening a color of the depth indicator as the collider object approaches the XR surface provides an indication to the user to continue moving the user's finger in a current direction of movement if the user desires to select the selectable portion of the XR surface.

Referring to FIG. 7C, as represented by block 720, in some implementations, the method 700 includes detecting that the distance between the collider object and the selectable portion of the XR surface is increasing, and lightening a color of the depth indicator to indicate that the distance between the collider object and the selectable portion of the XR surface is increasing. In various implementations, lightening a color of the depth indicator as the collider object moves away from the XR surface provides an indication to the user to continue moving the user's finger in a current direction of movement if the user does not intend to select the selectable portion of the XR surface.

As represented by block 722, in some implementations, the method 700 includes changing a shape of the depth indicator based on the distance between the collider object and the selectable portion of the XR surface. As represented by block 724, in some implementations, the method 700 includes detecting that the distance between the collider object and the selectable portion of the XR surface is decreasing, and modifying the depth indicator to indicate a direction towards the selectable portion of the XR surface. For example, as shown in FIG. 5I, the electronic device 20 changes a shape of the depth indicator 540 from a circle to a triangle which results in a triangular depth indicator 540' as the distance between the collider object 520 and the XR affordance 510 decreases from the first distance 532*a* to the second distance 532*b*. In some implementations, the method 700 includes changing the shape of the depth indicator to an arrow that points towards the selectable portion of the XR surface as the distance between the collider object and the selectable portion of the XR surface decreases.

As represented by block 726, in some implementations, the method 700 includes displaying, in the XR environment, an XR representation of a digit of a person, wherein the collider object is associated with the digit of the person, and displaying the depth indicator as encapsulating the XR representation of the digit of the person. For example, as shown in FIG. 5C, the electronic device 20 displays the XR finger 530. The collider object 520 is associated with the XR finger 530, and the depth indicator 540 encapsulates the XR finger 530. Displaying the depth indicator proximate to the XR representation of the digit allows the person to easily see the depth indicator. In some implementations, the method 700 includes displaying the depth indicator in association with the selectable portion of the XR surface. For example, in some implementations, the method 700 includes displaying the depth indicator proximate to (e.g., adjacent to) the selectable portion of the XR surface. In some implementations, the method 700 includes integrating the depth indicator into selectable portion of the XR surface.

As represented by block 728, in some implementations, displaying the depth indicator includes displaying a geometric shape in association with the collider object. In some implementations, the geometric shape includes a circle. For example, as shown in FIG. 5C, the depth indicator 540 is circular. In some implementations, the geometric shape includes a polygon (e.g., a triangle, a square, a rectangle, etc.). For example, as shown in FIG. 5I, the electronic device 20 displays the triangular depth indicator 540'.

As represented by block 730, in some implementations, the collider object is capsule-shaped. For example, as shown in FIG. 5B, the collider object 520 is in the shape of a capsule. In some implementations, the collider object is elongated.

As represented by block 732, in some implementations, the XR surface includes an XR plane (e.g., a virtual plane). For example, as shown in FIG. 5A, the XR surface 508 represents an XR wall. In some implementations, the XR surface includes a surface of an XR object. For example, as shown in FIG. 5J, the robot affordance 550 is composited onto a surface of the XR robot 504.

As represented by block 734, in some implementations, the XR surface is transparent (e.g., invisible). In some implementations, the XR surface is semi-transparent. In some implementations, the XR surface is translucent. In some implementations, the XR surface transitions from transparent to semi-transparent as the collider object approaches the XR surface. In some such implementations, the transitioning of the XR surface from transparent to semi-transparent serves as the depth indicator.

As represented by block 736, in some implementations, the selectable portion of the XR surface is an XR affordance. For example, as shown in FIG. 5A, the XR surface 508 includes the XR affordance 510.

As represented by block 738, in some implementations, the method 700 includes displaying a second depth indicator in association with the collider object. In some implementations, a visual property of the second depth indicator is selected based on a distance between the collider object and a selectable portion of a second XR surface. For example, as shown in FIG. 5J, the electronic device 20 displays the first depth indicator 560 to indicate the first distance 532*a* between the collider object 520 and the XR affordance 510, and the second depth indicator 570 to indicate the third distance 552*a* between the collider object 520 and the robot affordance 550. Displaying multiple depth indicators that indicate respective distances to corresponding XR affordances enhances a user experience of the device by allowing the user to decide which one of the XR affordances the user wants to select.

Figure 8:
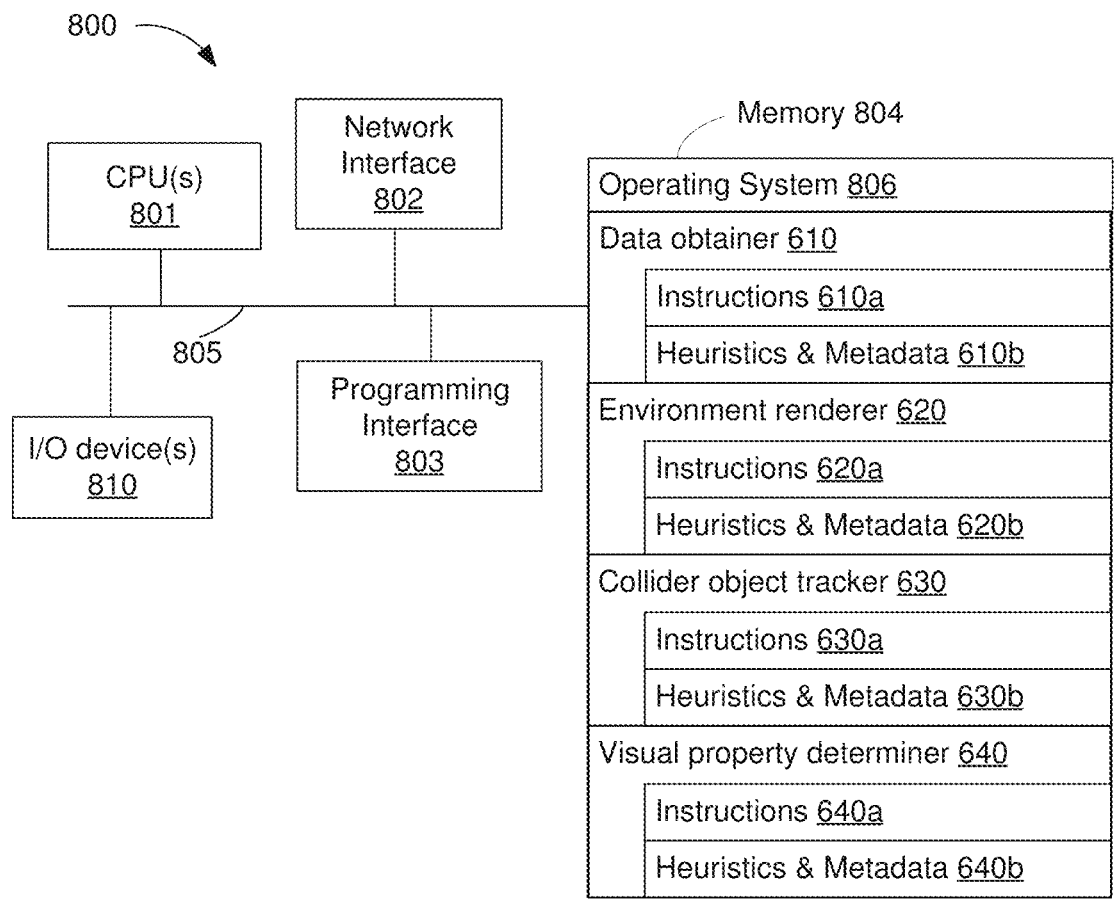
FIG. 8 is a block diagram of a device that indicates a distance to an XR affordance in accordance with some implementations.

FIG. 8 is a block diagram of a device 800 enabled with one or more components for indicating a distance to a selectable portion of an XR surface. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 800 includes one or more processing units (CPUs) 801, a network interface 802, a programming interface 803, a memory 804, one or more input/output (I/O) devices 810, and one or more communication buses 805 for interconnecting these and various other components.

In some implementations, the network interface 802 is provided to, among other uses, establish and maintain a metadata tunnel between a cloud hosted network management system and at least one private network including one or more compliant devices. In some implementations, the one or more communication buses 805 include circuitry that interconnects and controls communications between system components. The memory 804 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 804 optionally includes one or more storage devices remotely located from the one or more CPUs 801. The memory 804 comprises a non-transitory computer readable storage medium.

In some implementations, the memory 804 or the non-transitory computer readable storage medium of the memory 804 stores the following programs, modules and data structures, or a subset thereof including an optional operating system 806, the data obtainer 610, the XR environment renderer 620, the collider object tracker 630 and the visual property determiner 640. In various implementations, the device 800 performs the method 700 shown in FIGS. 7A-7C.

In some implementations, the data obtainer 610 obtains user input data that indicates a position of a digit of a person. To that end, the data obtainer 610 includes instructions 610a, and heuristics and metadata 610b. In some implementations, the XR environment renderer 620 renders an XR environment. To that end, the XR environment renderer 620 includes instructions 620a, and heuristics and metadata 620b. In some implementations, the collider object tracker 630 tracks a position of a collider object associated with the digit of the person. As described herein, in some implementations, the collider object tracker 630 determines a distance of the collider object from a selectable portion of an XR surface. To that end, the collider object tracker 630 includes instructions 630a, and heuristics and metadata 630b. As described herein, the XR environment renderer 620 displays a depth indicator in association with the collider object to indicate the distance between the collider object and the selectable portion of the XR surface. In some implementations, the visual property determiner 640 determines a value for a visual property of the depth indicator based on the distance determined by the collider object tracker 630. To that end, the visual property determiner 640 includes instructions 640a, and heuristics and metadata 640b.

In some implementations, the one or more I/O devices 810 include an environmental sensor for capturing environmental data. In some implementations, the one or more I/O devices 810 include an image sensor (e.g., a camera) for capturing image data (e.g., a set of one or more images). In some implementations, the one or more I/O devices 810 include a microphone for capturing sound data. In some implementations, the one or more I/O devices 810 include a display for displaying content (e.g., a graphical environment, for example, an XR environment). In some implementations, the one or more I/O devices 810 include a speaker for outputting audio content. In some implementations, the one or more I/O devices 810 include a haptic device for providing haptic responses. In some implementations, the haptic device includes a vibrational device that generates vibrations. In some implementations, the haptic device includes a motor with an unbalanced load for generating vibrations.

In various implementations, the one or more I/O devices 810 include a video pass-through display which displays at least a portion of a physical environment surrounding the device 800 as an image captured by a scene camera. In various implementations, the one or more I/O devices 810 include an optical see-through display which is at least partially transparent and passes light emitted by or reflected off the physical environment.

A person's gross motor skills make it difficult for the person to perform minute operations on an XR object while an XR representation of the person is holding the XR object. Performing minute operations on a relatively large XR object is even more difficult. For example, performing a minute rotation on an XR object while an XR representation of a hand of the person is holding the XR object is difficult because the person will inadvertently perform an undesirably large rotation. Moreover, trying to manipulate XR objects from a distance can result in undesirably large manipulations. For example, a translation gesture performed from a distance will likely result in an undesirably large translation.

The present disclosure provides methods, systems, and/or devices for performing different operations on an XR object with the same gesture based on a distance between the XR object and a body portion performing the gesture. The methods, systems and/or devices described herein allow a user to perform minute operations on an XR object from far away and coarse operations on the XR object while holding the XR object. When a person performs a gesture while holding the XR object, the device performs a first operation on the XR object. When the person performs the same gesture from a distance to the XR object, the device performs a second operation on the XR object.

In some implementations, the second operation is entirely different from the first operation. Alternatively, in some implementations, the second operation is a scaled-down version of the first operation. For example, if a person performs a full turn of his wrist while holding the XR object, the device rotates the XR object by 60 degrees. However, if the person performs a full turn of his wrist while being 10 feet away from the XR object, the device rotates the XR object by 6 degrees. More generally, in various implementations, the device applies a downscaling factor to an operation when the person performs the corresponding gesture at a distance from the XR object. In some implementations, the downscaling factor is a function of the distance between the person and the XR object.

In various implementations, performing different operations on an XR object based on a distance at which a user performs a given gesture enhances a functionality of the device by allowing the user to remotely manipulate the XR object with greater precision. In some implementations, manipulating an XR object in different manners based on a distance at which the user performs the same gesture enhances a user experience of the device by not requiring the user to learn different gestures (e.g., a first gesture for manipulating the XR object while holding the XR object, and a second gesture for manipulating the XR object from far away). In some implementations, manipulating an XR object to different degrees based on a distance at which the user performs a gesture reduces a power consumption of the device by reducing the need for user inputs that correspond to correcting an exaggerated manipulation of the XR object.

Figure 9A:
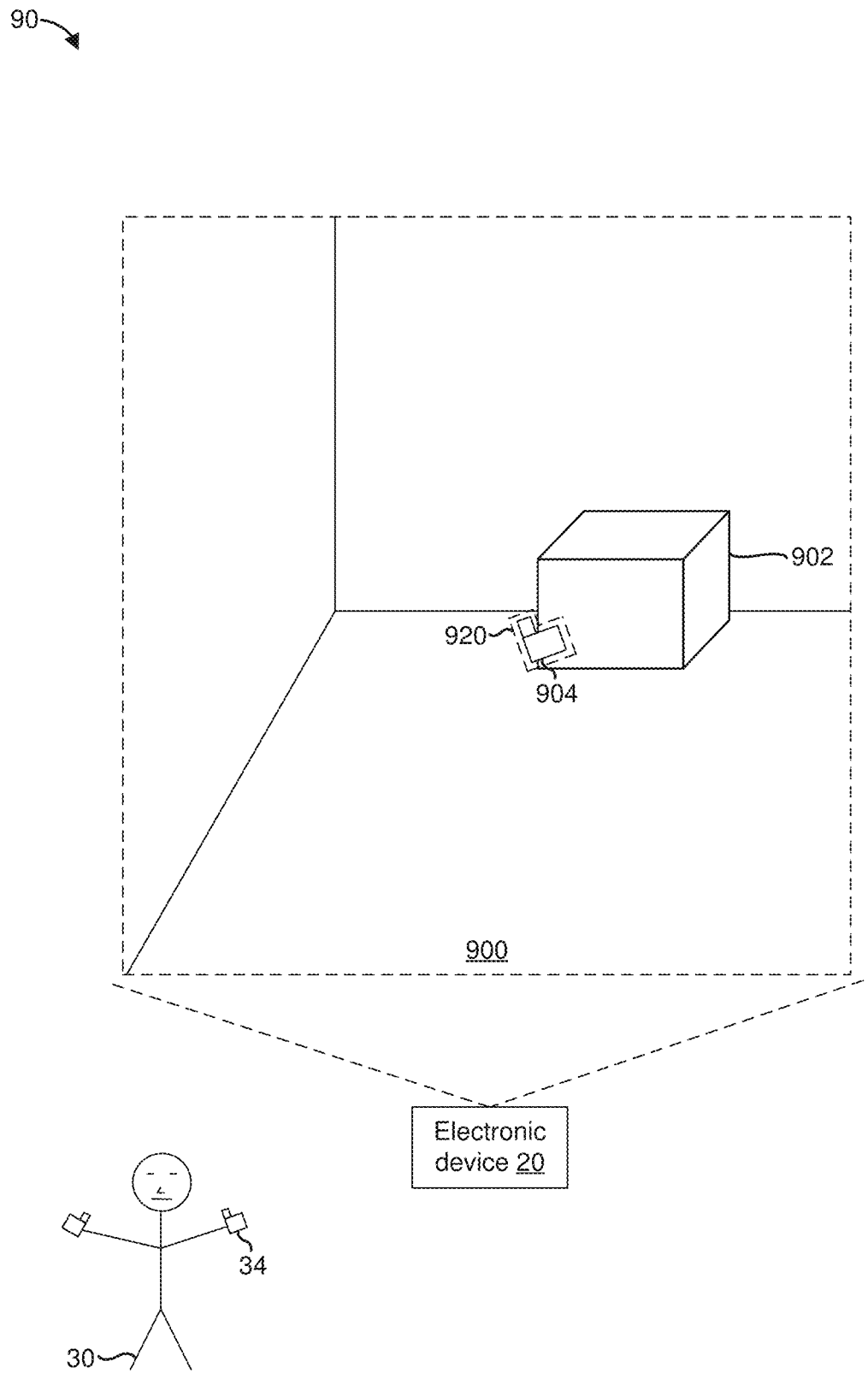
FIGS. 9A-9H are diagrams of an example user interface for manipulating an XR object in accordance with some implementations.

FIG. 9A illustrates an example operating environment 90. In some implementations, the operating environment 90 includes the electronic device 20 and a person 30. In some implementations, the person 30 is a user of the electronic device 20. In some implementations, the electronic device 20 includes a portable multifunction device (e.g., a tablet, a smartphone, a media player or a laptop computer), and the person 30 is holding the electronic device 20. In some implementations, the electronic device 20 includes a wearable computing device (e.g., a watch or an HMD) that the person 30 can wear. As illustrated in FIG. 9A, the person 30 has various body portions such as a hand 34, arms, legs, a head, a torso, etc.

In various implementations, the electronic device 20 presents an XR environment 900. In some implementations, the XR environment 900 is referred to as a graphical environment. In some implementations, the XR environment 900 includes various XR objects. In some implementations, the XR objects are referred to as graphical objects. In the example of FIG. 9A, the XR environment 900 includes an XR object 902. In some implementations, the XR object 902 is an XR representation of a physical article from a physical environment. In various implementations, the person 30 can manipulate the XR object 902. For example, the person 30 can provide a user input (e.g., a gesture) that results in a movement of the XR object 902. For example, the person 30 can rotate the XR object 902 and/or translate the XR object 902.

In the example of FIG. 9A, the XR environment 900 includes an XR hand 904 that represents the hand 34 of the person. In some implementations, a collider object 920 is associated with the hand 34. Although the collider object 920 is shown as a single object, in some implementations, the collider object 920 is a collection of multiple collider objects. For example, in some implementations, a respective collider object is associated with each digit of the hand. In some implementations, the collider object 920 encapsulates (e.g., wraps around) the XR hand 904. Although the collider object 920 is shown with a dashed line in the XR environment, in various implementations, the collider object 920 is invisible to the person 30. In the example of FIG. 9A, the XR hand 904 is touching the XR object 902. As such, the collider object 920 abuts the XR object 902.

Figure 9B:
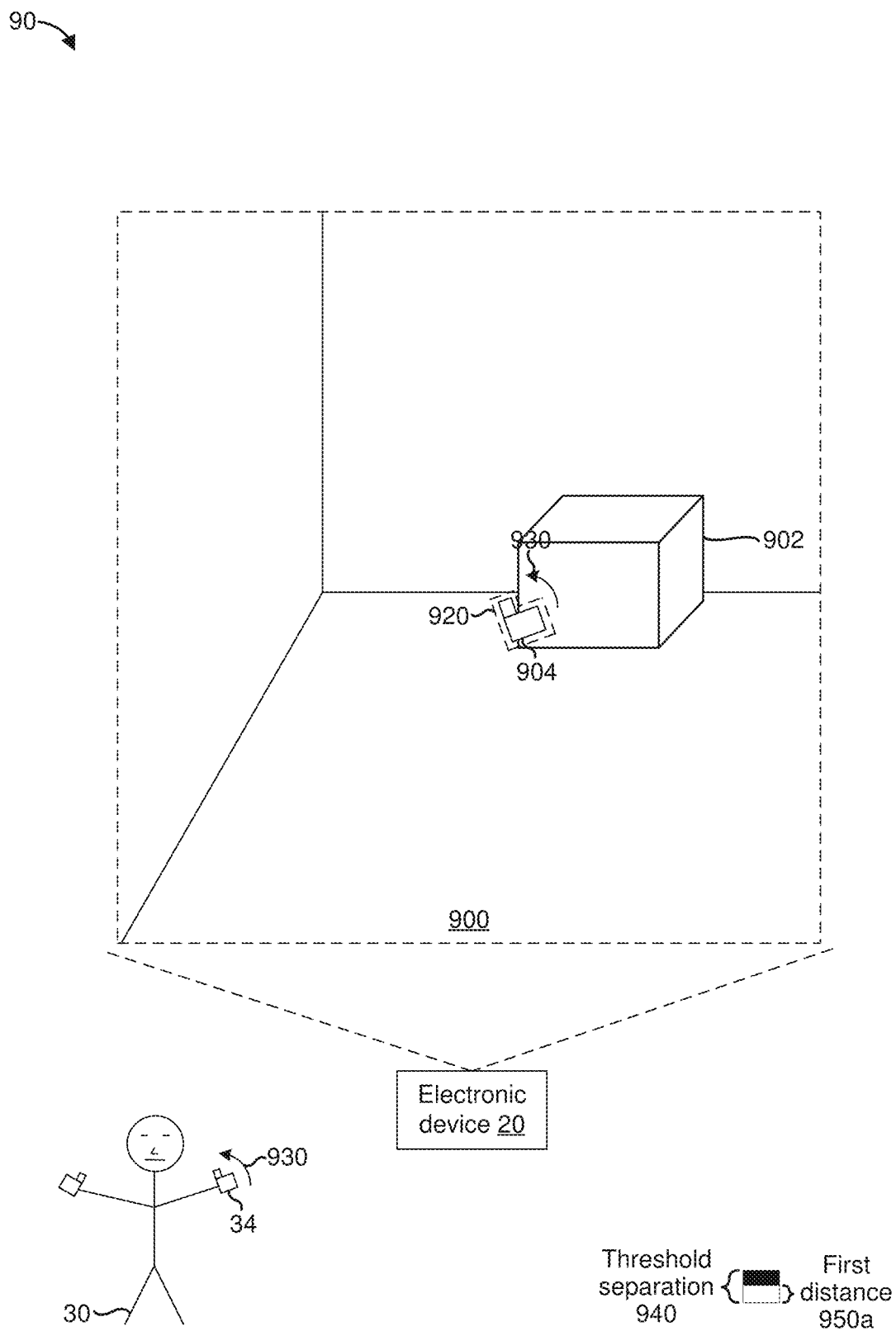

Referring to FIG. 9B, the electronic device 20 detects a gesture 930 that the person 30 makes by the hand 34. The electronic device 20 determines that the gesture 930 is directed to the XR object 902, for example, because the XR hand 904 is touching the XR object 902 and/or because the gesture 930 is only applicable to the XR object 902. As illustrated in FIG. 9B, in some implementations, the gesture 930 includes rotating the hand 34 in a counterclockwise direction. In the example of FIG. 9B, the collider object 920 and the XR object 902 are separated by a first distance 950a that is less than a threshold separation 940. In some implementations, the first distance 950a is zero (e.g., when the collider object 920 is touching the XR object 902).

Figure 9C:
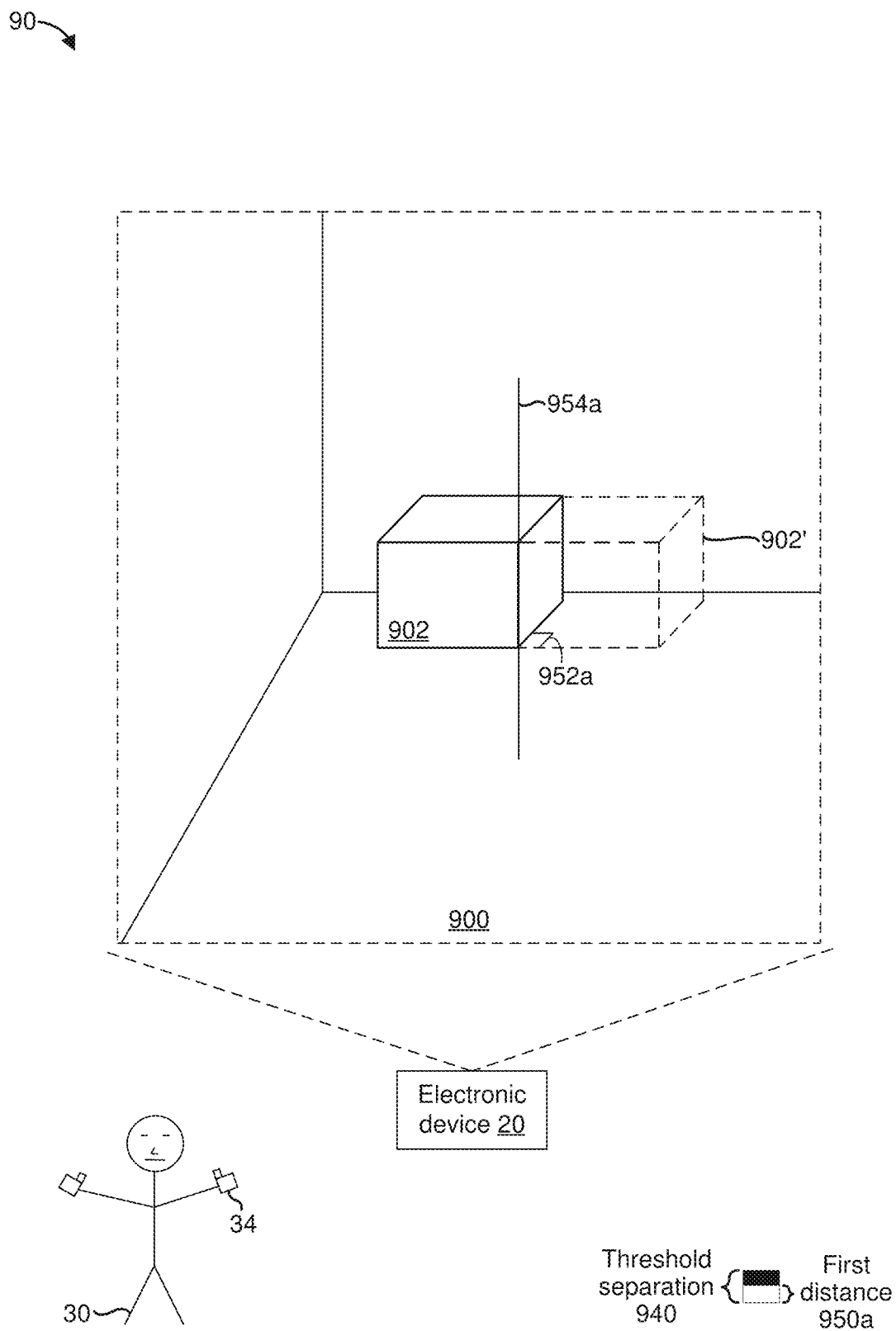

As illustrated in FIG. 9C, the electronic device 20 performs a first operation on the XR object 902 by rotating the XR object 902 by a first angle of rotation 952a about a first axis of rotation 954a in response to detecting the gesture 930 at the first distance 950a. The dashed cube 902' indicates a previous position of the XR object 902. In the example of FIG. 9C, the first angle of rotation 952a corresponds to ninety degrees. The first operation is a function of the first distance 950a. For example, in some implementations, the first angle of rotation 952a is a function of the first distance 950a. In some implementations, the first axis of rotation 954a is a function of the first distance 950a.

In some implementations, the electronic device 20 selects the first angle of rotation 952a and/or the first axis of rotation 954a based on a comparison of the first distance 950a with the threshold separation 940. For example, the electronic device 20 selects the first angle of rotation 952a and/or the first axis of rotation 954a for distances that are less than the threshold separation 940. In such implementations, the electronic device 20 selects a different angle of rotation and/or a different axis of rotation for distances that are greater than the threshold separation 940. For example, the electronic device 20 reduces the angle of rotation as the distance between the collider object 920 and the XR object 902 increases beyond the threshold separation 940.

Figure 9D:
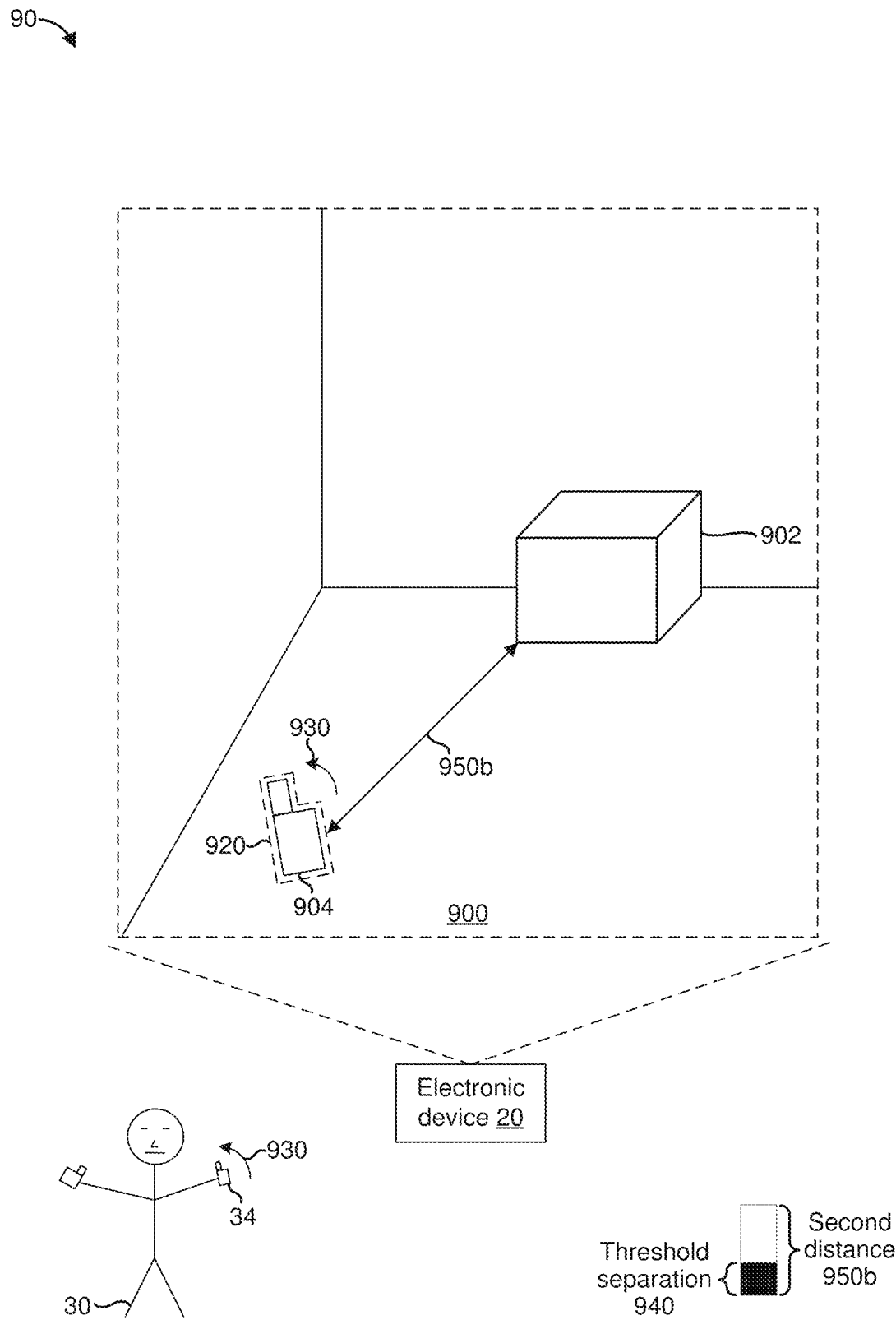

In the example of FIG. 9D, the collider object 920 is a second distance 950b from the XR object 902, for example, because the XR hand 904 and the XR object 902 are separated by the second distance 950b. The second distance 950b is greater than the threshold separation 940. In the example of FIG. 9D, the electronic device 20 detects that the person 30 is performing the gesture 930 by the hand 34. For example, the electronic device 20 detects that the person 30 is rotating the hand 34 counterclockwise.

Figure 9E:
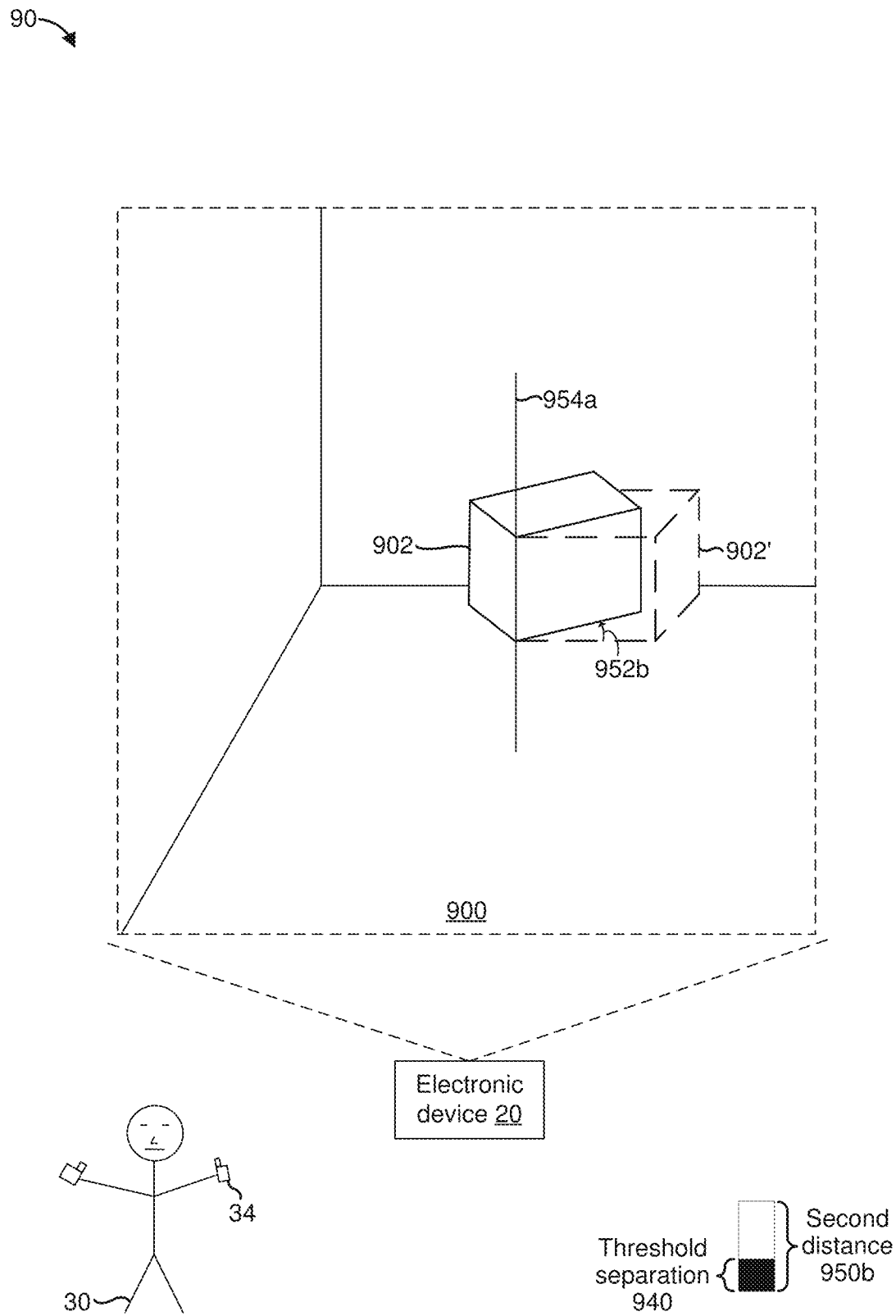

Referring to FIG. 9E, the electronic device 20 performs a second operation on the XR object 902 by rotating the XR object 902 by a second angle of rotation 952b about the first axis of rotation 954a in response to detecting the gesture 930 at the second distance 950b. The dashed cube 902' represents a previous position of the XR object 902. The second angle of rotation 952b is different from the first angle of rotation 952a (shown in FIG. 9C). For example, the second angle of rotation 952b is an acute angle (e.g., less than ninety degrees), whereas the first angle of rotation 952a (shown in FIG. 9C) is a right angle (e.g., ninety degrees). The second angle of rotation 952b is different from the first angle of rotation 952a because the second distance 950b is different from the first distance 950a. In various implementations, the electronic device 20 selects an angle of rotation that is inversely proportional to a distance between the collider object 920 and the XR object 902. For example, as shown in FIGS. 9C and 9E, the second angle of rotation 952b is smaller than the first angle of rotation 952a because the second distance 950b is greater than the first distance 950a.

In some implementations, performing the same operation on the XR object 902 regardless of the distance between the XR object 902 and the collider object 920 results in over-manipulating the XR object 902 when the distance is greater than the threshold separation 940. When the person 30 is holding the XR object 902, the person 30 has a better perception of how much the XR object 902 will rotate when the person 30 rotates his/her hand 34. However, when the person 30 is not holding the XR object 902, then the person 30 is more likely to over rotate the XR object 902 because the perception of the person 30 is less reliable. Overmanipulating the XR object 902 often invites additional user inputs that correspond to correcting the over manipulation, and having to provide additional user inputs tends to detract from the user experience and drain a battery of the electronic device 20. However, performing different operations on the XR object 902 based on the distance between the XR object 902 and the collider object 920 tends to reduce over manipulation of the XR object 902. Reducing over manipulation of the XR object 902 invites fewer user inputs that correspond to correcting the over manipulation thereby enhancing the user experience of the electronic device 20 and extending a battery of the electronic device 20.

Figure 9F:
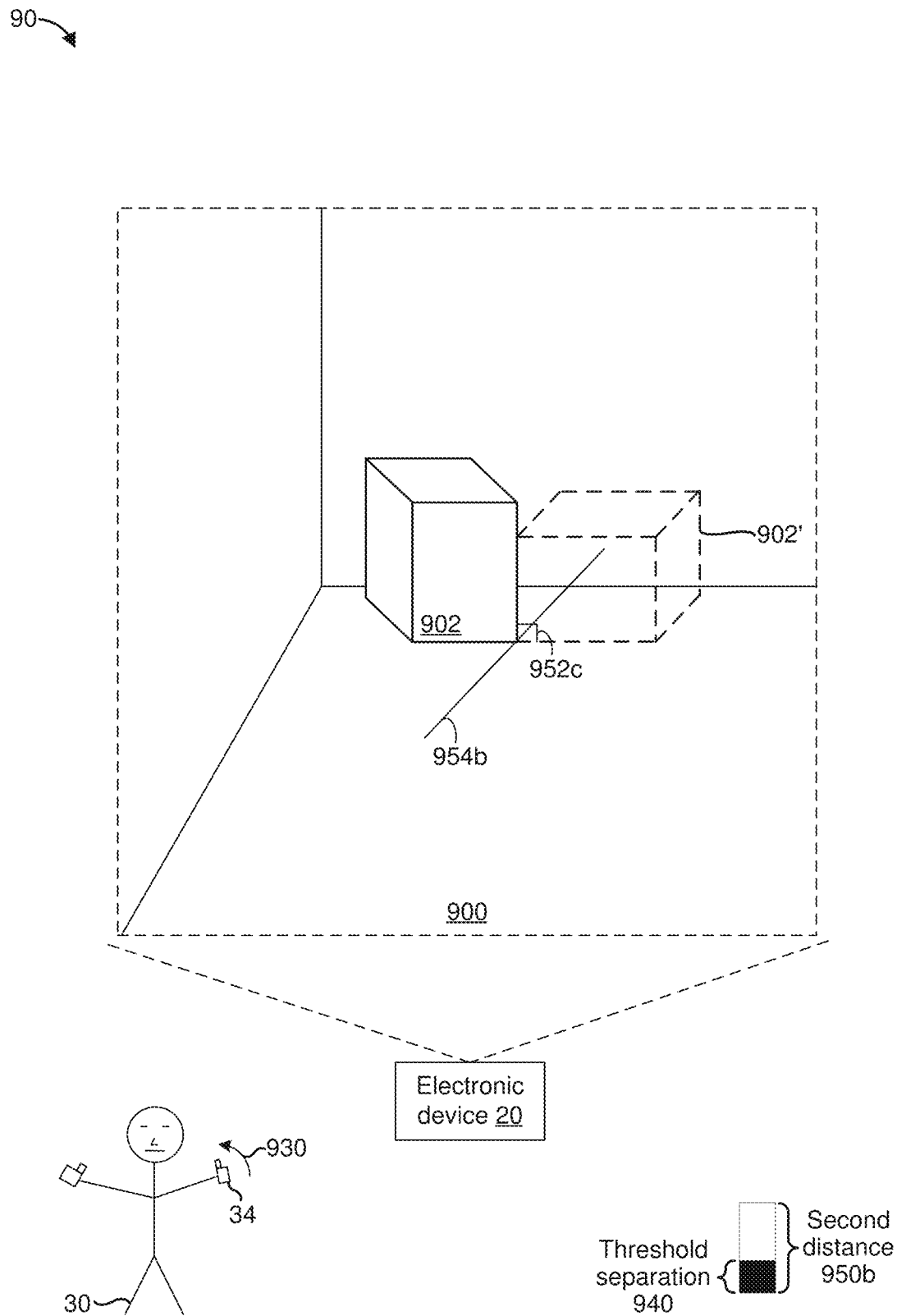

In the example of FIG. 9F, the electronic device 20 performs a third operation on the XR object 902 by rotating the XR object 902 by a third angle of rotation 952c about a second axis of rotation 954b in response to detecting the gesture 930. The third operation illustrated in FIG. 9F is an alternative to the second operation illustrated in FIG. 9E. The second axis of rotation 954b is different from the first axis of rotation 954a. In various implementations, the electronic device 20 moves the XR object 902 with reference to a different point of reference based on a distance between the XR object 902 and the collider object 920. For example, in some implementations, the electronic device 20 rotates the XR object 902 about the first axis of rotation 954a when a distance between the collider object 920 and the XR object 902 is less than the threshold separation 940 (e.g., when the person 30 is touching the XR object 902). In some implementations, the electronic device 20 rotates the XR object 902 about the second axis of rotation 954b when a distance between the collider object 920 and the XR object 902 is greater than the threshold separation 940 (e.g., when the person 30 is not touching the XR object 902).

Figure 9G:
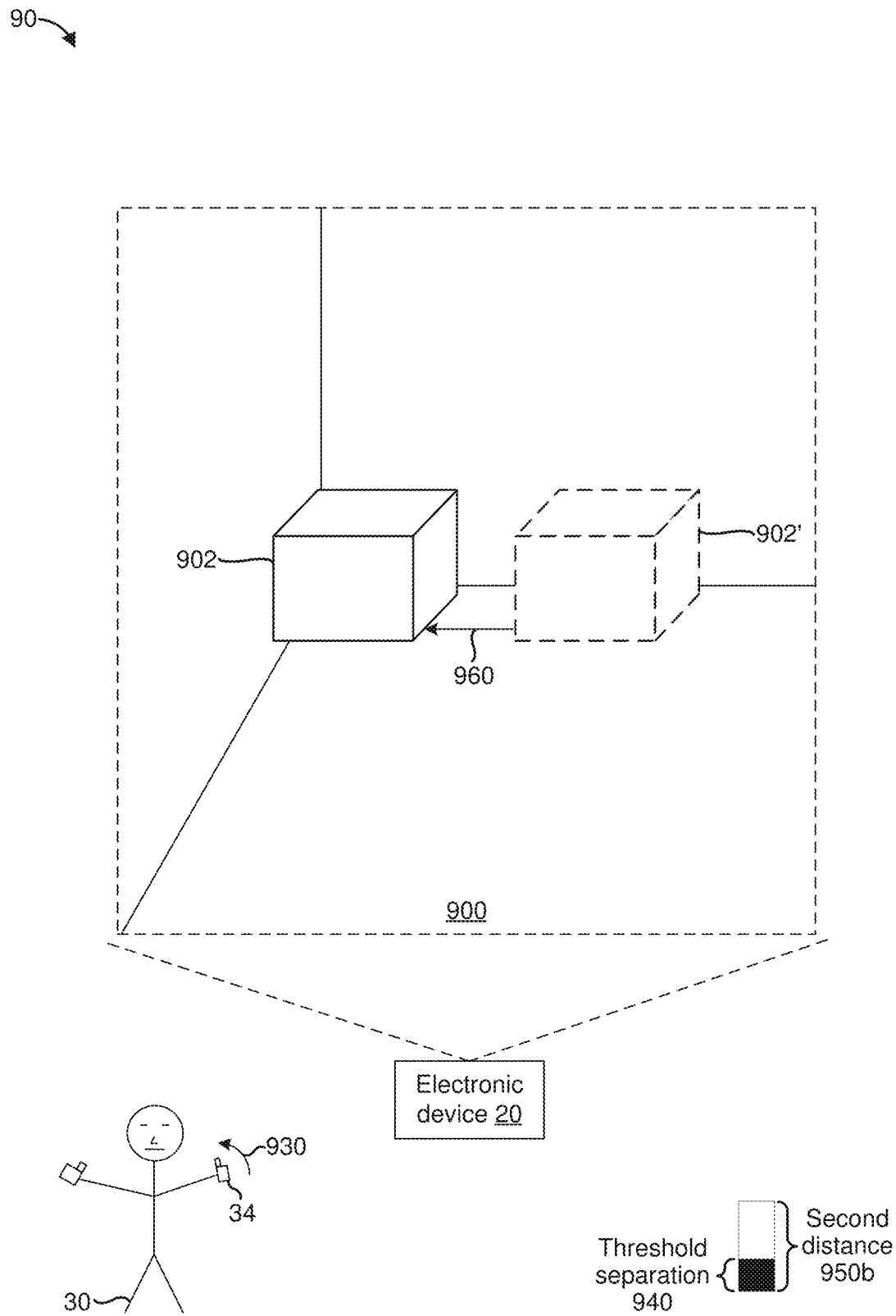

In the example of FIG. 9G, the electronic device 20 performs a fourth operation on the XR object 902 by moving the XR object 902 by a distance 960 in response to detecting the gesture 930. The fourth operation illustrated in FIG. 9G is an alternative to the second operation illustrated in FIG. 9E and the third operation illustrated in FIG. 9F. While the second operation illustrated in FIG. 9E and the third operation illustrated in FIG. 9F are rotational operations, the fourth operation illustrated in FIG. 9G is a translational operation. In various implementations, the electronic device 20 performs a first type of operation (e.g., a rotation) on the XR object 902 when a distance between the collider object 920 and the XR object 902 is less than the threshold separation 940 (e.g., when the person 30 is holding the XR object 902), and the electronic device 20 performs a second type of operation (e.g., a translation) on the XR object 902 when a distance between the collider object 920 and the XR object 902 is greater than the threshold separation 940 (e.g., when the person 30 is not holding the XR object 902).

Figure 9H:
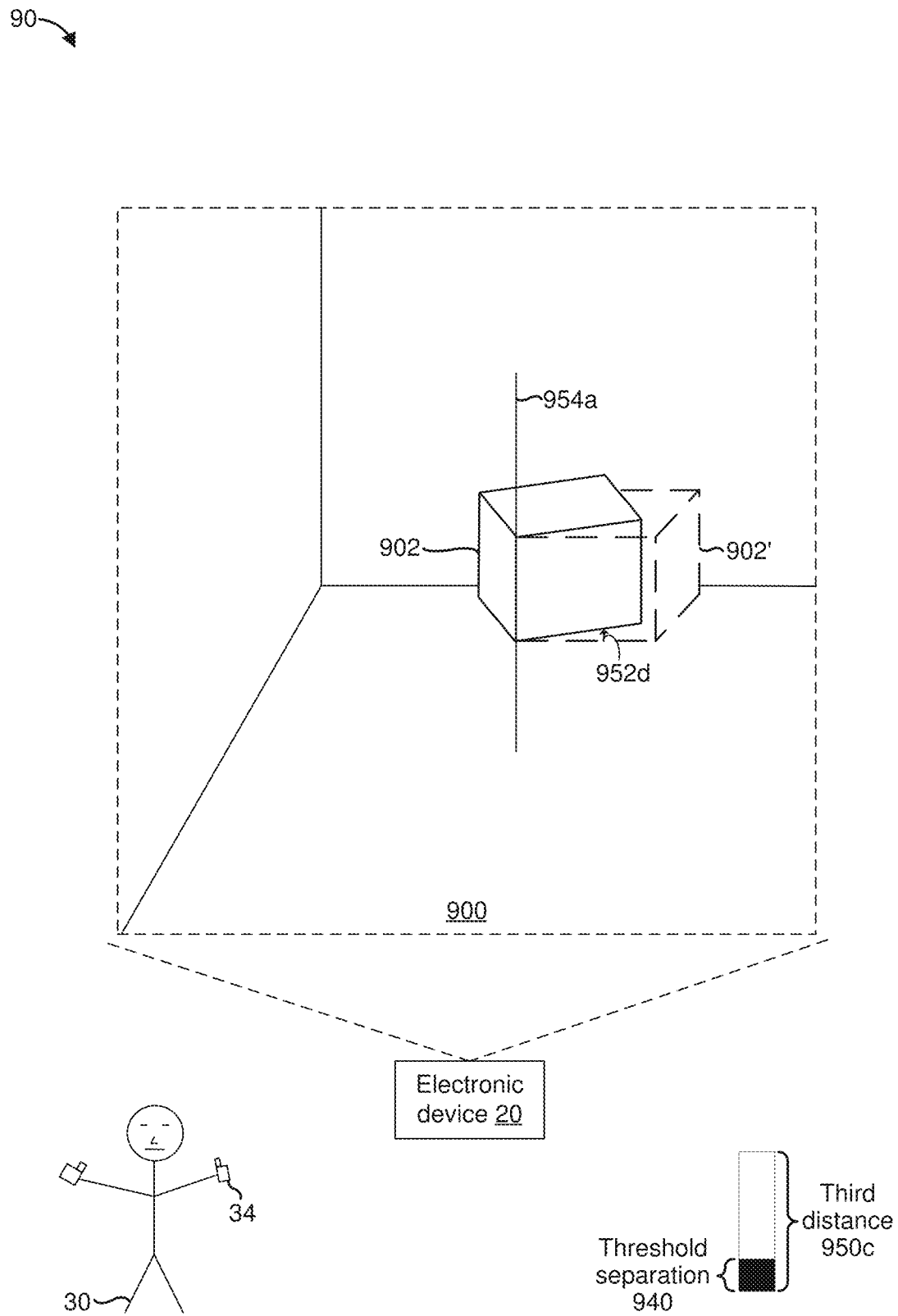

In the example of FIG. 9H, the collider object 920 is a third distance 950c from the XR object 902. The third distance 950c is greater than the second distance 950b illustrated in FIG. 9D. The electronic device 20 rotates the XR object 902 about the first axis of rotation 954a by a fourth angle of rotation 952b that is less than the second angle of rotation 952b illustrated in FIG. 9E. As described herein, in some implementations, the electronic device 20 determines the angle of rotation based on the distance between the collider object 920 and the XR object 902. In some implementations, the angle of rotation is inversely proportional to the distance between the collider object 920 and the XR object 902. Since the third distance 950c is greater than the second distance 950b illustrated in FIG. 9D, the fourth angle of rotation 952d is less than the second angle of rotation 952b shown in FIG. 9E.

Figure 10:
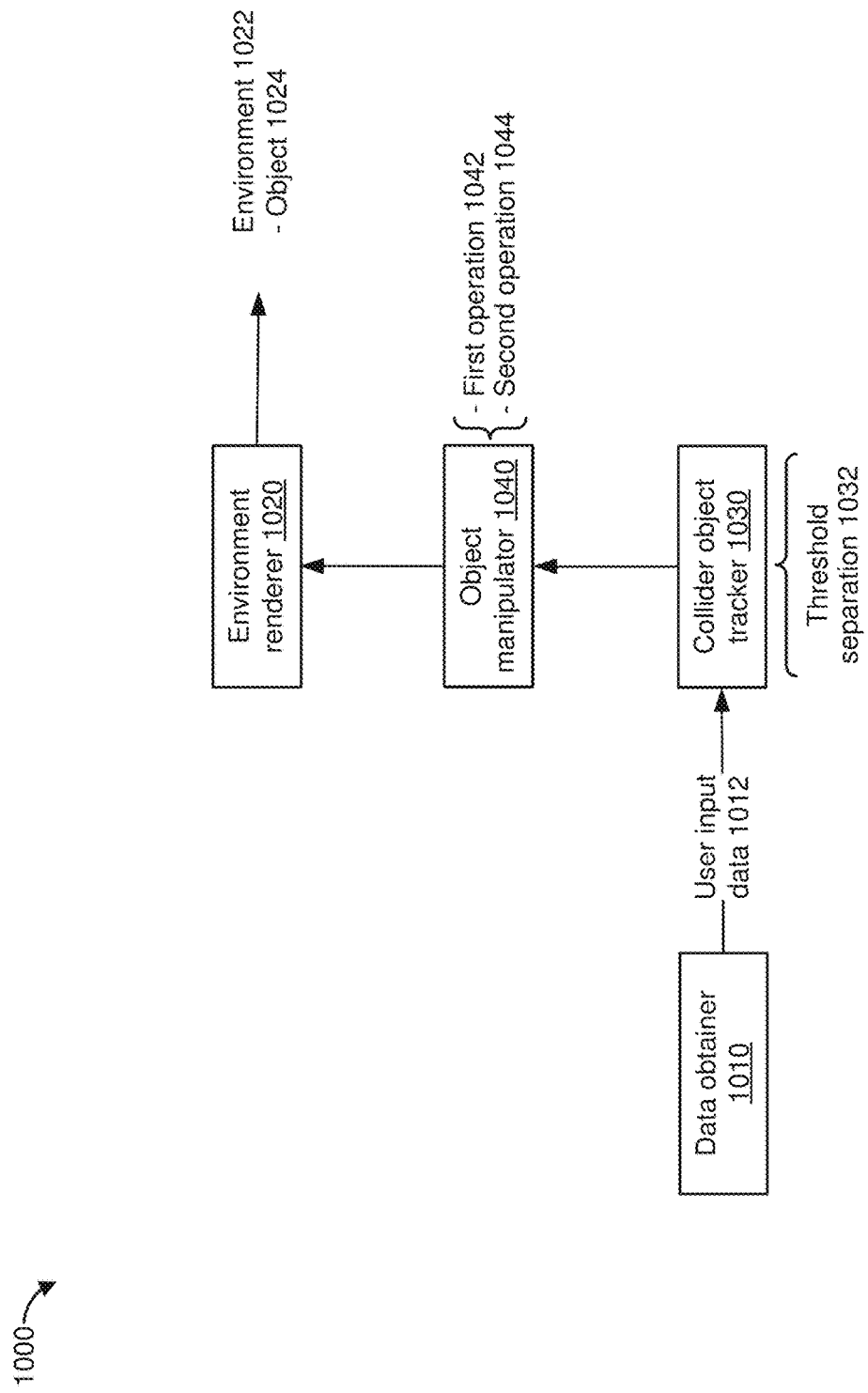
FIG. 10 is a block diagram of an example system for manipulating an XR object in accordance with some implementations.

FIG. 10 is a block diagram of an example system 1000 for manipulating an XR object in accordance with some implementations. In some implementations, the system 1000 resides at the electronic device 20 shown in FIGS. 9A-9H. In various implementations, the system 1000 includes a data obtainer 1010, an XR environment renderer 1020, a collider object tracker 1030, and an XR object manipulator 1040.

In some implementations, the data obtainer 1010 obtains user input data 1012 that indicates one or more user inputs. For example, the user input data 1012 indicates a position of the hand 34 shown in FIGS. 9A-9H. In some implementations, the data obtainer 1010 receives the user input data 1012 from a set of one or more sensors. For example, the data obtainer 1010 receives the user input data 1012 from a computer vision system that includes one or more cameras. In some implementations, the user input data 1012 includes images. In some implementations, the user input data 1012 includes depth data. In some implementations, the data obtainer 1010 provides the user input data 1012 to the collider object tracker 1030. In some implementations, the user input data 1012 indicates performance of a gesture (e.g., the gesture 930 shown in FIGS. 9B, 9D, 9F and 9G).

In various implementations, the XR environment renderer 1020 renders (e.g., displays) an XR environment 1022 (e.g., the XR environment 900 shown in FIGS. 9A-9H). In some implementations, the XR environment renderer 1020 generates (e.g., synthesizes) the XR environment 1022. In some implementations, the XR environment renderer 1020 obtains (e.g., receives the XR environment 1022) from another device. In some implementations, the XR environment 1022 includes an XR object 1024 (e.g., the XR object 902 shown in FIGS. 9A-9H).

In various implementations, the collider object tracker 1030 tracks a position of a collider object (e.g., the collider object 920 shown in FIG. 9A) based on the user input data 1012. Since the collider object encapsulates a body portion, in some implementations, the collider object tracker 1030 tracks the collider object by tracking a position of the body portion that the collider object encapsulates. In some implementations, the collider object tracker 1030 determines whether or not the collider object is within a threshold separation 1032 (e.g., the threshold separation 940 shown in FIG. 9B) of the XR object 1024. In some implementations, each XR object is associated with a respective threshold separation. Alternatively, in some implementations, multiple XR objects (e.g., all XR objects) are associated with the same threshold separation 1032. In some implementations, the collider object tracker 1030 provides an indication to the XR object manipulator 1040 indicating whether or not the collider object is within the threshold separation 1032 of the XR object 1024.

In various implementations, the XR object manipulator 1040 selects an operation to perform on the XR object 1024 based on whether or not the collider object is within the threshold separation 1032 of the XR object 1024. In some implementations, the XR object manipulator 1040 selects a first operation 1042 to perform on the XR object 1024 when the collider object is within the threshold separation 1032 of the XR object 1024 (e.g., when the collider object and the XR object 1024 are touching each other). In some implementations, the XR object manipulator 1040 selects a second operation 1044 to perform on the XR object 1024 when the collider object is not within the threshold separation 1032 of the XR object 1024 (e.g., when the collider object and the XR object 1024 are not touching each other).

In some implementations, the XR object manipulator 1040 determines the second operation 1044 by applying a scaling factor (e.g., a downscaling factor or an upscaling factor) to the first operation 1042. In such implementations, the scaling factor is a function of a distance between the collider object and the XR object 1024. In some implementations, the second operation 1044 is a dampened version of the first operation 1042. For example, if the first operation 1042 includes a first amount of rotation, then the second operation 1044 includes a second amount of rotation that is smaller than the first amount of rotation. In some implementations, the second operation 1044 is an amplified version of the first operation 1042. For example, if the first operation 1042 includes a first amount of rotation, then the second operation 1044 includes a second amount of rotation that is greater than the first amount of rotation.

In some implementations, the second operation 1044 is a different type of operation than the first operation 1042. For example, if the first operation 1042 is a rotation, then the second operation 1044 is a translation. In some implementations, the first and second operations 1042 and 1044 are determined by a user of the system 1000. For example, in some implementations, the person 30 provides a set of user inputs specifying the first operation 1042 and the second operation 1044.

In some implementations, the XR object manipulator 1040 provides the XR environment renderer 1020 an indication as to which of the first and second operations 1042 and 1044 the XR object manipulator 1040 has selected. In such implementations, the XR environment renderer 1020 displays a manipulation of the XR object 1024 based on the operation selected by the XR object manipulator 1040. For example, the XR environment renderer 1020 displays a manipulation of the XR object 1024 in accordance with one of the first and second operations 1042 and 1044 selected by the XR object manipulator 1040.

Figure 11A:
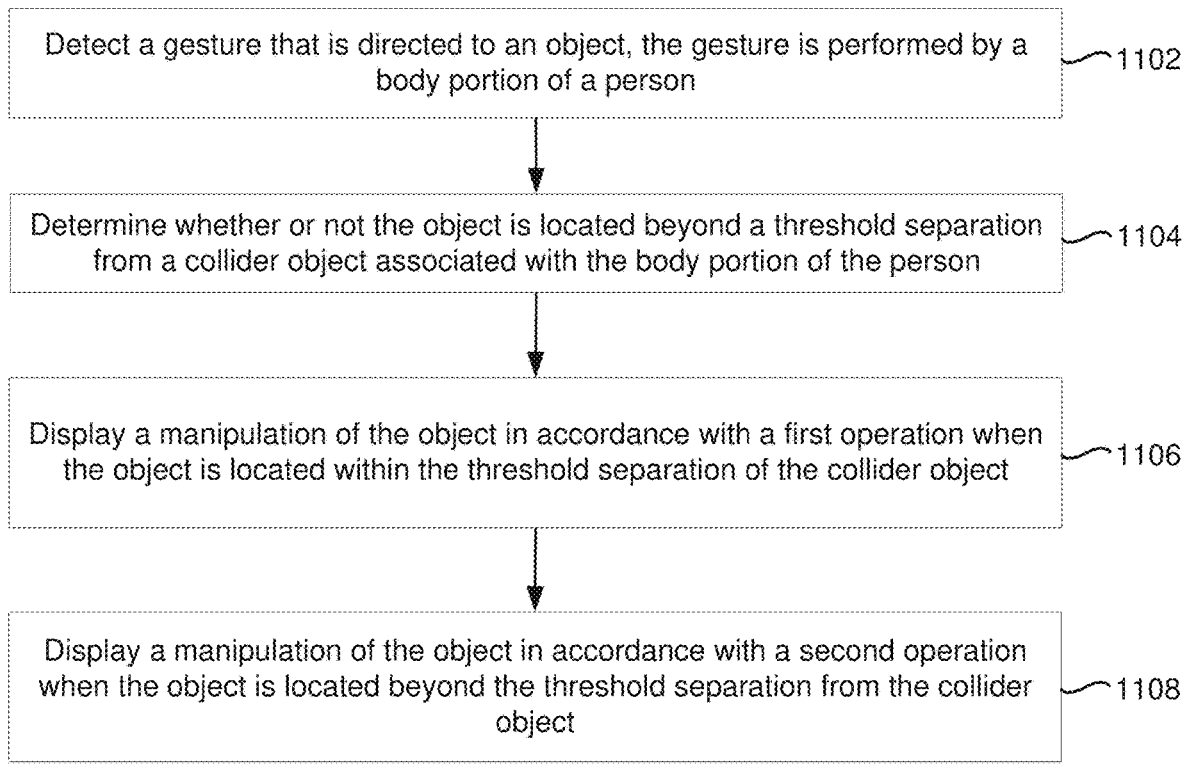

FIG. 11A is a flowchart representation of a method 1100 for manipulating an XR object in accordance with some implementations. In various implementations, the method 1100 is performed by a device with a display, a non-transitory memory and one or more processors coupled with the display and the non-transitory memory (e.g., the electronic device 20 shown in FIGS. 9A-9H and/or the system 1000 shown in FIG. 10). In some implementations, the method 1100 is performed by processing logic, including hardware, firmware, software, or a combination thereof. In some implementations, the method 1100 is performed by a processor executing code stored in a non-transitory computer-readable medium (e.g., a memory).

As represented by block 1102, in various implementations, the method 1100 includes detecting a gesture that is directed to an XR object. For example, as shown in FIG. 9B, the electronic device 20 detects the gesture 930 directed to the XR object 902. In some implementations, the gesture is performed by a body portion of a person. For example, as shown in FIG. 9B, the gesture 930 is performed by the hand 34 of the person 30. In some implementations, the method 1100 includes obtaining a set of one or more images from a camera, and detecting the gesture by tracking a movement of a visual representation of the body portion.

As represented by block 1104, in some implementations, the method 1100 includes determining whether or not the XR object is located beyond a threshold separation from a collider object associated with the body portion of the person. For example, in some implementations, the electronic device 20 determines whether a distance between the collider object 920 and the XR object 902 is greater than or less than the threshold separation 940 shown in FIG. 9B. In some implementations, the method 1100 includes determining whether or not the collider object is touching the XR object. In some implementations, the method 1100 includes determining whether or not the body portion is holding the XR object. In some implementations, the method 1100 includes determining whether or not a first location corresponding to the body portion overlaps with a second location corresponding to the XR object.

As represented by block 1106, in some implementations, the method 1100 includes displaying a manipulation of the XR object in accordance with a first operation when the XR object is located within the threshold separation of the collider object. For example, as shown in FIG. 9C, the electronic device 20 performs the first operation on the XR object 902 by rotating the XR object 902 by the first angle of rotation 952a about the first axis of rotation 954a. In some implementations, the method 1100 includes performing the first operation on the XR object when the collider object is touching the XR object. For example, as shown in FIGS. 9B and 9C, the electronic device 20 performs the first operation of rotating the XR object 902 by the first angle of rotation 952a about the first axis of rotation 954a when the collider object 920 is touching the XR object 902.

As represented by block 1108, in some implementations, the method 1100 includes displaying a manipulation of the XR object in accordance with a second operation when the XR object is located beyond the threshold separation from the collider object. For example, as shown in FIG. 9E, the electronic device 20 performs the second operation on the XR object 902 by rotating the XR object 902 by the second angle of rotation 952b about the first axis of rotation 954a when the second distance 950b is greater than the threshold separation 940. In some implementations, the method 1100 includes performing the second operation on the XR object when the collider object is not touching the XR object. For example, as shown in FIGS. 9D and 9E, the electronic device 20 performs the second operation of rotating the XR object 902 by the second angle of rotation 952b about the first axis of rotation 954a when the collider object 920 is not touching the XR object 902.

Figure 11B:
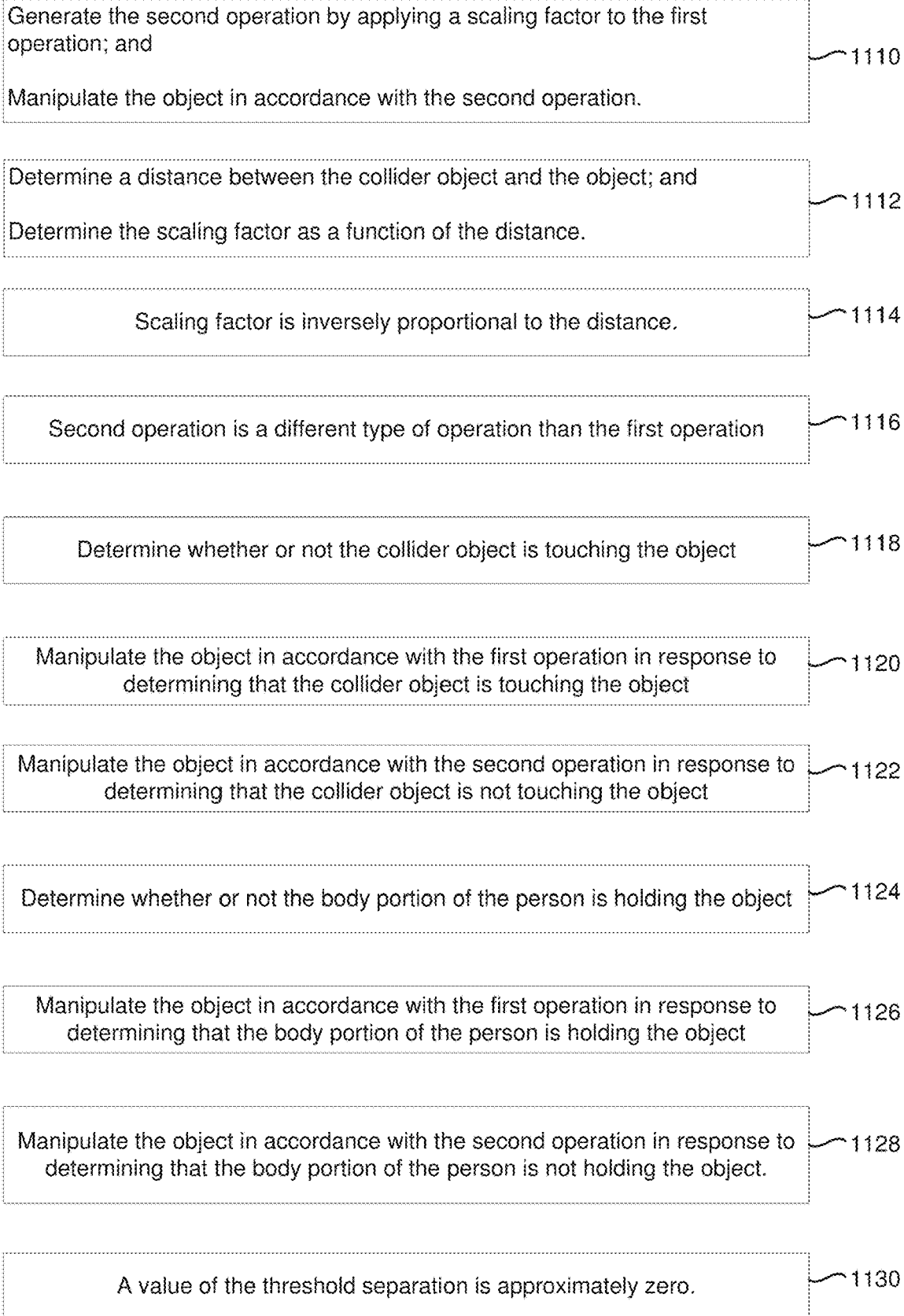

Referring to FIG. 11B, as represented by block 1110, in some implementations, displaying the manipulation of the XR object in accordance with the second operation includes generating the second operation by applying a scaling factor to the first operation, and manipulating the XR object in accordance with the second operation. In some implementations, second operation is a scaled-down version of the first operation. For example, if the first operation is a 60 degree rotation, then the second operation is a 10 degree rotation.

As represented by block 1112, in some implementations, the method 1100 includes determining a distance between the collider object and the XR object, and determining the scaling factor as a function of the distance. As represented by block 1114, in some implementations, the scaling factor is inversely proportional to the distance. For example, the greater the distance between the collider object and the XR object, the lower the scaling factor. For example, as shown in FIG. 9H, the fourth angle of rotation 952d is smaller than the second angle of rotation 952b shown in FIG. 9E because the third distance 950c is greater than the second distance 950b.

As represented by block 1116, in some implementations, the second operation is a different type of operation than the first operation. For example, if the first operation is a rotation, then the second operation is a translation. For example, as shown in FIG. 9G, the electronic device 20 moves the XR object 902 by the distance 960 when the second distance 950b is greater than the threshold separation 940 instead of rotating the XR object 902.

As represented by block 1118, in some implementations, determining whether or not the XR object is located beyond the threshold separation from the collider object associated with the body portion of the person includes determining whether or not the collider object is touching the XR object.

As represented by block 1120, in some implementations, displaying the manipulation of the XR object in accordance with the first operation includes manipulating the XR object in accordance with the first operation in response to determining that the collider object is touching the XR object. For example, as shown in FIG. 9C, the electronic device 20 performs the first operation of rotating the XR object 902 by the first angle of rotation 952a about the first axis of rotation 954a when the collider object 920 is touching the XR object 902.

As represented by block 1122, in some implementations, displaying the manipulation of the XR object in accordance with the second operation includes manipulating the XR object in accordance with the second operation in response to determining that the collider object is not touching the XR object. For example, as shown in FIG. 9E, the electronic device 20 performs the second operation of rotating the XR object 902 by the second angle of rotation 952b about the first axis of rotation 954a when the collider object 920 is not touching the XR object 902.

As represented by block 1124, in some implementations, determining whether or not the XR object is located beyond the threshold separation from the collider object associated with the body portion of the person includes determining whether or not the body portion of the person is holding the XR object.

As represented by block 1126, in some implementations, displaying the manipulation of the XR object in accordance with the first operation includes manipulating the XR object in accordance with the first operation in response to determining that the body portion of the person is holding the XR object. For example, as shown in FIG. 9C, the electronic device 20 performs the first operation of rotating the XR object 902 by the first angle of rotation 952a about the first axis of rotation 954a when the person 30 is holding the XR object 902.

As represented by block 1128, in some implementations, displaying the manipulation of the XR object in accordance with the second operation includes manipulating the XR object in accordance with the second operation in response to determining that the body portion of the person is not holding the XR object. For example, as shown in FIG. 9E, the electronic device 20 performs the second operation of rotating the XR object 902 by the second angle of rotation 952b about the first axis of rotation 954a when the person 30 is not holding the XR object 902.

As represented by block 1130, in some implementations, a value of the threshold separation is approximately zero. In some implementations, the method 1100 includes receiving a user input specifying the value of the threshold separation. In some implementations, the method 1100 includes determining the threshold separation based on a type of the XR object. In some implementations, different XR objects are associated with different values of the threshold separation.

Referring to FIG. 11C, as represented by block 1132, in some implementations, the collider object encapsulates the body portion of the person. For example, as shown in FIG. 9B, the collider object 920 encapsulates the hand 34 of the person 30.

As represented by block 1134, in some implementations, the body portion of the person includes a hand of the person. For example, as shown in FIG. 9B, the person 30 utilizes his/her hand 34 to make the gesture 930.

As represented by block 1136, in some implementations, detecting the gesture includes detecting respective positions of bones of the hand. For example, in some implementations, the electronic device 20 detects respective positions of bones of the hand 34 in order to determine that the person 30 is making the gesture 930.

As represented by block 1138, in some implementations, detecting the gesture includes detecting that the hand is in a closed position, and detecting a movement of a first portion of the hand relative to a second portion of the hand. In some implementations, the method 1100 includes detecting that the person is holding a virtual controller (e.g., a virtual directional pad (D-pad) and/or a virtual joystick). In some implementations, detecting the gesture includes detecting finger movements that corresponds to key presses on the virtual controller (e.g., detecting a key press on the virtual D-pad or a movement of the virtual joystick).

As represented by block 1140, in some implementations, the gesture corresponds to a request to move the XR object. In some implementations, displaying the manipulation of the XR object in accordance with the first operation includes moving the XR object with respect to a first point of reference. For example, the method 1100 includes moving the XR object relative to a first physical point or a first physical plane (e.g., relative to a side wall). In some implementations, displaying the manipulation of the XR object in accordance with the second operation includes moving the XR object with respect to a second point of reference that is different from the first point of reference. For example, the method 1100 includes moving the XR object relative to a second physical point or a second physical plane (e.g., relative to a back wall instead of the side wall)

As represented by block 1142, in some implementations, the gesture corresponds to a request to rotate the XR object. In some implementations, displaying the manipulation of the XR object in accordance with the first operation includes rotating the XR object about a first axis. For example, as shown in FIG. 9C, the electronic device 20 rotates the XR object 902 about the first axis of rotation 954a. In some implementations, displaying the manipulation of the XR object in accordance with the second operation includes rotating the XR object about a second axis that is different from the first axis. For example, as shown in FIG. 9F, the electronic device 20 rotates the XR object 902 about the second axis of rotation 954b.

Figure 12:
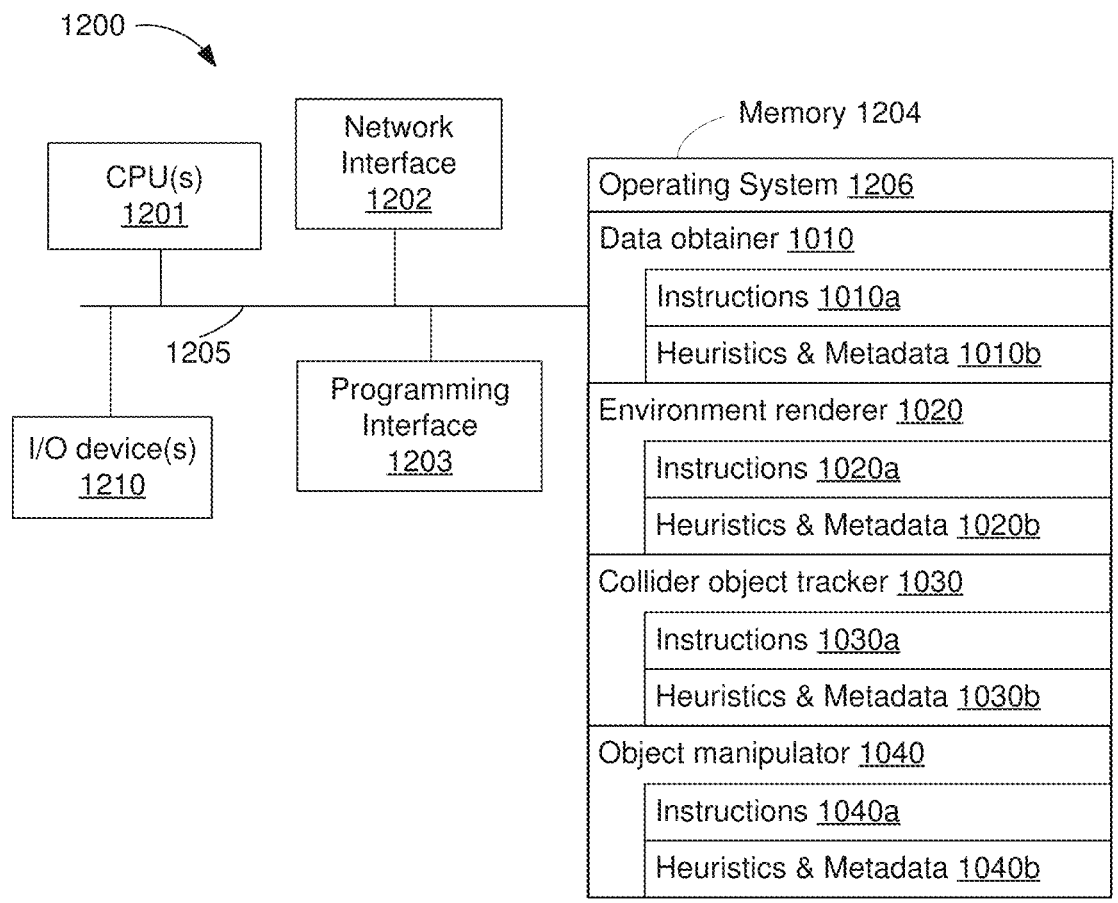
FIG. 12 is a block diagram of a device that manipulates an XR object in accordance with some implementations.

FIG. 12 is a block diagram of a device 1200 enabled with one or more components for manipulating an XR object. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 1200 includes one or more processing units (CPUs) 1201, a network interface 1202, a programming interface 1203, a memory 1204, one or more input/output (I/O) devices 1210, and one or more communication buses 1205 for interconnecting these and various other components.

In some implementations, the network interface 1202 is provided to, among other uses, establish and maintain a metadata tunnel between a cloud hosted network management system and at least one private network including one or more compliant devices. In some implementations, the one or more communication buses 1205 include circuitry that interconnects and controls communications between system components. The memory 1204 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 1204 optionally includes one or more storage devices remotely located from the one or more CPUs 1201. The memory 1204 comprises a non-transitory computer readable storage medium.

In some implementations, the memory 1204 or the non-transitory computer readable storage medium of the memory 1204 stores the following programs, modules and data structures, or a subset thereof including an optional operating system 1206, the data obtainer 1010, the XR environment renderer 1020, the collider object tracker 1030 and the XR object manipulator 1040. In various implementations, the device 1200 performs the method 1100 shown in FIGS. 11A-11C.

In some implementations, the data obtainer 1010 obtains user input data that indicates a position of a body portion (e.g., the hand 34 shown in FIG. 9A). To that end, the data obtainer 1010 includes instructions 1010a, and heuristics and metadata 1010b. In some implementations, the XR environment renderer 1020 renders an XR environment (e.g., the XR environment 900 shown in FIG. 9A). To that end, the XR environment renderer 1020 includes instructions 1020a, and heuristics and metadata 1020b. In some implementations, the collider object tracker 1030 tracks a position of a collider object associated with the body portion (e.g., the collider object 920 shown in FIG. 9A). As described herein, in some implementations, the collider object tracker 1030 determines whether or not the collider object is within a threshold separation of an XR object in the XR environment. To that end, the collider object tracker 1030 includes instructions 1030a, and heuristics and metadata 1030b. As described herein, the XR object manipulator 1040 determines an operation to perform on the XR object based on whether or not the collider object is within the threshold separation of the XR object. For example, in some implementations, the XR object manipulator 1040 selects a first operation to perform on the XR object when the collider object is within the threshold separation of the XR object, and the XR object manipulator 1040 selects a second operation to perform on the XR object when the collider object is beyond the threshold separation of the XR object. To that end, the XR object manipulator 1040 includes instructions 1040a, and heuristics and metadata 1040b. In various implementations, the XR environment renderer 1020 displays a manipulation of the XR object in accordance with the operation determined by the XR object manipulator 1040.

In some implementations, the one or more I/O devices 1210 include an environmental sensor for capturing environmental data. In some implementations, the one or more I/O devices 1210 include an image sensor (e.g., a camera) for capturing image data (e.g., a set of one or more images). In some implementations, the one or more I/O devices 1210 include a microphone for capturing sound data. In some implementations, the one or more I/O devices 1210 include a display for displaying content (e.g., a graphical environment, for example, an XR environment). In some implementations, the one or more I/O devices 1210 include a speaker for outputting audio content. In some implementations, the one or more I/O devices 1210 include a haptic device for providing haptic responses. In some implementations, the haptic device includes a vibrational device that generates vibrations. In some implementations, the haptic device includes a motor with an unbalanced load for generating vibrations.

In various implementations, the one or more I/O devices 1210 include a video pass-through display which displays at least a portion of a physical environment surrounding the device 1200 as an image captured by a scene camera. In various implementations, the one or more I/O devices 1210 include an optical see-through display which is at least partially transparent and passes light emitted by or reflected off the physical environment.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting", that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:
1. A method comprising:
at a device including a display, a non-transitory memory and one or more processors coupled with the display and the non-transitory memory:
displaying a graphical environment that includes a virtual surface, wherein at least a portion of the virtual surface is selectable;

determining a distance between a collider object and the selectable portion of the virtual surface; and displaying a depth indicator with a volumetric shape that encapsulates the collider object, wherein a size of the volumetric shape is a function of the distance between the collider object and the selectable portion of the virtual surface.

2. The method of claim 1, further comprising:
detecting a change in the distance between the collider object and the selectable portion of the virtual surface; and
modifying the size of the volumetric shape based on the change in the distance.

3. The method of claim 1, further comprising:
detecting that the distance between the collider object and the selectable portion of the virtual surface is decreasing; and
reducing the size of the volumetric shape to indicate that the distance between the collider object and the selectable portion of the virtual surface is decreasing.

4. The method of claim 1, further comprising:
detecting that the distance between the collider object and the selectable portion of the virtual surface is increasing; and
increasing the size of the volumetric shape to indicate that the distance between the collider object and the selectable portion of the virtual surface is increasing.

5. The method of claim 1, further comprising:
detecting that the distance between the collider object and the selectable portion of the virtual surface is decreasing; and
increasing an opacity of the depth indicator to indicate that the distance between the collider object and the selectable portion of the virtual surface is decreasing.

6. The method of claim 1, further comprising:
detecting that the distance between the collider object and the selectable portion of the virtual surface is increasing; and
decreasing an opacity of the depth indicator to indicate that the distance between the collider object and the selectable portion of the virtual surface is increasing.

7. The method of claim 1, further comprising:
detecting that the distance between the collider object and the selectable portion of the virtual surface is decreasing; and
darkening a color of the depth indicator to indicate that the distance between the collider object and the selectable portion of the virtual surface is decreasing.

8. The method of claim 1, further comprising:
detecting that the distance between the collider object and the selectable portion of the virtual surface is increasing; and
lightening a color of the depth indicator to indicate that the distance between the collider object and the selectable portion of the virtual surface is increasing.

9. The method of claim 1, further comprising:
changing the volumetric shape of the depth indicator based on the distance between the collider object and the selectable portion of the virtual surface.

10. The method of claim 1, further comprising:
detecting that the distance between the collider object and the selectable portion of the virtual surface is decreasing; and
modifying the depth indicator to indicate a direction towards the selectable portion of the virtual surface.

11. The method of claim 1, further comprising:
displaying, in the graphical environment, a representation of a digit of a person, wherein the collider object is associated with the digit of the person; and
displaying the depth indicator as encapsulating the representation of the digit of the person.

12. The method of claim 1, wherein the collider object is capsule-shaped.

13. The method of claim 1, wherein the virtual surface includes a virtual plane.

14. The method of claim 1, wherein the virtual surface includes a surface of a graphical object.

15. The method of claim 1, wherein the virtual surface is transparent.

16. The method of claim 1, wherein the selectable portion of the virtual surface is an affordance.

17. The method of claim 1, further comprising:
displaying a second depth indicator in association with the collider object, wherein a visual property of the second depth indicator is selected based on a distance between the collider object and a selectable portion of a second virtual surface.

18. A device comprising:
one or more processors;
a display;
a non-transitory memory; and
one or more programs stored in the non-transitory memory, which, when executed by the one or more processors, cause the device to:
display a graphical environment that includes a virtual surface, wherein at least a portion of the virtual surface is selectable;
determine a distance between a collider object and the selectable portion of the virtual surface; and
display a depth indicator with a volumetric shape that encapsulates the collider object, wherein a size of the volumetric shape is a function of the distance between the collider object and the selectable portion of the virtual surface.

19. A non-transitory memory storing one or more programs, which, when executed by one or more processors of a device with a display, cause the device to:
display a graphical environment that includes a virtual surface, wherein at least a portion of the virtual surface is selectable;
determine a distance between a collider object and the selectable portion of the virtual surface; and
display a depth indicator with a volumetric shape that encapsulates the collider object, wherein a size of the volumetric shape is a function of the distance between the collider object and the selectable portion of the virtual surface.

20. The device of claim 18, wherein the one or more programs further cause the device to:
detect that the distance between the collider object and the selectable portion of the virtual surface is decreasing; and
reduce the size of the volumetric shape to indicate that the distance between the collider object and the selectable portion of the virtual surface is decreasing.

21. The device of claim 18, wherein the one or more programs further cause the device to:
detect that the distance between the collider object and the selectable portion of the virtual surface is decreasing; and
increase an opacity of the depth indicator to indicate that the distance between the collider object and the selectable portion of the virtual surface is decreasing.

22. The device of claim 18, wherein the one or more programs further cause the device to:
- detect that the distance between the collider object and the selectable portion of the virtual surface is decreasing; and
- darken a color of the depth indicator to indicate that the distance between the collider object and the selectable portion of the virtual surface is decreasing.

23. The non-transitory memory of claim 19, wherein the one or more programs further cause the device to:
- detect that the distance between the collider object and the selectable portion of the virtual surface is increasing; and
- increase the size of the volumetric shape to indicate that the distance between the collider object and the selectable portion of the virtual surface is increasing.

24. The non-transitory memory of claim 19, wherein the one or more programs further cause the device to:
- detect that the distance between the collider object and the selectable portion of the virtual surface is increasing; and
- decrease an opacity of the depth indicator to indicate that the distance between the collider object and the selectable portion of the virtual surface is increasing.

25. The non-transitory memory of claim 19, wherein the one or more programs further cause the device to:
- detect that the distance between the collider object and the selectable portion of the virtual surface is increasing; and
- lighten a color of the depth indicator to indicate that the distance between the collider object and the selectable portion of the virtual surface is increasing.

26. The device of claim 18, wherein the one or more programs further cause the device to:
- change the volumetric shape of the depth indicator based on the distance between the collider object and the selectable portion of the virtual surface.

* * * * *